(12) United States Patent
Mikami et al.

(10) Patent No.: US 12,135,525 B2
(45) Date of Patent: Nov. 5, 2024

(54) DISPLAY, TRANSFER FOIL, ADHESIVE LABEL, AND LABELED ARTICLE

(71) Applicant: TOPPAN PRINTING CO., LTD., Tokyo (JP)

(72) Inventors: Mayo Mikami, Tokyo (JP); Yuko Masunaga, Tokyo (JP); Tomoko Kotegawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 893 days.

(21) Appl. No.: 17/190,421

(22) Filed: Mar. 3, 2021

(65) Prior Publication Data

US 2021/0191317 A1 Jun. 24, 2021

Related U.S. Application Data

(63) Continuation of application No. PCT/JP2019/028344, filed on Jul. 18, 2019.

(30) Foreign Application Priority Data

Sep. 10, 2018 (JP) .................................. 2018-168560
Dec. 11, 2018 (JP) .................................. 2018-231663

(51) Int. Cl.
*G03H 1/00* (2006.01)
*B42D 25/328* (2014.01)
*G03H 1/02* (2006.01)

(52) U.S. Cl.
CPC ......... *G03H 1/0011* (2013.01); *B42D 25/328* (2014.10); *G03H 1/02* (2013.01);
(Continued)

(58) Field of Classification Search
CPC .......... G03H 1/001; G03H 1/02; G03H 1/028; G03H 2001/0204; G03H 2210/20;
(Continued)

(56) References Cited

U.S. PATENT DOCUMENTS 5,483,363 A  1/1996 Holmes et al.
5,784,200 A  7/1998 Modegi
(Continued)

FOREIGN PATENT DOCUMENTS

JP 2004-508225 A 3/2004
JP 2007-510178 A 4/2007
(Continued)

OTHER PUBLICATIONS

International Searching Authority, "International Search Report," issued in connection with International Patent Application No. PCT/JP2019/028344, dated Oct. 1, 2019.
(Continued)

*Primary Examiner* — Marin Pichler
*Assistant Examiner* — Justin W. Hustoft
(74) *Attorney, Agent, or Firm* — Foley & Lardner LLP

(57) ABSTRACT

A display including a relief structure forming layer having a major surface with a relief type diffractive structure that displays a three-dimensional object as a diffraction image; and a reflective layer at least partially covering a region of the major surface where the diffractive structure is provided. A portion of the diffractive structure in a first region includes first and second linear parts forming a first lattice, and first parts arranged in respective gaps of the first lattice. The first and second linear parts each having a solid line shape form a first pattern. A portion of the diffractive structure in a second region includes third and fourth linear parts alternately arranged in the width direction thereof. The third linear parts each having a dashed line shape and the fourth linear parts each having a dashed or dotted line shape form a second pattern.

11 Claims, 22 Drawing Sheets

(52) U.S. Cl.
CPC . *G03H 2001/0204* (2013.01); *G03H 2210/20* (2013.01); *G03H 2223/23* (2013.01); *G03H 2250/34* (2013.01); *G03H 2250/35* (2013.01)

(58) Field of Classification Search
CPC ........... G03H 2223/23; G03H 2250/34; G03H 2250/35; G03H 2210/13; G03H 2210/30; G03H 2210/54; G03H 2250/10; G03H 2250/39; G03H 2250/42; B32B 3/30; B32B 7/06; B32B 27/08; B32B 2270/00; B32B 2307/412; B42D 25/328
USPC .......................................................... 359/3
See application file for complete search history.

(56) References Cited

U.S. PATENT DOCUMENTS

| | | | | |
|---|---|---|---|---|
| 5,900,954 | A * | 5/1999 | Katz | G03H 1/041 380/54 |
| 2004/0007145 | A1 | 1/2004 | Franz et al. | |
| 2006/0181077 | A1 * | 8/2006 | Kaule | B41M 3/148 428/174 |
| 2007/0183045 | A1 | 8/2007 | Schilling et al. | |
| 2010/0328741 | A1 * | 12/2010 | Cheverton | G03H 1/28 359/2 |
| 2011/0068509 | A1 | 3/2011 | Perrier | |
| 2014/0285699 | A1 * | 9/2014 | Kato | H04N 23/50 348/333.12 |
| 2016/0152065 | A1 * | 6/2016 | Watanabe | B42D 25/00 359/567 |

FOREIGN PATENT DOCUMENTS

| | | |
|---|---|---|
| JP | 2010-204348 A | 9/2010 |
| JP | 2011-521805 A | 7/2011 |
| JP | 2012-123102 A | 6/2012 |
| JP | 2014-008746 A | 1/2014 |
| JP | 2014-016418 A | 1/2014 |
| WO | WO-95/02200 A1 | 1/1995 |

OTHER PUBLICATIONS

International Searching Authority, "Written Opinion," issued in connection with International Patent Application No. PCT/JP2019/028344, dated Oct. 1, 2019.
Partial Supplementary European Search Report dated Oct. 1, 2021 for corresponding European Patent Application No. 19860251.8, (10 pages).
Extended European Search Report issued in corresponding European Patent Application No. 19860251.8 dated Feb. 28, 2022.

* cited by examiner

DISPLAY, TRANSFER FOIL, ADHESIVE LABEL, AND LABELED ARTICLE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/028344, filed on Jul. 18, 2019, which is based upon and claims the benefit of priority to Japanese Patent Application No. 2018-168560, filed on Sep. 10, 2018, and Japanese Patent Application No. 2018-231663, filed on Dec. 11, 2018, the disclosures of which are incorporated herein by reference in their entireties.

TECHNICAL FIELD

The present invention relates to displays, transfer foils, adhesive labels, and labeled articles.

BACKGROUND

Holograms which are difficult to counterfeit or replicate have been used for the purpose of verifying that an article is genuine. For example, if a transparent film containing a hologram is bonded to a card in which personal information, such as a facial image, is recorded, the personal information can be protected from being falsified. Also, if holograms are used for banknotes or securities, fraudulent replication thereof can be reduced or prevented. Furthermore, it has been proposed recently to record facial images on identification (ID) cards or the like using holograms (PTLs 1 and 2).

CITATION LIST

[Patent Literature] PTL 1: JP 2014-8746 A; PTL 2: JP 2014-16418 A.

SUMMARY OF THE INVENTION

Technical Problem

Holograms displaying images of three-dimensional objects, such as persons, animals, plants, buildings and landscapes, are difficult to counterfeit. In other words, it is difficult to counterfeit holograms displaying images completely identical with the images displayed by such holograms as mentioned above. When displaying an image of a three-dimensional object using a hologram, even if there is a slight difference from an image displayed by another hologram, the observer may feel uneasy.

For example, if the original image is widely known, and if the image displayed on the hologram as a counterfeit product does not faithfully reproduce the original image as does the image displayed on the hologram as a genuine product, the observer may more easily know that the former is a counterfeit product. If a hologram as a genuine product displays a facial image of a person, the genuine product can be distinguished from a counterfeit product based on only a slight difference in countenance and the like.

However, the inventors of the present invention have found the following facts. Specifically, a hologram that displays a three-dimensional image cannot give a stereoscopic effect to the observer, unless the hologram uses a configuration for displaying a three-dimensional image making use of binocular parallax.

In this regard, the first disclosure aims to provide a display that displays a diffraction image from which the observer can more easily perceive a stereoscopic effect.

Also, the inventors of the present invention have found the following facts. Specifically, the facial image displayed on a hologram does not appear lifelike.

In this regard, the second disclosure aims to provide a display that displays a more lifelike facial image, as a diffraction image.

Solution to Problem

First Disclosure

According to an aspect of the present invention, there is provided a display, comprising a relief structure forming layer having a major surface which is provided with a relief type diffractive structure that displays an image of a three-dimensional object as a diffraction image; and a reflective layer at least partially covering a region of the major surface where the diffractive structure is provided. In this display, the region includes a first region and a second region. In this display, a portion of the diffractive structure in the first region includes a plurality of first linear parts arrayed in a width direction thereof, a plurality of second linear parts arrayed in a width direction thereof and intersecting the plurality of first linear parts to form a first lattice together with the plurality of first linear parts, and a plurality of first parts arranged in a plurality of respective gaps in the first lattice, the plurality of first and second linear parts each having a solid line shape and forming a first pattern. In this display, a portion of the diffractive structure in the second region includes a plurality of third linear parts and a plurality of fourth linear parts alternately arranged in a width direction thereof, the plurality of third linear parts each having a dashed line shape, the plurality of fourth linear parts each having a dashed line or a dotted shape, the plurality of third and fourth linear parts forming a second pattern.

As stated above, in this display, the diffractive structure includes a first pattern and a second pattern. The first pattern includes first linear parts and second linear parts intersecting each other and forming a first lattice, and first parts arranged in respective gaps in the first lattice. The first and second linear parts each have a solid line shape. The second pattern includes third linear parts and fourth linear parts alternately arranged in the width direction thereof. The third linear parts each have a dashed line shape, while the fourth linear parts each have a dashed or dotted line shape. Therefore, for example, using the structural differences between these patterns, a brightness difference can be produced between portions of a diffraction image corresponding to the first and second regions. For example, in a diffraction image, the portion corresponding to the first region can be made brighter than the portion corresponding to the second region. Such a brightness difference in a diffraction image can contribute to the observer perceiving a stereoscopic effect.

The first pattern includes the first and second linear parts. The first linear parts are arrayed in the width direction thereof, and the second linear parts are arrayed in the width direction thereof to form the first lattice together with the first linear parts. The second pattern includes the third and fourth linear parts which are alternately arranged in the width direction thereof. Such an arrangement can also contribute to the observer perceiving a stereoscopic effect.

Thus, this display can display a diffraction image from which the observer can more easily perceive a stereoscopic effect.

According to another aspect of the present invention, there is provided a display according to the above aspect. In this display, the first region and the second region are adjacent to each other.

If the first and second regions are adjacent to each other, the observer can more easily perceive the brightness difference described above regarding a diffraction image. Also, in this case, the observer can more easily perceive common and different points in structure and arrangement between the first pattern including the first and second linear parts, and the second pattern including the third and fourth linear parts. Therefore, if the first and second regions are adjacent to each other, such an arrangement can advantageously display an image from which the observer may strongly perceive a stereoscopic effect.

According to still another aspect of the present invention, there is provided a display according to any of the above aspects. In this display, one or more of the plurality of third linear parts are located on respective extension lines of one or more of the plurality of first linear parts.

This structure is suitable for reproducing, for example, a continuous change in surface configuration of a three-dimensional object in a diffraction image, or a continuous change in brightness in the image.

According to still another aspect of the present invention, there is provided a display according to any of the above aspects. In this display, an area ratio of the second pattern to the second region is smaller than an area ratio of the first pattern to the first region.

This structure is suitable for making the portion corresponding to the first region brighter than the portion corresponding to the second region in a diffraction image.

According to still another aspect of the present invention, there is provided a display according to any of the above aspects. In this display, a portion of the reflective layer located on the first and the second regions covers only the first and the second patterns.

If this display is provided on an article, such as one made of paper, having light scattering properties, the observer may not perceive light from the portions corresponding to the first and second patterns in the regions corresponding to the first and second regions but may perceive scattered light from other portions, under observation conditions in which neither specular light nor diffracted light is observed from the display. Therefore, for example, if the portion of a diffraction image corresponding to the first region appears to be brighter than the portion thereof corresponding to the second region, the portion of the display corresponding to the first region may appear to be darker than the portion thereof corresponding to the second region, under observation conditions in which neither specular light nor diffracted light is observed. Such a brightness difference can contribute to the observer perceiving a stereoscopic effect from an image displayed by the display under observation conditions in which neither specular light nor diffracted light is observed.

The above arrangement of the linear parts in the first and second patterns can contribute to the observer perceiving a stereoscopic effect from an image displayed by the display under observation conditions in which neither specular light nor diffracted light is observed.

Accordingly, this display can display an image from which the observer can more easily perceive a stereoscopic effect even under observation conditions in which neither specular light nor diffracted light is observed.

In this way, this display can display a diffraction image from which the observer can more easily perceive a stereoscopic effect under observation conditions in which diffracted light is observed, and can also display an image from which the observer can more easily perceive a stereoscopic effect under observation conditions in which neither specular light nor diffracted light is observed. These images are in a relationship in which light and dark are reversed. In other words, this display can display an image from which the observer can more easily perceive a stereoscopic effect, irrespective of the observation conditions, while in this image, light and dark are reversed depending on the observation conditions.

According to still another aspect of the present invention, there is provided a display. In the display, the region provided with the diffractive structure further includes a third region; and a portion of the diffractive structure in the third region includes a plurality of fifth linear parts arrayed in a width direction thereof, a plurality of sixth linear parts arrayed in a width direction thereof and intersecting the plurality of fifth linear parts to form a second lattice together with the plurality of fifth linear parts, and a plurality of second parts arranged in the plurality of respective gaps in the second lattice, the plurality of fifth linear parts each having a solid line or a dashed line shape, the plurality of sixth linear parts each having a dashed line or a dotted line shape, the plurality of fifth and sixth linear parts forming a third pattern.

As stated above, in this display, the diffractive structure further includes a third pattern. The third pattern has a structure that is intermediate between the structure of the first pattern and the structure of the second pattern. Therefore, for example, using the structural differences between these patterns, a brightness difference can be produced between portions of a diffraction image corresponding to the first to third regions. For example, in a diffraction image, the portion corresponding to the first region can be made brighter than the portion corresponding to the second region, and the portion corresponding to the third region can be imparted with brightness that is intermediate between the brightness in the portion corresponding to the first region and the brightness in the portion corresponding to the second region. In other words, this display can provide a diffraction image in which the number of gradation levels is three or more.

The first pattern includes the first and second linear parts. The first linear parts are arrayed in the width direction thereof, and the second linear parts are arrayed in the width direction thereof to form the first lattice together with the first linear parts. The second pattern includes the third and fourth linear parts which are alternately arranged in the width direction thereof. The third pattern includes the fifth and sixth linear parts. The fifth linear parts are arrayed in the width direction thereof, and the sixth linear parts are arrayed in the width direction thereof to form the second lattice together with the fifth linear parts. Such an arrangement can also contribute to the observer perceiving a stereoscopic effect.

Thus, this display can display a diffraction image from which the observer can more strongly perceive a stereoscopic effect.

According to still another aspect of the present invention, there is provided a display according to the above aspect. In this display, the first region and the second region are adjacent to each other via the third region.

If the first and second regions are adjacent to each other via the third region, the observer can more easily perceive the brightness difference described above regarding a diffractive image. Also, in this case, the observer can more easily perceive common and different points in structure and arrangement between the first pattern including the first and second linear parts, the second pattern including the third and fourth linear parts, and the third pattern including the fifth and sixth linear parts. Therefore, if the first and second regions are adjacent to each other via the third region, such an arrangement can advantageously display an image from which the observer may strongly perceive a stereoscopic effect.

According to still another aspect of the present invention, there is provided a display according to any of the above aspects. In this display, one or more of the plurality of first linear parts and one or more of the plurality of third linear parts are located on respective extension lines of one or more of the plurality of fifth linear parts.

This structure is suitable for reproducing, for example, a continuous change in surface configuration of a three-dimensional object or a continuous change in brightness in a diffraction image.

According to still another aspect of the present invention, there is provided a display according to any of the above aspects. In this display, an area ratio of the first pattern to the first region is larger than an area ratio of the third pattern to the third region, and an area ratio of the second pattern to the second region is smaller than the area ratio of the third pattern to the third region.

This structure is suitable for making the portion corresponding to the first region brighter than the portion corresponding to the third region, and for making the portion corresponding to the second region darker than the portion corresponding to the third region.

According to still another aspect of the present invention, there is provided a display according to any of the above aspects. In this display, portions of the reflective layer located in the first to the third regions cover only the first to the third patterns.

If this display is provided on an article, such as one made of paper, having light scattering properties, the observer may not perceive light from the portions corresponding to the first to third patterns in the regions corresponding to the first to third regions but may perceive scattered light from other portions, under observation conditions in which neither specular light nor diffracted light is observed from the display. Therefore, for example, if the portion of a diffraction image corresponding to the first region appears to be brighter than the portion corresponding to the third region, and the portion corresponding to the second region appears to be darker than the portion corresponding to the third region, the portion of the display corresponding to the first region may appear to be darker than the portion thereof corresponding to the third region, and the portion thereof corresponding to the second region may appear to be brighter than the portion thereof corresponding to the third region, under observation conditions in which neither specular light nor diffracted light is observed. Such a brightness difference can contribute to the observer perceiving a stereoscopic effect from an image displayed by the display under observation conditions in which neither specular light nor diffracted light is observed.

The above arrangement of the linear parts in the first to third patterns can contribute to the observer perceiving a stereoscopic effect from an image displayed by the display under observation conditions in which neither specular light nor diffracted light is observed.

Accordingly, this display can display an image from which the observer can more easily perceive a stereoscopic effect even under observation conditions in which neither specular light nor diffracted light is observed.

In this way, this display can display a diffraction image from which the observer can more easily perceive a stereoscopic effect under observation conditions in which diffracted light is observed, and can also display an image from which the observer can more easily perceive a stereoscopic effect under observation conditions in which neither specular light nor diffracted light is observed. These images are in a relationship in which light and dark are reversed. In other words, this display can display an image from which the observer can more easily perceive a stereoscopic effect, irrespective of the observation conditions, while in this image, light and dark are reversed depending on the observation conditions.

According to still another aspect of the present invention, there is provided a display according to any of the above aspects. In this display, the plurality of first parts extend in an oblique direction relative to both a length direction of the plurality of first linear parts and a length direction of the plurality of second linear parts, and form a plurality of dashed lines or dotted lines arrayed in a width direction thereof.

The gaps in the first lattice may each have a square shape, for example. If the above configuration is adopted, the first parts can be arranged, for example, on the diagonal lines of the respective squares. With this arrangement, restriction to the length of the first parts is small.

According to still another aspect of the present invention, there is provided a display according to any of the above aspects. In this display, one or more of the plurality of fourth linear parts each have a dotted line shape, and one or more dots configuring the dotted lines are different in shape from one or more other dots configuring the dotted lines.

Many three-dimensional objects have surfaces that are not smooth, and the colors of the surfaces are not uniform. Therefore, such an object, when observed being magnified, includes regions where the brightness or the like is uneven. If the above structure is adopted, regions having uneven brightness can be produced in a diffraction image when observed being magnified. Therefore, this diffraction image, when observed with the naked eye, appears to be more natural.

One or more dots configuring the dotted lines may each have a circular or square shape, for example. Also, one or more other dots configuring the dotted lines may each have a hooked shape, for example.

According to still another aspect of the present invention, there is provided a display according to any of the above aspects. In this display, the plurality of third linear parts are different from the plurality of fourth linear parts in a ratio of gaps per unit length.

The plurality of third linear parts may be equal to or different from the plurality of fourth linear parts in the ratio of gaps per unit length. By changing this ratio, brightness can be changed in the portion corresponding to the second region in a diffraction image.

According to still another aspect of the present invention, there is provided a display according to any of the above aspects. In this display, the region provided with the diffractive structure further includes a fourth region; a portion of the diffractive structure in the fourth region includes a plurality of seventh linear parts arrayed in a width direction thereof, and a plurality of eighth linear parts arrayed in a width direction thereof and intersecting the plurality of seventh linear parts to form a third lattice together with the plurality of seventh linear parts; and the plurality of seventh and the eighth linear parts each having a solid, a dashed or a dotted line shape form a fourth pattern.

The fourth pattern can be used for producing a brightness difference in a diffraction image. Also, the arrangement of the seventh and eighth linear parts configuring the fourth pattern can contribute to the observer perceiving a stereoscopic effect. Thus, this display can display a diffraction image from which the observer can more strongly perceive a stereoscopic effect.

According to still another aspect of the present invention, there is provided a display according to the above aspect. In this display, the fourth region is adjacent to the first region.

If the fourth region is adjacent to the first region, the observer can more easily perceive the brightness difference described above regarding a diffractive image. Also, in this case, the observer can more easily perceive common and different points in structure and arrangement between the first pattern including the first and second linear parts, and the fourth pattern including the seventh and eighth linear parts. Therefore, if the fourth region is adjacent to the first region, such an arrangement can contribute to displaying an image from which the observer may strongly perceive a stereoscopic effect.

According to still another aspect of the present invention, there is provided a display according to any of the above aspects. In this display, one or more of the plurality of seventh linear parts are located on respective extension lines of one or more of the plurality of first linear parts or one or more of the plurality of second linear parts.

This structure is suitable for reproducing, for example, a continuous change in surface configuration of a three-dimensional object or a continuous change in brightness in a diffraction image.

According to still another aspect of the present invention, there is provided a display according to any of the above aspects. In this display, an area ratio of the first pattern to the first region is larger than an area ratio of the fourth pattern to the fourth region.

This structure is suitable for making the portion corresponding to the first region brighter than the portion corresponding to the fourth region.

According to still another aspect of the present invention, there is provided a display according to any of the above aspects. In this display, the plurality of seventh linear parts and/or the plurality of eighth linear parts each have a dashed or a dotted line shape, and the plurality of seventh linear parts and the plurality of eighth linear parts are different from each other in a ratio of gaps per unit length.

The plurality of seventh linear parts and the plurality of eighth linear parts may be equal to or different from each other in the ratio of gaps per unit length. By changing this ratio, brightness can be changed in the portion corresponding to the second region in a diffraction image.

According to still another aspect of the present invention, there is provided a display according to any of the above aspects. In this display, the region provided with the diffractive structure further includes a fifth region; a portion of the diffractive structure in the fifth region includes a plurality of ninth linear parts arrayed in a width direction thereof; and the plurality of ninth linear parts each having a solid line shape form a fifth pattern.

The fifth pattern is used, for example, for expressing hair in a diffraction image.

According to still another aspect of the present invention, there is provided a display according to any of the above aspects. In this display, the linear parts each have a width in the range of 10 μm to 100 μm.

If the width of the linear parts is excessively small, the shape and arrangement of the linear parts may be less likely to enhance the stereoscopic effect. If the width of the linear parts is excessively large, the observer may perceive the image quality to be low.

The plurality of first parts may each preferably have a width or a diameter in the range of 10 μm to 100 μm. The plurality of second parts may also each preferably have a width or a diameter in the range of 10 μm to 100 μm.

According to still another aspect of the present invention, there is provided a display according to any of the above aspects. In this display, one or more linear parts each have a width changing along a length direction thereof, or two or more linear parts have widths different from each other.

For example, in any of the above patterns, if the widths of one or more linear parts are increased from first ends toward second ends thereof, the brightness of the diffraction image can be increased from the first ends toward the second ends. Also, in any of the above patterns, if the widths of two or more linear parts arrayed in the width direction thereof are increased form a first end toward a second end of an array thereof, the brightness in the diffraction image can be increased from the first end toward the second end of the array.

According to still another aspect of the present invention, there is provided a display according to any of the above aspects. In this display, one or more linear parts each include a first linear region and a second linear region extending in a length direction of the linear part and adjacent to each other in a width direction of these regions, the first and the second linear regions being configured to be distinguishable from each other by diffracted light when observed with the naked eye.

If this structure is adopted, either of the first and second linear regions may appear to be the shadows of the other. In other words, the linear parts adopting this structure may appear to be stereoscopic. Therefore, this structure is advantageous from the perspective of enabling display of an image from which the observer may strongly perceive a stereoscopic effect.

The expression that "the first and the second linear regions" are "configured to be distinguishable from each other by diffracted light when observed with the naked eye" refers to that the first and second linear regions allow diffracted light to emerge with wavelengths different from each other to an extent that colors of these regions can be recognized as being different from each other, and have dimensions enabling distinction between these regions under the same observation conditions. It is preferable that the first and the second linear regions may allow diffracted light to emerge with wavelengths having a difference of 15 nm or more therebetween under specific observation conditions. It is preferable that the first and the second linear regions may each have a dimension in the range of 2 μm to 50 μm in the width direction thereof.

It is preferable that the first and the second regions may be different in width to have either of the first and the second linear regions appear as being the shadows of the other. It is preferable that the ratio of the width of the first or the second linear region, whichever is smaller, to the total width of the first and the second linear regions may be in the range of 20% or more and less than 50%.

If two or more linear parts include the first and the second regions, the first and the second regions of these linear parts may preferably be arranged in the same direction and in the same order. If this structure is adopted, the observer observing the diffraction image may more easily feel a strong stereoscopic effect.

According to still another aspect of the present invention, there is provided a display according to any of the above aspects. In this display, the diffractive structure is configured to display a multicolor image as the diffraction image.

The display may also be configured to display a monochromatic image as a diffraction image, or may be configured to display a multicolor image as a diffraction image.

If the above display is configured to display a multicolor image as a diffraction image, one or more linear parts may include a plurality of sub-regions configured to allow emergence of diffracted light having different wavelengths and to express colors by additive color mixing of the diffracted light having different wavelengths.

In this case, in the linear parts including the plurality of sub-regions, the plurality of sub-regions may be arrayed in the length direction of the linear parts including these sub-regions. Alternatively, in this case, in the linear parts including the plurality of sub-regions, the plurality of sub-regions may be arrayed in the width direction of the linear parts including the sub-regions. Alternatively, in this case, in the linear parts including the plurality of sub-regions, the plurality of sub-regions may be arrayed in the length direction and the width direction of the linear parts including these sub-regions.

In this way, various arrangements can be used for the sub-regions.

The plurality of sub-regions may each preferably have a dimension in the range of 3 μm to 40 μm in the array direction thereof. If this dimension is made smaller, it may be difficult to display a bright diffraction image. If this dimension is made larger, the sub-regions, from which diffracted light with different wavelengths emerges, may be perceived as being separate regions.

According to still another aspect of the present invention, there is provided a display according to any of the above aspects. In this display, the array of the plurality of linear parts included in one of the regions is configured to display substantially the same color across the array in the diffraction image. Alternatively, according to still another aspect of the present invention, there may be provided a display according to any of the above aspects. In this display, the array of the plurality of linear parts included in one of the regions is configured to display colors gradually changing in any of the directions in the diffraction image.

According to still another aspect of the present invention, there is provided a display according to the above aspect. In this display, the array of the plurality of linear parts included in another one of the regions is configured to display substantially the same color across the array in the diffraction image. Alternatively, according to still another aspect of the present invention, there may be provided a display according to the above aspect. In this display, the array of the plurality of linear parts included in the other one of the regions is configured to display colors gradually changing in any direction in the diffraction image.

If one of the regions and the other one of the regions are adjacent to each other, of the plurality of linear parts included in one of the regions and the plurality of linear parts included in the other one of the regions, those which are located near the boundary of these regions may preferably display substantially the same color in the diffraction image. Such a configuration enables more natural gradation expression.

According to still another aspect of the present invention, there is provided a display according to any of the above aspects. In this display, the array of the plurality of linear parts and the plurality of first or second parts included in one of the regions is configured to display substantially the same color across the array in the diffraction image. Alternatively, according to still another aspect of the present invention, there may be provided a display according to any of the above aspects. In this display, the array of the plurality of linear parts and the plurality of first or second parts included in one of the regions is configured to display colors gradually changing in any of the directions in the diffraction image.

According to still another aspect of the present invention, there is provided a display according to the above aspect. In this display, the array of the plurality of linear parts included in another one of the regions is configured to display substantially the same color across the array in the diffraction image. Alternatively, according to still another aspect of the present invention, there may be provided a display according to the above aspect. In this display, the array of the plurality of linear parts included in the other one of the regions is configured to display colors gradually changing in any direction in the diffraction image.

If one of the regions and another one of the regions are adjacent to each other, of the plurality of linear parts and the plurality of first or second parts included in one of the regions and the plurality of linear parts included in the other one of the regions, those which are located near the boundary of these regions may preferably display substantially the same color in the diffraction image. Such a configuration enables more natural gradation expression.

According to still another aspect of the present invention, there is provided a display according to any of the above aspects. In this display, the array of the plurality of first and second linear parts and the plurality of first parts included in the first region is configured to display substantially the same color across the array in the diffraction image. Alternatively, according to still another aspect of the present invention, there may be provided a display according to any of the above aspects. In this display, the array of the plurality of first and second linear parts and the plurality of first parts included in the first region is configured to display colors gradually changing in any of the directions in the diffraction image.

According to still another aspect of the present invention, there is provided a display according to any of the above aspects. In this display, the array of the plurality of fifth and sixth linear parts and the plurality of second parts included in the third region is configured to display substantially the same color across the array in the diffraction image. Alternatively, according to still another aspect of the present invention, there may be provided a display according to any of the above aspects. In this display, the array of the plurality of fifth and sixth linear parts and the plurality of second parts included in the third region is configured to display colors gradually changing in any of the directions in the diffraction image.

If the first region and the third region are adjacent to each other, of the plurality of first, second, fifth and sixth linear parts and the plurality of first and second parts, those which are located near the boundary of these regions may preferably display substantially the same color in the diffraction image. Such a configuration enables more natural gradation expression.

According to still another aspect of the present invention, there is provided a display according to any of the above aspects. In this display, the major surface includes one or more gaps each adjacent to one or more of the patterns. These one or more gaps may each have a flat surface, or may each have a surface provided with a relief structure. According to an example, the relief structure includes a plurality of concavities or convexities arrayed in two intersecting directions. According to another example, the relief structure includes a plurality of randomly arranged concavities or convexities. For example, these plurality of concavities or convexities may have a higher ratio of depth or height to width, compared to the plurality of grooves or ridges forming the diffractive structure. Also, for example, these plurality of concavities or convexities have a smaller center-to-center distance, compared to the plurality of grooves or ridges forming the diffractive structure.

By providing the relief structure, the reflective layer can be easily obtained as a patterned layer, for example. For example, a first layer made of a material for reflective layers, such as aluminum, may be formed through a vapor-deposition method, such as sputtering or vacuum deposition, on the major surface which is provided with the diffractive structure and the relief structure. Subsequently, a second layer made of a material, such as an inorganic oxide, which is different from the material for reflective layers may be formed on the first layer through a vapor-phase deposition method, such as sputtering or vacuum deposition. The second layer may be sufficiently thinly formed with apertures opening at the bottom positions of the concavities configuring the relief structure, or at the boundary positions of the convexities configuring the relief structure. Then, an etching agent may be supplied to the second layer to selectively remove the portions of the first and second layers located on the relief structure. Thus, the reflective layer can be obtained as a patterned layer.

According to still another aspect of the present invention, there is provided a display according to any of the above aspects. In this display, the three-dimensional object includes one or more images of a person, an animal, a plant, a building and a landscape.

The technique described above is particularly effective when the three-dimensional object includes one or more images of a person, animal, plant, building and landscape.

According to still another aspect of the present invention, there is provided a display according to any of the above aspects. In this display, the image of a three-dimensional object includes a portrait, or preferably, a facial image of a person.

The human brain includes an area of nerve cells which are called "cells responsive to faces (or face cells)". The face cells are said to respond to the eye, nose and mouth particularly sensitively. The face cells enable identification of a person from an image of the entire face including not only the eye, nose and mouth, but also the sites, such as the cheek and the contour thereof, surrounding them. Therefore, humans can recognize facial images with higher accuracy than other images. Accordingly, if the image of a three-dimensional object includes a portrait, or in particular, a facial image of a person, humans can more easily distinguish a genuine display from a counterfeit display, based on slight differences between the diffraction images in these displays.

The first and second regions, or the first to third regions may preferably be arranged in a region corresponding to the face of a person, more preferably in a region corresponding to the facial skin of a person, and even more preferably at positions corresponding to one or more of the nose, cheek, forehead, temple, area between the eyebrows, upper eyelid, lower eyelid, mouth and jaw.

According to still another aspect of the present invention, there is provided a display according to the above aspect. In this display, the plurality of first linear parts and the plurality of third linear parts are arranged so as to be located on a plurality of lines extending obliquely below from the nose or the eye of the person, and the plurality of third linear parts are arranged so as to be located between the plurality of first linear parts and the nose or the eye of the person. Alternatively, according to still another aspect of the present invention, there may be provided a display according to the above aspect. In this display, the plurality of first linear parts and the plurality of third linear parts are arranged so as to be located on a plurality of lines extending obliquely below from the nose or the eye of the person, and the plurality of first linear parts are arranged so as to be located between the plurality of third linear parts and the nose or the eye of the person.

If such a configuration is adopted, the observer observing the facial image included in a diffraction image may more strongly perceive a stereoscopic effect.

According to still another aspect of the present invention, there is provided a display according to any of the above aspects. In this display, the diffractive structure includes a diffraction grating including a plurality of grooves or ridges arrayed in a width direction thereof. The plurality of grooves or ridges may each preferably have a pitch in the range of 500 nm to 2,000 nm.

Examples of the materials used for the relief structure forming layer may include thermoplastic resins, thermosetting resins, and ultraviolet- or radiation-curable resins. As the thermoplastic resins, acrylic resins, epoxy resins, cellulose resins or vinyl resins may be used, for example. As the thermosetting resins, for example, urethane resins in which polyisocyanate as a cross-linking agent is added, for cross-linkage, to acrylic polyol or polyester polyol having a reactive hydroxyl group, melamine resins, or phenol resins may be used. As the ultraviolet- or radiation-curable resins, for example, acrylic resins may be used. Examples of the acrylic resins may include epoxy acrylate, epoxy methacrylate, urethane acrylate, and urethane methacrylate.

The relief structure forming layer can be formed, for example, through the following process. For example, an original plate provided with a relief structure may be pressed against a thermoplastic resin layer with application of heat, and then the original plate may be removed from the thermoplastic resin layer. Alternatively, a coating film of an ultraviolet-curable resin may be formed, against which an original plate may be pressed with application of ultraviolet light to cure the ultraviolet-curable resin, and then the original plate may be removed from the coating film. Alternatively, a coating film of a thermosetting resin may be formed, against which an original plate may be pressed with application of heat to cure the thermosetting resin, and then the original plate may be removed from the coating film. The relief structure forming layer may have a thickness, for example, in the range of 1 μm or more and 25 μm or less.

As the reflective layer, a layer made of a metal material, such as aluminum, silver, gold or an alloy thereof, may be used. Alternatively, the reflective layer may be a dielectric layer having a refractive index different from that of the relief structure forming layer. Alternatively, the reflective layer may be a laminate of dielectric layers, i.e., a dielectric multilayer film, with the refractive index being different between adjacent dielectric layers. Of the dielectric layers included in the dielectric multilayer film, the layer contacting the relief structure forming layer may preferably have a refractive index different from that of the relief structure forming layer. For example, the reflective layer can be formed using a vapor-phase deposition method, such as vacuum vapor deposition or sputtering. Inorganic or organic compounds may be used for the dielectric layer or the dielectric multilayer film.

Examples of the inorganic compounds may include oxides, sulfides, and nitrides. Examples of the oxides may include metal oxides, and silicon oxide (SiO). As the nitrides, for example, metal nitrides may be used. As the sulfides, for example, metal sulfides may be used. Examples of the metal oxides may include titanium oxide (TiO), zinc oxide (ZnO), and alumina. Examples of the sulfides may include zinc sulfide (ZnS) and aluminum sulfide (AlS). As the nitrides, calcium nitride (CaN) may be used.

The surface of the reflective layer facing away from the relief structure may be provided with a reflective protection layer. The reflective protection layer may be formed as a layer having apertures at portions. Using this reflective protection layer as an etching mask, portions of the reflective layer not covered with the reflective protection layer may be selectively etched away to obtain a reflective layer partially covering the relief structure surface.

The reflective protection layer may be made, for example, of an inorganic compound, a polymer or a combination thereof. As the inorganic compound, for example, an oxide or a nitride may be used. Examples of the oxide may include silicon oxide (SiO), and alumina, and examples of the nitride may include calcium nitride (CaN), titanium nitride (TiN), and aluminum nitride (AlN). The polymer may be, for example, a urethane resin or an acrylic resin.

The reflective layer may have a thickness in the range, for example, of 10 nm or more and 500 nm or less.

According to still another aspect of the present invention, there is provided a transfer foil which is provided with a transfer material layer including the display according to any of the above aspects, and a support separately supporting the transfer material layer.

According to an example, the transfer material layer includes a transfer portion and a non-transfer portion, which are adjacent to each other. In the transfer material layer, the transfer portion is a portion transferred to an article and includes the above display. In the transfer material layer, the non-transfer portion is a portion remaining without being transferred to the article. The non-transfer portion has a layer configuration similar to that of the transfer portion.

For example, the support may be a film or sheet made of a resin. For example, the support may be made of a material, such as polyethylene terephthalate, having good heat resistance. The support supporting the transfer material layer may have a major surface provided with a release layer comprising, for example, a fluororesin or a silicone resin. The support may have a thickness in the range of 4 μm or more and 50 μm or less.

According to still another aspect of the present invention, there is provided a transfer foil according to the above aspect. In this transfer foil, the transfer material layer further includes a separation protective layer interposed between the display and the support.

The separation protective layer enhances separation of the transfer portion from the support, while protecting the surface of the separated transfer portion, i.e., the display, from damage or deterioration. For example, the separation protective layer may have optical transparency. For example, the separation protective layer may be made of a resin. The resin forming the separation protective layer may be, for example, an ultraviolet cured resin, thermoset resin, or thermoplastic resin. For example, the resin may be an acrylic resin. The separation protective layer may have a thickness in the range, for example, of 0.5 μm or more and 5 μm or less.

According to still another aspect of the present invention, there is provided a transfer foil further including an adhesive layer covering the transfer material layer.

The adhesive layer may be made, for example, of a thermoplastic resin. Examples of the thermoplastic resin may include polyethylene resins, polyester resins, acrylic resins, and olefin resins. The adhesive layer may have a thickness in the range, for example, of 0.5 μm or more and 20 μm or less.

According to still another aspect of the present invention, there is provided an adhesive label including the display according to any of the above aspects, and an adhesive layer provided to one major surface of the display.

The adhesive layer is made of an adhesive, such as a pressure sensitive adhesive. Examples of the adhesive may include vinyl chloride-vinyl acetate copolymers, polyester polyamides, acrylic adhesives, butyl rubber adhesives, natural rubber adhesives, silicone adhesives, and polyisobutyl adhesives.

The adhesive may further contain additives. Examples of the additive may include aggregating components, such as alkyl methacrylate, vinyl ester, acrylonitrile, styrene, and vinyl monomer; reforming components, such as unsaturated carboxylic acid, hydroxy group-containing monomers, and acrylonitrile; polymerization initiators; plasticizers; curing agents; curing accelerators; antioxidants; and a mixture containing two or more of these materials.

According to still another aspect of the present invention, there is provided a labeled article including the display according to any of the above aspects, and an article supporting the display.

Any method may be used for supporting the article. For example, the display may be bonded to a surface of the article or may be embedded in the article.

According to still another aspect of the present invention, there is provided a labeled article according to the above aspect. This labeled article further includes a printing layer provided on the article.

The printing layer may preferably display the image of the three-dimensional object as a printed image. In this case, the observer can compare the image of the three-dimensional object with the printed image.

According to still another aspect of the present invention, there is provided a labeled article according to the above aspect. In this labeled article, the article is made of plastic, metal, paper, or a composite of these materials.

According to still another aspect of the present invention, there is provided a labeled article according to any of the above aspects. In this labeled article, the article includes paper, while the display is incorporated in the paper, and the paper is open at the position of the display.

According to still another aspect of the present invention, there is provided a labeled article according to any of the above aspects. This labeled article serves as a bank note, security medium, verification medium, credit card, personal authentication medium, such as a passport or ID (identification) card, or a package with contents packed therein.

Second Disclosure

According to an aspect of the present invention, there is provided a display, including a relief structure forming layer having a major surface which is provided with a relief type diffractive structure that displays a facial image including the eye as a diffraction image. In this display, the major surface includes a first region corresponding to the pupil of the eye, and a second region corresponding to at least a part of the iris of the eye; and the diffractive structure includes a first part in the first region, and a plurality of concentrically arranged second parts in the second region.

In this display, the diffractive structure displays a facial image including the eye as a diffraction image. The diffractive structure includes a first part in the first region corresponding to the pupil of the eye, and a plurality of second parts in the second region corresponding to the iris of the eye. The second parts are concentrically arranged. If such a structure is adopted, the facial image displayed as a diffraction image may appear lifelike.

The human brain includes an area of nerve cells which are called "cells responsive to faces (or face cells)". The face cells are said to respond to the eye, nose and mouth particularly sensitively. The face cells enable identification of a person from the entire facial image including not only the eye, nose and mouth, but also the sites surrounding them, such as the cheek, and the contour thereof. The accuracy of the identification is particularly greatly affected by the image of the eye in the facial image.

As described above, this display adopts the above structure in a region in the diffractive structure corresponding to the eye. The image of the eye displayed as a part of a diffraction image by the display adopting such a structure is different from the image of the eye displayed as a part of a diffraction image by a display adopting a different structure. Humans can more easily identify differences between these images. Accordingly, if this display is used, for example, for an anticounterfeiting purpose, remarkable effects may be exerted.

According to another aspect of the present invention, there is provided a display according to the above aspect. In this display, the facial image is an image of a human face. Alternatively, according to another aspect of the present invention, there may be provided a display according to the above aspect. In this display, the facial image is an image of a non-human animal face. The non-human animal may be mammals, birds, reptiles, amphibians, or fish.

According to still another aspect of the present invention, there is provided a display according to any of the above aspects. In this display, the first part occupies the entire first region. Such a structure is suitable for giving an impression to the observer, when observing the image displayed as a diffraction image, that the facial image has a soft appearance.

According to still another aspect of the present invention, there is provided a display according to any of the above aspects. In this display, the first part has a circular shape, an elliptic shape, or a spindle shape. The shape of the pupil in the facial image depends on the animal type, facial orientation, intensity of light incident on the eye, and the like.

According to still another aspect of the present invention, there is provided a display according to any of the above aspects. In this display, the grooves or ridges configuring the diffractive structure have a length direction that is constant between the first part and the plurality of second parts.

If this structure is adopted, diffracted light having strong intensity can emerge from the first part and the second parts in a direction perpendicular to the length direction of the grooves or ridges. Therefore, in the display adopting this structure, the intensity of the diffracted light emerging from the first part and the intensity of the diffracted light emerging from the second parts similarly change when the display is rotated about the axis that is parallel to the direction in which the grooves or ridges are arrayed. In other words, when the diffracted light emerging from the first part is intensified, the diffracted light emerging from the second parts is also intensified. Also, when the diffracted light emerging from the first part is attenuated, the diffracted light emerging from the second parts is also attenuated. Accordingly, the facial image displayed as a diffraction image by the display adopting this structure may more naturally change with the change of observation direction or the lighting directions, compared to a facial image displayed as a diffraction image by a display not adopting this structure.

According to still another aspect of the present invention, there is provided a display according to any of the above aspects. In this display, the grooves or ridges configuring the diffractive structure have a pitch that is constant between the first part and the plurality of second parts. Alternatively, according to still another aspect of the present invention, there may be provided a display according to any of the above aspects. In this display, the grooves or ridges configuring the diffractive structure have a pitch decreasing or increasing from the inner circumference of the second region toward the outer circumference of the second region. Alternatively, according to still another aspect of the present invention, there may be provided a display according to any of the above aspects. In this display, the grooves or ridges configuring the diffractive structure have a pitch decreasing or increasing from the center of the first region toward an outer circumference of the second region.

If the pitch of the grooves or ridges is decreased or increased from a first position toward a second position, the colors of the diffraction image, for example, can be changed between the first and second positions. For example, if the pitch of the grooves or ridges is decreased or increased stepwise from a first position toward a second position, the colors of the diffraction image, for example, can be changed stepwise between the first and second positions. Alternatively, if the pitch of the grooves or ridges is continuously decreased or increased from a first position toward a second position, the colors of the diffraction image, for example, can be continuously changed between the first and second positions. Such a change of colors is similar to the change of colors and brightness of the iris. Accordingly, if the pitch of the grooves or ridges configuring the diffractive structure is changed at least in the second region as described above, the facial image displayed as a diffraction image may appear more lifelike.

According to still another aspect of the present invention, there is provided a display according to any of the above aspects. In this display, the major surface further includes a third region corresponding to the sclera of the eye; the diffractive structure further includes a plurality of third parts concentrically arranged in the third region; and a ratio of a total area of the plurality of third parts to an area of the third region is smaller than a ratio of a total area of the plurality of second parts to an area of the second region.

In facial images of some animals, the sclera (the white part of the eye) cannot be seen, being hidden behind the eyelids. In facial images of some other animals, part of the sclera can be seen without being hidden behind the eyelids. If the above structure is used in the latter case, the eye in a diffraction image may appear more stereoscopic. Therefore, the facial image displayed as a diffraction image may appear lifelike.

According to still another aspect of the present invention, there is provided a display according to the above aspect. In this display, the plurality of third parts each have a width that is smaller than the width of each of the plurality of second parts. This structure is suitable for making the ratio of the total area of the plurality of third parts to the area of the third region smaller than the ratio of the total area of the plurality of second parts to the area of the second region. If this structure is adopted, the plurality of third parts may each preferably have a width in the range of 10% to 70% of the width of each of the plurality of second parts.

According to still another aspect of the present invention, there is provided a display according to any of the above aspects. In this display, the ratio of the total area of the plurality of third parts to the area of the third region is in the range of 20% to 50%. If this ratio is larger than this, the portion of the diffraction image corresponding to the third region is difficult to be perceived as the white part of the eye, as a result of comparison with the pupil and the iris. If this ratio is small, the observer may be less likely to perceive a lifelike effect from the facial image displayed as a diffraction image.

According to still another aspect of the present invention, there is provided a display according to the above aspect. In this display, the interval between the plurality of adjacent third parts is smaller than the interval between the plurality of adjacent second parts. This structure is suitable for making the ratio of the total area of the plurality of third parts to the area of the third region smaller than the ratio of the total area of the plurality of second parts to the area of the second region. If this structure is adopted, the interval between the plurality of adjacent third parts may preferably be in the range of 150% to 1,000% of the interval between the plurality of adjacent second parts.

According to still another aspect of the present invention, there is provided a display according any of the above aspects. In this display, the plurality of second parts defined by solid lines are concentrically arranged, and the plurality of third parts defined by dashed lines are concentrically arranged. This structure is also suitable for making the ratio of the total area of the plurality of third parts to the area of the third region smaller than the ratio of the total area of the plurality of second parts to the area of the second region.

According to still another aspect of the present invention, there is provided a display according to any of the above aspects. In this display, the grooves or ridges configuring the diffractive structure have a length direction that is constant between the plurality of second parts and the plurality of third parts. The facial image displayed as a diffraction image by the display adopting this structure may more naturally change with the change of observation direction or the lighting directions, compared to the facial image displayed as a diffraction image by a display not adopting this structure.

According to still another aspect of the present invention, there is provided a display according to any of the above aspects. In this display, the grooves or ridges configuring the diffractive structure have a pitch that is constant between the first part and the plurality of third parts. Alternatively, according to still another aspect of the present invention, there may be provided a display according to any of the above aspects. In this display, the grooves or ridges configuring the diffractive structure have a pitch that is different between the first part and the plurality of third parts. The latter structure is suitable for displaying colors that are different between the first part and the third parts in a diffraction image.

If the pitch of the grooves or ridges is decreased or increased from a first position toward a second position, the colors of the diffraction image, for example, can be changed between the first and second positions. For example, if the pitch of the grooves or ridges is decreased or increased stepwise from a first position toward a second position, the colors of the diffraction image, for example, can be changed stepwise between the first and second positions. Alternatively, if the pitch of the grooves or ridges is continuously decreased or increased from a first position toward a second position, the colors of the diffraction image, for example, can be continuously changed between the first and second positions. Such a change of colors is similar to the change of colors and brightness of the iris. Accordingly, if the pitch of the grooves or ridges configuring the diffractive structure is changed at least in the second region as described above, the facial image displayed as a diffraction image may appear more lifelike.

According to still another aspect of the present invention, there is provided a display according to any of the above aspects. In this display, the second region corresponds to a part of the iris; the facial image further includes catchlight overlapping a remaining part of the iris; the major surface further includes a fourth region corresponding to the catchlight; the diffractive structure further includes a fourth part in the fourth region; and the fourth part expands crossing two or more adjacent second parts among the plurality of second parts. If this structure is adopted, the eye in a diffraction image may give a stronger impression to the observer. Therefore, the facial image displayed as a diffraction image may appear lifelike.

According to still another aspect of the present invention, there is provided a display according to the above aspect. In this display, the grooves or ridges configuring the diffractive structure have a length direction that is constant between the plurality of second parts and the fourth part. The facial image displayed as a diffraction image by the display adopting this structure may more naturally change with the change of observation direction or the lighting directions, compared to the facial image displayed as a diffraction image by a display not adopting this structure.

According to still another aspect of the present invention, there is provided a display according to any of the above aspects. In this display, the grooves or ridges configuring the diffractive structure have a pitch that is different between the plurality of second parts and the fourth part. This structure is suitable, for example, for making the colors displayed in the second region different from the colors displayed in the fourth region in the diffraction image.

According to still another aspect of the present invention, the fourth part has a maximum diameter larger than the maximum diameter of the first part. If this structure is adopted, the eye in the diffraction image may give a stronger impression to the observer. Therefore, the facial image displayed as a diffraction image may appear lifelike.

According to still another aspect of the present invention, the maximum diameter of the fourth part is in the range of 0.8 times to 1.5 times of the maximum diameter of the first part. If the fourth part is made excessively large, the eye in the diffraction image may be less likely to give a strong impression, or the stereoscopic effect exerted by the eye in the diffraction image may be reduced.

According to still another aspect of the present invention, there is provided a display according to any of the above aspects. In this display, the fourth part has a circular shape, or an elliptic shape.

According to still another aspect of the present invention, there is provided a display according to any of the above aspects. In this display, the distance between a part of the diffractive structure corresponding the inner corner of the eye and a part thereof corresponding to the outer corner of the eye is in the range of 2 mm to 4 mm, and the maximum distance between a part of the diffractive structure corresponding to the upper eyelid and a part thereof corresponding to the lower eyelid is in the range of 1 mm to 1.5 mm.

According to still another aspect of the present invention, there is provided a display according to any of the above aspects. In this display, the first part has a maximum diameter in the range of 30 µm to 100 µm.

According to still another aspect of the present invention, there is provided a display according to any of the above aspects. In this display, the plurality of second parts each have a constant width throughout the circumference or length thereof.

According to still another aspect of the present invention, there is provided a display according to any of the above aspects. In this display, the plurality of second parts have widths equal to each other.

According to still another aspect of the present invention, there is provided a display according to any of the above aspects. In this display, the plurality of second parts each have a width in the range of 20 µm to 80 µm.

According to still another aspect of the present invention, there is provided a display according to any of the above aspects. In this display, two adjacent second parts among the plurality of second parts have a distance therebetween in the range of 5 µm to 100 µm.

According to still another aspect of the present invention, there is provided a display according to any of the above aspects. In this display, the plurality of third parts each have a constant width throughout the circumference or length thereof.

According to still another aspect of the present invention, there is provided a display according to any of the above aspects. In this display, the plurality of third parts have widths equal to each other.

According to still another aspect of the present invention, there is provided a display according to any of the above aspects. In this display, the plurality of third parts each have a width in the range of 2 µm to 20 µm.

According to still another aspect of the present invention, there is provided a display according to any of the above aspects. In this display, two adjacent third parts among the plurality of third parts have a distance therebetween in the range of 15 µm to 500 µm.

According to still another aspect of the present invention, there is provided a display according to any of the above aspects. In this display, the diffractive structure is configured to display a multicolor image as the diffraction image.

This display may also be configured to display a monochromatic image as a diffraction image, or may be configured to display a multicolor image as a diffraction image.

According to still another aspect of the present invention, there is provided a display according to any of the above aspects. In this display, the diffractive structure includes a diffraction grating including a plurality of grooves or ridges arrayed in a width direction thereof. The plurality of grooves or ridges may preferably have a pitch in the range of 500 nm to 2,000 nm.

Examples of the materials used for the relief structure forming layer may include thermoplastic resins, thermosetting resins, and ultraviolet- or radiation-curable resins. As the thermoplastic resins, acrylic resins, epoxy resins, cellulose resins or vinyl resins may be used, for example. As the thermosetting resins, for example, urethane resins in which polyisocyanate as a cross-linking agent is added, for cross-linkage, to acrylic polyol or polyester polyol having a reactive hydroxyl group, melamine resins, or phenol resins may be used. As the ultraviolet- or radiation-curable resins, for example, acrylic resins may be used. Examples of the acrylic resins may include epoxy acrylate, epoxy methacrylate, urethane acrylate, and urethane methacrylate.

The relief structure forming layer can be formed, for example, through the following process. For example, an original plate provided with a relief structure may be pressed against a thermoplastic resin layer with application of heat, and then the original plate may be removed from the thermoplastic resin layer. Alternatively, a coating film of an ultraviolet-curable resin may be formed, against which an original plate may be pressed with application of ultraviolet light to cure the ultraviolet-curable resin, and then the original plate may be removed from the coating film. Alternatively, a coating film of a thermosetting resin may be formed, against which an original plate may be pressed with application of heat to cure the thermosetting resin, and then the original plate may be removed from the coating film. The relief structure forming layer may have a thickness in the range, for example, of 1 µm or more and 25 µm or less.

According to still another aspect of the present invention, there is provided a display according to any of the above aspects. This display further includes a reflective layer at least partially covering the major surface. Provision of the reflective layer may improve visibility of the diffraction image.

According to still another aspect of the present invention, there is provided a display according to the above aspect. In this display, the reflective layer covers a region of the major surface provided with the diffractive structure, but does not cover a region adjacent to the region provided with the diffractive structure. If this structure is adopted, visibility of the diffraction image may be further improved. Furthermore, if this structure is adopted, an image corresponding to the pattern in the reflective layer can be visually recognized under the conditions in which the diffraction image cannot be visually recognized.

If the reflective layer covers only a part of the major surface, the diffractive structure may correspond to a portion covered with the reflective layer and allowing diffracted light to emerge, in the relief structure provided to the major surface. Also, if the reflective layer covers the entire major surface, the diffractive structure may correspond to a portion allowing diffracted light to emerge, in the relief structure provided to the major surface.

As the reflective layer, a layer made of a metal material, such as aluminum, silver, gold or an alloy thereof, may be used. Alternatively, the reflective layer may be a dielectric layer having a refractive index different from that of the relief structure forming layer. Alternatively, the reflective layer may be a laminate of dielectric layers, i.e., a dielectric multilayer film, with the refractive index being different between adjacent dielectric layers. Of the dielectric layers included in the dielectric multilayer film, the layer contacting the relief structure forming layer may preferably have a refractive index different from that of the relief structure forming layer. For example, the reflective layer can be formed using a vapor-phase deposition method, such as vacuum vapor deposition or sputtering. Inorganic or organic compounds may be used for the dielectric layer or the dielectric multilayer film.

Examples of the inorganic compounds may include oxides, sulfides, and nitrides. Examples of the oxides may include metal oxides, and silicon oxide (SiO). As the nitrides, for example, metal nitrides may be used. As the sulfides, for example, metal sulfides may be used. Examples of the metal oxides may include titanium oxide (TiO), zinc oxide (ZnO), and alumina. Examples of the sulfides may include zinc sulfide (ZnS) and aluminum sulfide (AlS). As the nitrides, calcium nitride (CaN) may be used.

The surface of the reflective layer facing away from the relief structure may be provided with a reflective protection layer. The reflective protection layer may be formed as a layer having apertures at portions. Using this reflective protection layer as an etching mask, portions of the reflective layer not covered with the reflective protection layer may be selectively etched away to obtain a reflective layer partially covering the relief structure surface.

The reflective protection layer may be made, for example, of an inorganic compound, a polymer or a combination thereof. As the inorganic compound, for example, an oxide or a nitride may be used. Examples of the oxide may include silicon oxide (SiO), and alumina, and examples of the nitride may include calcium nitride (CaN), titanium nitride (TiN), and aluminum nitride (AlN). The polymer may be, for example, a urethane resin or an acrylic resin.

The reflective layer may have a thickness in the range, for example, of 10 nm or more and 500 nm or less.

According to still another aspect of the present invention, there is provided a transfer foil which is provided with a transfer material layer including the display according to any of the above aspects, and a support separably supporting the transfer material layer.

According to an example, the transfer material layer includes a transfer portion and a non-transfer portion, which are adjacent to each other. In the transfer material layer, the transfer portion is a portion transferred to an article and includes the above display. In the transfer material layer, the non-transfer portion is a portion remaining without being transferred to the article. The non-transfer portion has a layer configuration similar to that of the transfer portion.

For example, the support may be a film or sheet made of a resin. For example, the support may be made of a material, such as polyethylene terephthalate, having good heat resistance. The support supporting the transfer material layer may have a major surface provided with a release layer comprising, for example, a fluororesin or a silicone resin. The support may have a thickness in the range of 4 μm or more and 50 μm or less.

According to still another aspect of the present invention, there is provided a transfer foil according to the above aspect. In this transfer foil, the transfer material layer further includes a separation protective layer interposed between the display and the support.

The separation protective layer enhances separation of the transfer portion from the support, while protecting the surface of the separated transfer portion, i.e., the display, from damage or deterioration. For example, the separation protective layer may have optical transparency. For example, the separation protective layer may be made of a resin. The resin forming the separation protective layer may be, for example, an ultraviolet cured resin, thermoset resin, or thermoplastic resin. For example, this resin may be an acrylic resin. The separation protective layer may have a thickness in the range, for example, of 0.5 μm or more and 5 μm or less.

According to still another aspect of the present invention, there is provided a transfer foil further including an adhesive layer covering the transfer material layer.

The adhesive layer may be made, for example, of a thermoplastic resin. Examples of the thermoplastic resin may include polyethylene resins, polyester resins, acrylic resins, and olefin resins. The adhesive layer may have a thickness in the range, for example, of 0.5 μm or more and 20 μm or less.

According to still another aspect of the present invention, there is provided an adhesive label including the display according to any of the above aspects, and an adhesive layer provided to one major surface of the display.

The adhesive layer is made of an adhesive, such as a pressure sensitive adhesive. Examples of the adhesive may include vinyl chloride-vinyl acetate copolymers, polyester polyamides, acrylic adhesives, butyl rubber adhesives, natural rubber adhesives, silicone adhesives, and polyisobutyl adhesives.

The adhesive may further contain additives. Examples of the additive may include aggregating components, such as alkyl methacrylate, vinyl ester, acrylonitrile, styrene, and vinyl monomer; reforming components, such as unsaturated carboxylic acid, hydroxy group-containing monomers, and acrylonitrile; polymerization initiators; plasticizers; curing agents; curing accelerators; antioxidants; and a mixture containing two or more of these materials.

According to still another aspect of the present invention, there is provided a labeled article including the display according to any of the above aspects, and an article supporting the display.

Any method may be used for supporting the article. For example, the display may be bonded to a surface of the article or may be embedded in the article.

According to still another aspect of the present invention, there is provided a labeled article according to the above aspect. This labeled article further includes a printing layer provided to the article.

The printing layer may preferably display the image of the three-dimensional object as a printed image. In this case, the observer can compare the image of the three-dimensional object with the printed image.

According to still another aspect of the present invention, there is provided a labeled article according to the above aspect. In this labeled article, the article is made of plastic, metal, paper, or a composite of these materials.

According to still another aspect of the present invention, there is provided a labeled article according to any of the above aspects. In this labeled article, the article includes paper, while the display is incorporated in the paper, and the paper is open at the position of the display.

According to still another aspect of the present invention, there is provided a labeled article according to any of the above aspects. This labeled article serves as a bank note, security medium, verification medium, credit card, personal authentication medium, such as a passport or ID (identification) card, or a package with contents packed therein.

Third Disclosure

The third disclosure is a combination of the first disclosure and the second disclosure.

According to an aspect of the present invention, there is provided a display according to any of the aspects of the first disclosure. In this display, the image of the three-dimensional object includes one or more images of persons and animals, and has features of one or more aspects of the second disclosure.

According to another aspect of the present invention, there is provided a transfer foil according to any of the aspects of the first disclosure. In this transfer foil, the image of the three-dimensional object includes one or more images of persons and animals, and has features of one or more aspects of the second disclosure.

According to still another aspect of the present invention, there is provided an adhesive label according to any of the aspects of the first disclosure. In this adhesive label, the image of the three-dimensional object includes one or more images of persons and animals, and has features of one or more aspects of the second disclosure.

According to still another aspect of the present invention, there is provided a labeled article according to any of the aspects of the first disclosure. In this labeled article, the image of the three-dimensional object includes one or more images of persons and animals, and has features of one or more aspects of the second disclosure.

The image of the three-dimensional object may preferably include a portrait, or in particular, a facial image of a person. The first and second regions, or the first to third regions referred to regarding the first disclosure may preferably be arranged in a region corresponding to the face of a person, more preferably in a region corresponding to the facial skin of a person, and even more preferably at positions corresponding to one or more of the nose, cheek, forehead, temple, area between the eyebrows, upper eyelid, lower eyelid, mouth and jaw.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Disclosure

Figure 1:
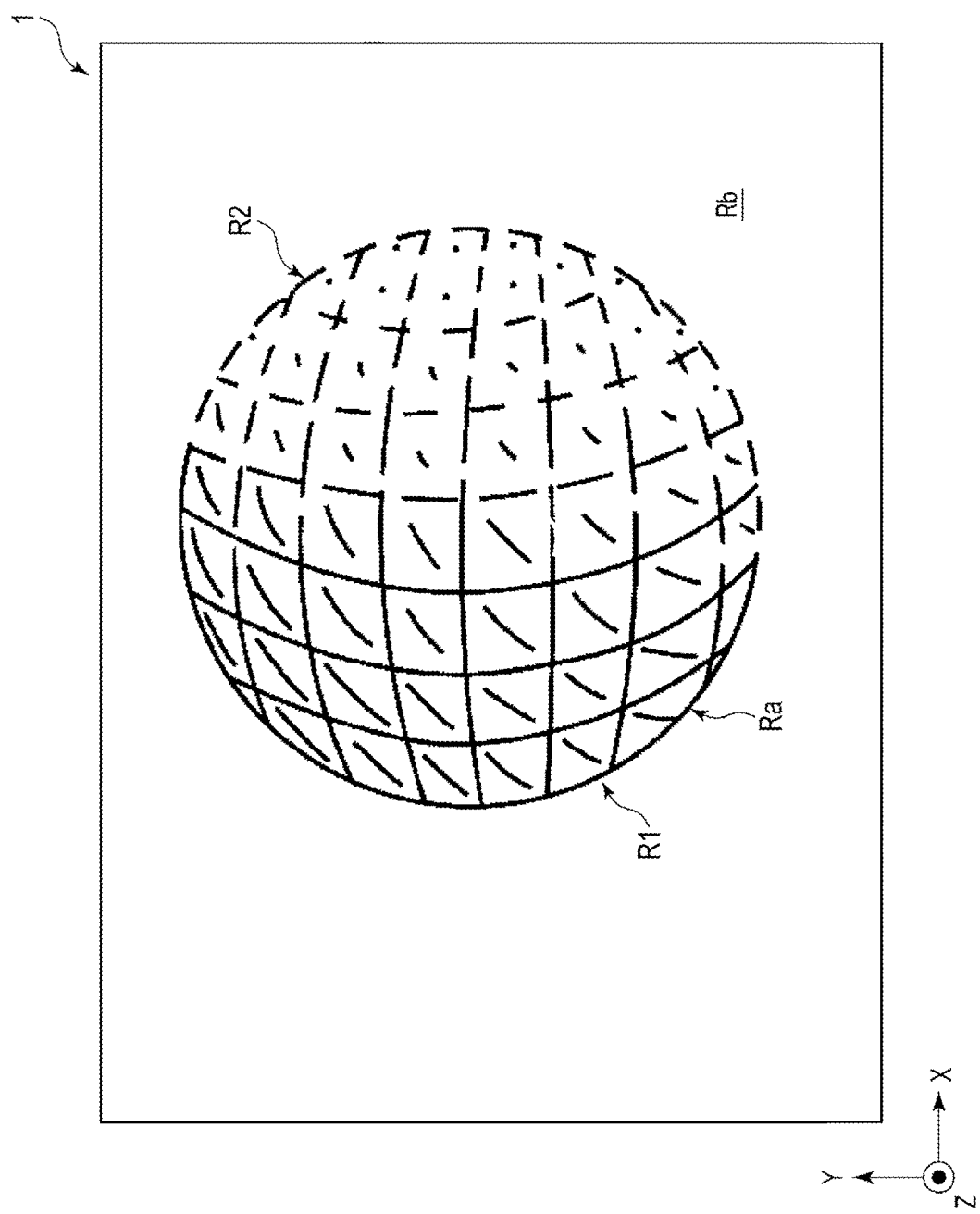
FIG. 1 is a schematic plan view illustrating a display according to a first embodiment of the present invention.
Figure 2:
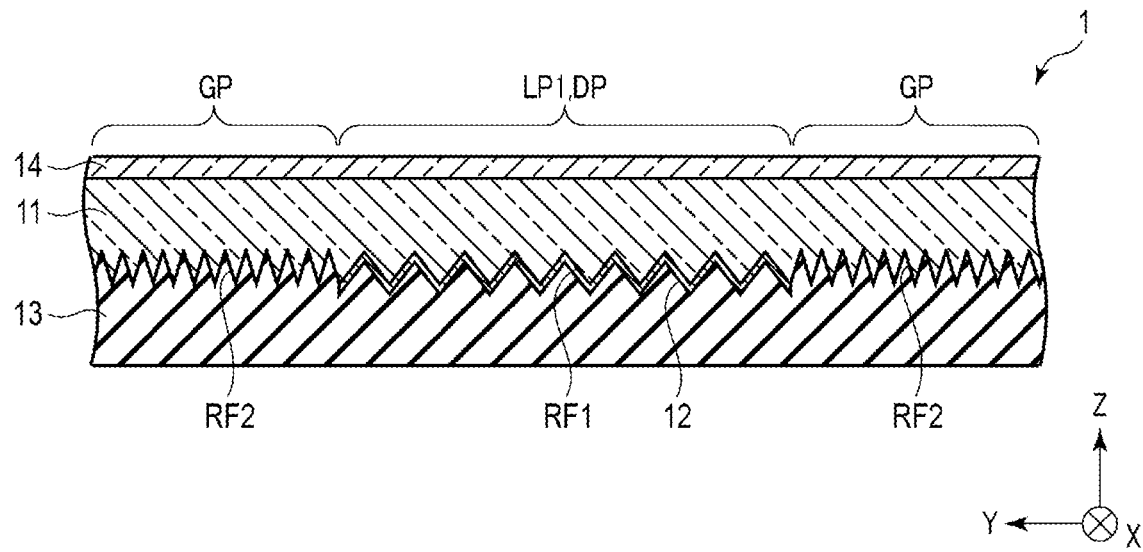
FIG. 2 is a cross-sectional view illustrating the display shown in FIG. 1.
Figure 3:
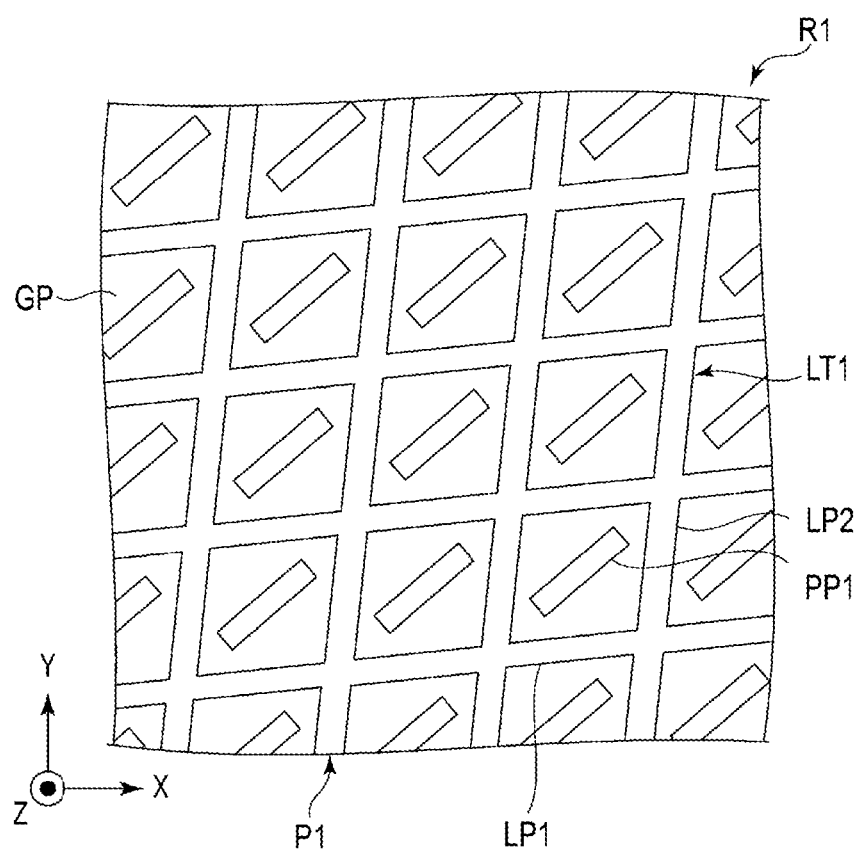
FIG. 3 is a schematic plan view illustrating a first region in the display shown in FIGS. 1 and 2.
Figure 4:
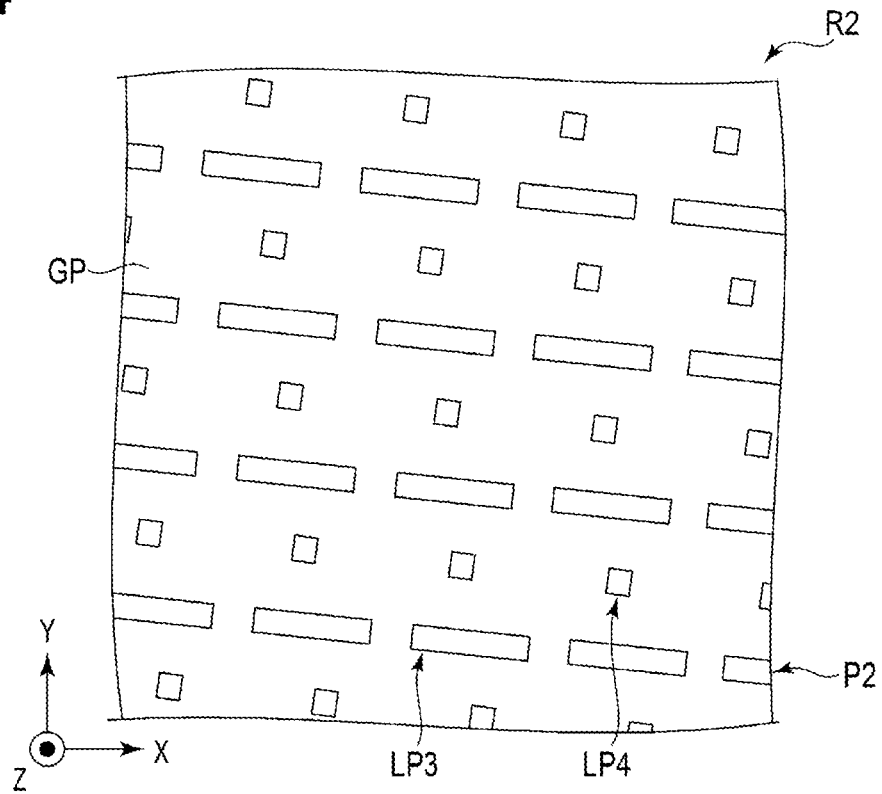
FIG. 4 is a schematic plan view illustrating a second region in the display shown in FIGS. 1 and 2.

FIG. 1 is a schematic plan view illustrating a display according to a first embodiment of the present invention. FIG. 2 is a cross-sectional view illustrating the display shown in FIG. 1. FIG. 3 is a schematic plan view illustrating a first region in the display shown in FIGS. 1 and 2. FIG. 4 is a schematic plan view illustrating a second region in the display shown in FIGS. 1 and 2.

Herein, the X and Y directions are parallel to a major surface of a display 1 and are perpendicular to each other. The Z direction is perpendicular to the X and Y directions and corresponds to the thickness direction of the display 1.

The display 1 shown in FIGS. 1 and 2 includes, as shown in FIG. 2, a relief structure forming layer 11 and a reflective layer 12. In the display 1, the relief structure forming layer 11 side is the front side facing the observer, and the reflective layer 12 side is the rear side. In the display 1, the reflective layer 12 side may be the front side facing the observer, and the relief structure forming layer 11 side may be the rear side. In both cases, the reflective layer 12 is disposed to contact a relief surface of the relief structure forming layer 11.

The relief structure forming layer 11 has one major surface including a region Ra where a relief type diffractive structure RF1 is provided, and another region Rb. The relief surface mentioned above is the major surface where the diffractive structure RF1 of the relief structure forming layer 11 is provided.

The relief type diffractive structure RF1 includes a plurality of grooves or ridges arrayed in the width direction thereof. These grooves or ridges configure the relief type diffractive structure RF1, e.g., a relief type diffraction grating.

The relief type diffractive structure RF1 displays an image of a three-dimensional object as a diffraction image. The diffraction image herein is an image displayed by diffracted light. The three-dimensional object herein is a sphere to which light is applied from the right.

The major surface of the relief structure forming layer 11 having the region Ra which is provided with the diffractive structure RF1 includes, as shown in FIG. 1, a first region R1 and a second region R2.

As shown in FIG. 1, in the major surface of the relief structure forming layer 11, the first region R1 corresponds to a portion of the sphere in the diffraction image. As shown in FIG. 3, the first region R1 includes a plurality of first linear parts LP1, a plurality of second linear parts LP2, a plurality of first parts PP1, and a plurality of gaps GP. A portion of the diffractive structure RF1 shown in FIG. 2, which is the portion in the first region R1 shown FIG. 1, forms a first pattern P1, as shown in FIG. 3, including the plurality of first linear parts LP1, the plurality of second linear parts LP2, and the plurality of first parts PP1.

The first linear parts LP1, each having a solid line shape, are arrayed in the width direction thereof. The second linear parts LP2 each have a solid line shape. The second linear parts LP2 are arrayed in the width direction thereof and intersect the first linear parts LP1 to form a first lattice LT1 together with the first linear parts LP1. The first parts PP1 each have a solid line shape. The first parts PP1 may each have a dot shape. The first parts PP1 are arranged in the respective gaps in the first lattice LT1.

The first linear parts LP1, the second linear parts LP2, and the first parts PP1 each include the grooves or ridges mentioned above. These grooves or ridges are arrayed in the width direction thereof and configure a part of the relief type diffractive structure RF1 shown in FIG. 2, e.g., a relief type diffraction grating.

According to an example, an array of the first linear parts LP1, the second linear parts LP2, and the first parts PP1 in at least one first region R1 shown in FIGS. 1 and 3 is configured to display substantially the same color overall in a diffraction image. According to another example, this array may be configured to gradually change color in any of the directions in the diffraction image.

As shown in FIG. 3, the gaps GP in the first region R1 are portions adjacent to the first pattern P1 in the first region R1. These gaps GP may each have a flat surface, or, as shown in FIG. 2, may each have a surface provided with a relief structure RF2. According to an example, the relief structure RF2 is perpendicular to the Z direction and includes a plurality of concavities or convexities arrayed in two intersecting directions. According to another example, the relief structure RF2 may include a plurality of randomly arranged concavities or convexities. These concavities or convexities have a higher ratio of depth or height to width compared, for example, to the grooves or ridges forming the diffractive structure RF1. Also, these concavities or convexities have a smaller center-to-center distance compared, for example, to the grooves or ridges forming the diffractive structure RF1. By providing the relief structure RF2, a patterned reflective layer 12, for example, can be easily obtained.

As shown in FIG. 1, in the major surface of the relief structure forming layer 11, the second region R2 corresponds to another portion of the sphere in the diffraction image. As shown in FIG. 4, the second region R2 includes a plurality of third linear parts LP3, a plurality of fourth linear parts LP4, and gaps GP. A portion of the diffractive structure RF1 shown in FIG. 2, which is the portion in the second region R2 shown in FIGS. 1 and 4, forms a second pattern P2, as shown in FIG. 4, including the plurality of third linear parts LP3, and the plurality of fourth linear parts LP4.

The third linear parts LP3 each have a dashed line shape. The fourth linear parts LP4 each have a dotted line shape. The third linear parts LP3 and the fourth linear parts LP4 are alternately arranged in the width direction thereof. The fourth linear parts LP4 may each have a dashed line shape. Alternatively, one or more fourth linear parts LP4 may each have a dotted line shape and the rest of them may each have a dashed line shape.

The third linear parts LP3 and the fourth linear parts LP4 each include the grooves or ridges mentioned above. These grooves or ridges are arrayed in the width direction thereof and configure another part of the relief type diffractive structure RF1 shown in FIG. 2, e.g., a relief type diffraction grating.

According to an example, an array of the third linear parts LP3 and the fourth linear parts LP4 in at least one second region R2 shown in FIGS. 1 and 4 is configured to display substantially the same color overall in a diffraction image. According to another example, this array may be configured to gradually change color in any of the directions in the diffraction image. In any of the examples, it is preferable that, of the first and second linear parts LP1 and LP2, and the first parts PP1 in the first region R1, and the third and fourth linear parts LP3 and LP4 in the second region R2, those which are located near the boundary between the first and second regions R1 and R2 display substantially the same color in a diffraction image.

Two or more third and fourth linear parts LP3 and LP4 in the second pattern P2 shown in FIG. 4 have a width direction matching that of the first linear parts LP1 in the first pattern P1 shown in FIG. 3. When the second region R2 shown in FIG. 4 has an area expressed by $S_2$ and the second pattern P2 therein has an area expressed by $S_{P2}$, and when the first region R1 shown in FIG. 3 has an area expressed by $S_1$ and the first pattern P1 therein has an area expressed by $S_{P1}$, the ratio $S_{P2}/S_2$ is smaller than the ratio $S_{P1}/S_1$.

As shown in FIG. 4, the gaps GP in the second region R2 are portions adjacent to the second pattern P2 in the second region R2. These gaps GP can have a structure similar, for example, to that of the gaps GP in the first region R1.

The region Ra shown in FIG. 1 may further include one or more third to fifth regions explained below.

Figure 5:
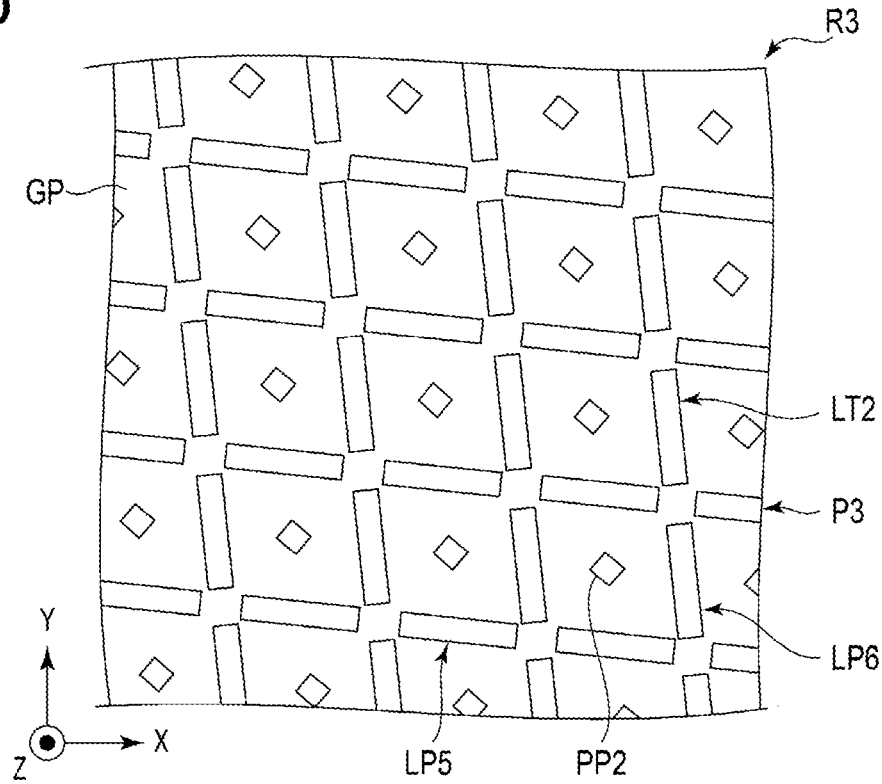
FIG. 5 is a schematic plan view illustrating an example of a third region that may be provided in the display shown in FIGS. 1 and 2.
Figure 6:
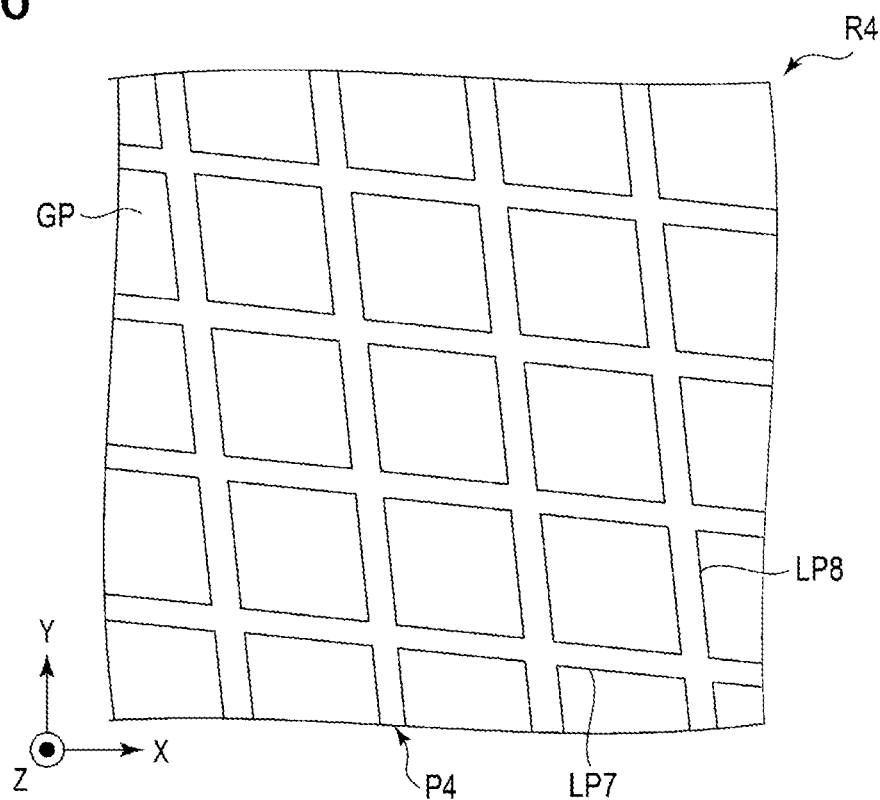
FIG. 6 is a schematic plan view illustrating an example of a fourth region that may be provided in the display shown in FIGS. 1 and 2.
Figure 7:
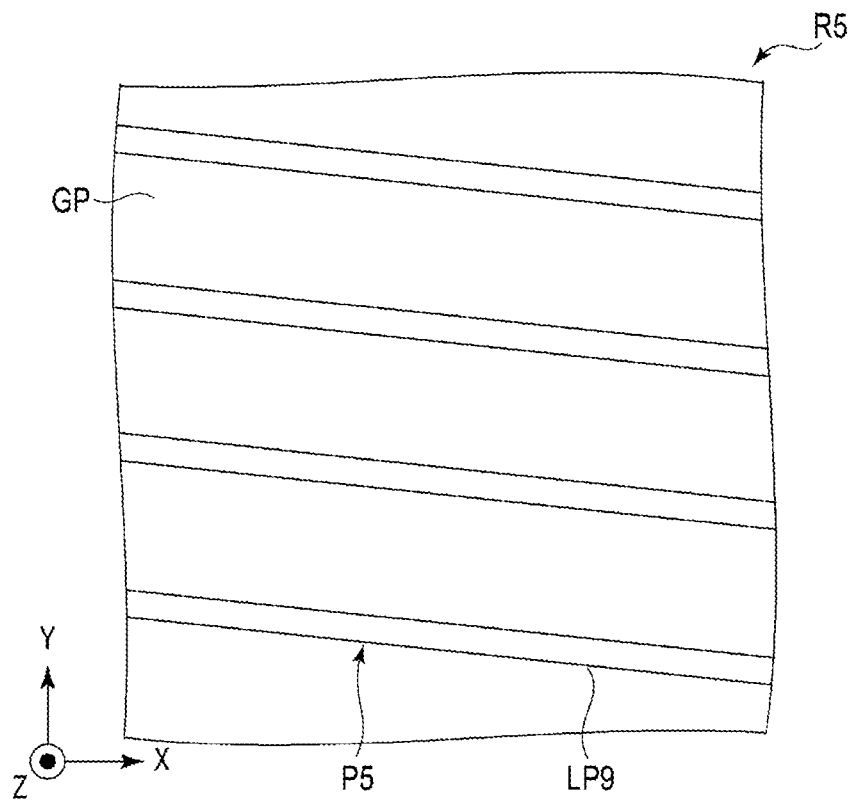
FIG. 7 is a schematic plan view illustrating an example of a fifth region that may be provided in the display shown in FIGS. 1 and 2.

FIG. 5 is a schematic plan view illustrating an example of a third region that may be provided in the display shown in FIGS. 1 and 2. FIG. 6 is a schematic plan view illustrating an example of a fourth region that may be provided in the display shown in FIGS. 1 and 2. FIG. 7 is a schematic plan view illustrating an example of a fifth region that may be provided in the display shown in FIGS. 1 and 2.

FIG. 5 shows a third region R3 including a plurality of fifth linear parts LP5, a plurality of sixth linear parts LP6, a plurality of second parts PP2, and gaps GP. The fifth linear parts LP5, the sixth linear parts LP6, and the second parts PP2 each include the grooves or ridges mentioned above. These grooves or ridges are arrayed in the width direction thereof and can configure a part of the relief type diffractive structure RF1 shown in FIG. 2, e.g., a relief type diffraction grating. In this case, a portion of the diffractive structure RF1 shown in FIG. 2, which is the portion in the third region R3 shown in FIG. 5, forms a third pattern P3, as shown in FIG. 5, including the plurality of fifth linear parts LP5, the plurality of sixth linear parts LP6, and the plurality of second parts PP2.

The fifth linear parts LP5, each having a dashed line shape, are arrayed in the width direction thereof. The fifth linear parts LP5 may each have a solid line shape. The sixth linear parts LP6 each have a dashed line shape. The sixth linear parts LP6 may each have a dotted line shape. The sixth linear parts LP6 are arrayed in the width direction thereof and intersect the fifth linear parts LP5 to form a second lattice LT2 together with the fifth linear parts LP5. The second parts PP2 each have a dot shape. The second parts PP2 may each have a linear shape. The second parts PP2 are arranged in the respective gaps of the second lattice LT2.

For example, the third region R3 can be provided between the first and second regions R1 and R2 shown in FIG. 1. In this case, in the major surface of the relief structure forming layer 11, the third region R3 corresponds to still another portion of the sphere in the diffraction image.

According to an example, an array of the fifth linear parts LP5, the sixth linear parts LP6, and the second parts PP2 in at least one third region R3 shown in FIGS. 1 and 5 is configured to display substantially the same color overall in a diffraction image. According to another example, this array may be configured to gradually change color in any of the directions in the diffraction image. In any of the examples, it is preferable that, of the first and second linear parts LP1 and LP2, the first parts PP1, the fifth and sixth linear parts LP5 and LP6, and the second parts PP2, those which are located near the boundary between the first and third regions R1 and R3 display substantially the same color in the diffraction image. Also, it is preferable that, of the third, fourth, fifth and sixth linear parts LP3, LP4, LP5 and LP6, and the second parts PP2, those which are located near the boundary between the second and third regions R2 and R3 display substantially the same color in a diffraction image.

The third pattern P3 shown in FIG. 5 is provided so that, for example, one or more first linear parts LP1 shown in FIG. 3 and one or more third linear parts LP3 shown in FIG. 4 are located on respective extension lines of one or more fifth linear parts LP5 shown in FIG. 5. When the third region R3 shown in FIG. 5 has an area expressed by $S_3$ and the third pattern P3 therein has an area expressed by $S_{P3}$, when the first region R1 shown in FIG. 3 has an area expressed by $S_1$ and the first pattern P1 shown therein has an area expressed by $S_{P1}$, and when the second region R2 shown in FIG. 4 has an area expressed by $S_2$ and the second pattern P2 therein has an area expressed by $S_{P2}$, the ratio $S_{P3}/S_3$ is smaller, for example, than the ratio $S_{P1}/S_1$ and larger than the ratio $S_{P2}/S_2$.

As shown in FIG. 5, the gaps GP in the third region R3 are portions adjacent to the third pattern P3 in the third region R3. These gaps GP can have a structure similar, for example, to that of the gaps GP in the first region R1.

FIG. 6 shows a fourth region R4 including a plurality of seventh linear parts LP7, a plurality of eighth linear parts LP8, and gaps GP. The seventh linear parts LP7 and the eighth linear parts LP8 each include the grooves or ridges mentioned above. These grooves or ridges are arrayed in the width direction thereof and can configure a part of the relief type diffractive structure RF1 shown in FIG. 2, e.g., a relief type diffraction grating. In this case, a portion of the diffractive structure RF1 shown in FIG. 2, which is the portion in the fourth region R4 shown in FIG. 6, forms a fourth pattern P4, as shown in FIG. 6, including the plurality of seventh linear parts LP7, and the plurality of eighth linear parts LP8.

The seventh linear parts LP7, each having a solid line shape, are arrayed in the width direction thereof. The seventh linear parts LP7 may each have a dashed line shape or a dotted line shape. The eighth linear parts LP8, each having a solid line shape, are arrayed in the width direction thereof. The eighth linear parts LP8 may each have a dashed line shape or a dotted line shape. The eighth linear parts LP8 intersect the seventh linear parts LP7 to form a third lattice together with the seventh linear parts LP7.

For example, the fourth region R4 can be disposed adjacent to the first region R1 shown in FIGS. 1 and 3.

According to an example, an array of the seventh linear parts LP7, and the eighth linear parts LP8 in at least one fourth region R4 shown in FIG. 6 is configured to display substantially the same color overall in a diffraction image. According to another example, this array may be configured to gradually change color in any of the directions in the diffraction image. In any of the examples, it is preferable that, of the first and second linear parts LP1 and LP2, the first parts PP1, and the seventh and eighth linear parts LP7 and LP8, those which are located near the boundary between the first and fourth regions R1 and R4 display substantially the same color in a diffraction image.

The fourth pattern P4 shown in FIG. 6 is provided so that, for example, one or more seventh linear parts LP7 are located on respective extension lines of one or more first linear parts LP1 or one or more second linear parts LP2 shown in FIG. 3. When the fourth region R4 shown in FIG. 6 has an area expressed by $S_4$ and the fourth pattern P4 therein has an area expressed by $S_{P4}$, and when the first region R1 shown in FIG. 3 has an area expressed by $S_1$ and the first pattern P1 therein has an area expressed by $S_{P1}$, the ratio $S_{P4}/S_4$ is smaller than the ratio $S_{P1}/S_1$. If at least either the seventh linear parts LP7 or the eighth linear parts LP8 each have a dashed line shape or a dotted line shape, the ratio of the gaps per unit length of the seventh linear parts LP7 may be equal to or different from the ratio of the gaps per unit length of the eighth linear parts LP8.

As shown in FIG. 6, the gaps GP in the fourth region R4 are portions adjacent to the fourth pattern P4 in the fourth region R4. These gaps GP can have a structure similar, for example, to that of the gaps GP in the first region R1.

FIG. 7 shows a fifth region R5 including a plurality of ninth linear parts LP9, and gaps GP. The ninth linear parts LP9 each include the grooves or ridges mentioned above. These grooves or ridges are arrayed in the width direction thereof and can configure a part of the relief type diffractive structure RF1 shown in FIG. 2, e.g., a relief type diffraction grating. In this case, a portion of the diffractive structure RF1 shown in FIG. 2, which is the portion in the fifth region R5 shown in FIG. 7, forms a fifth pattern P5, as shown in FIG. 7, including the plurality of ninth linear parts LP9.

The ninth linear parts LP9, each having a solid line shape, are arrayed in the width direction thereof. The ninth linear parts LP9 may each have a dashed line shape or a dotted line shape. The fifth pattern P5 may be used, for example, for expressing hair in a diffraction image.

As shown in FIG. 7, the gaps GP in the fifth region R5 are portions adjacent to the fifth pattern P5 in the fifth region R5. These gaps GP can have a structure similar, for example, to that of the gaps GP in the first region R1.

The reflective layer 12 shown in FIG. 2 covers only the first, second, third and fourth linear parts LP1, LP2, LP3 and LP4, and the first parts PP1 shown in FIGS. 3 and 4, on the surface of the relief structure forming layer 11 where the relief structure is provided.

As shown in FIG. 2, the display 1 shown in FIGS. 1 and 2 further includes a protective layer 14.

The protective layer 14 is provided to a major surface of the relief structure forming layer 11 facing away from the major surface provided with the reflective layer 12. The protective layer 14 is a transparent resin layer. The protective layer 14 protects the relief structure forming layer 11 or other components from physical damage, chemicals, or the like. Low adhesion of the protective layer 14 to the substrate of a transfer foil described later can facilitate transfer of the display elements. Materials that can be used for the protective layer 14 may be, for example, acrylic resins or epoxy resins. These materials may be used by mixing a polyester thereto to control adhesion.

The reflective layer 12 side surface of the display 1 is provided with an adhesive layer 13. The adhesive layer 13 fixes the display 1 to another article, while protecting the relief surface of the relief structure forming layer 11 and the reflective layer 12.

Figure 8:
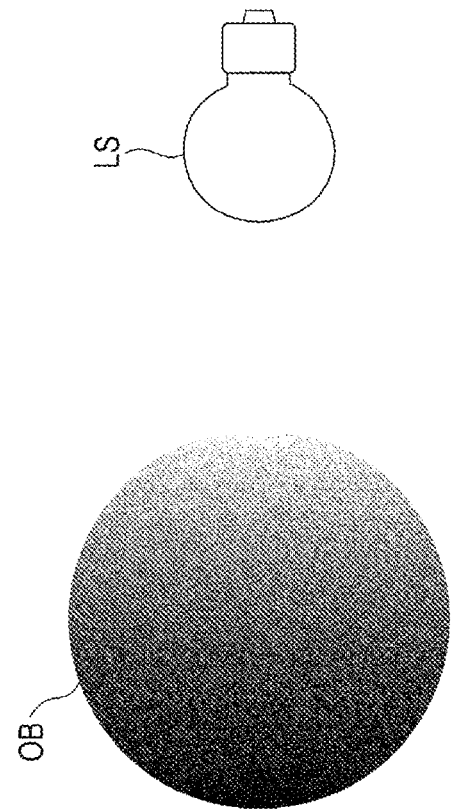
FIG. 8 is a schematic diagram illustrating lighting conditions for capturing an original image of an image to be displayed by the display shown in FIGS. 1 and 2.

FIG. 8 is a schematic diagram illustrating lighting conditions for capturing an original image of an image to be displayed by the display shown in FIGS. 1 and 2.

FIG. 8 illustrates a state where a spherical three-dimensional object OB is lit by a light source LS. As shown in FIG. 8, when the spherical three-dimensional object OB is lit from the right, the right side of the three-dimensional object OB looks bright while the left side thereof looks dark.

Figure 9:
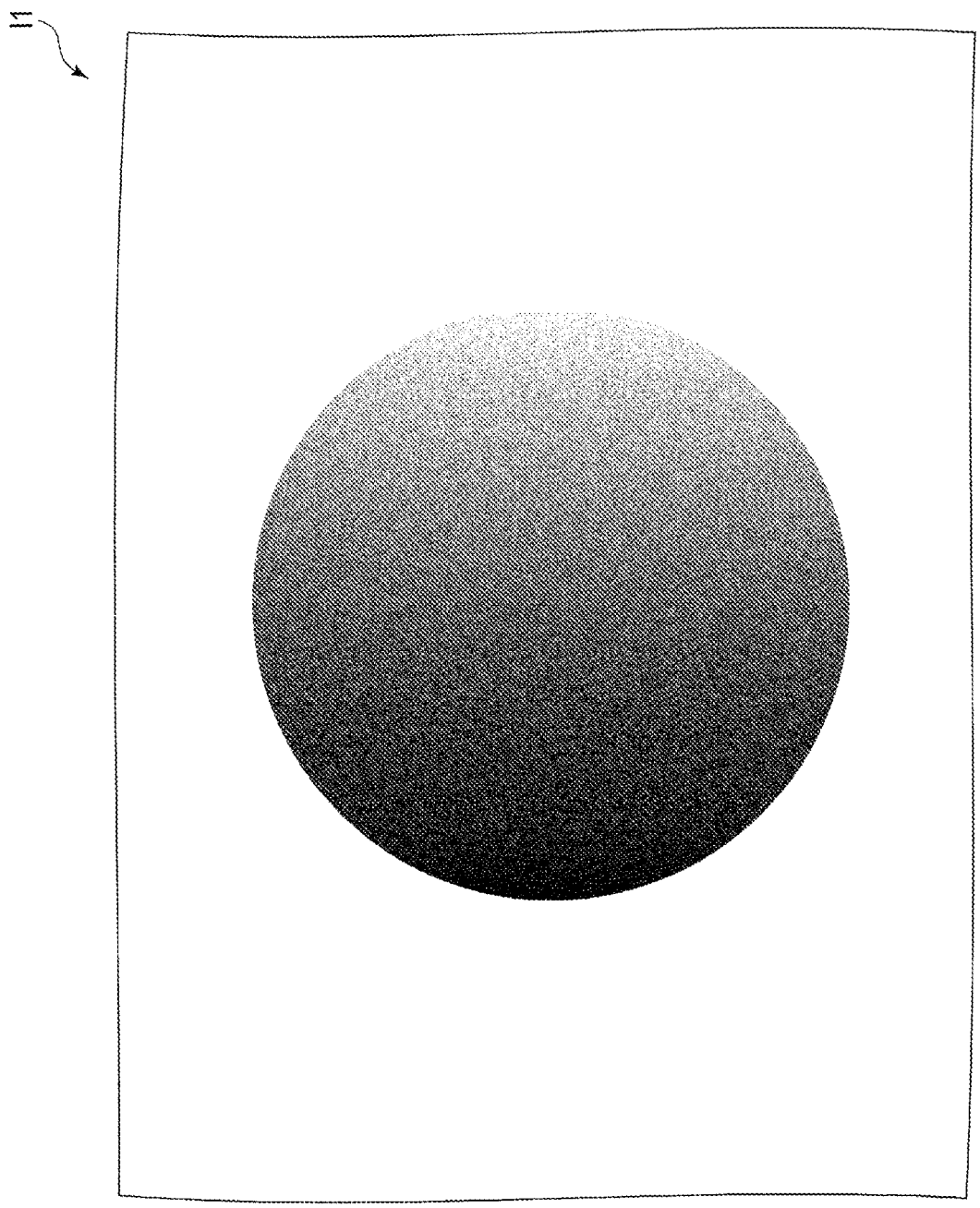
FIG. 9 shows an image displayed by the display shown in FIGS. 1 and 2 under conditions in which neither diffracted light nor specular light is observed.

FIG. 9 shows an image displayed by the display shown in FIGS. 1 and 2 under the conditions in which neither diffracted light nor specular light is observed. It should be noted that FIG. 9 shows an image displayed by the display 1 in the case where the adhesive layer 13 is transparent and the display 1 is placed on the surface of paper or the like having light scattering properties such that the adhesive layer 13 is brought into contact with the light scattering surface.

As stated above, in the display 1 shown in FIGS. 1 and 2, the adhesive layer 13 and the protective layer 14 shown in FIG. 2 are transparent. Furthermore, the reflective layer 12 covers only the first, second, third and fourth linear parts LP1, LP2, LP3 and LP4, and the first parts PP1 shown in FIGS. 3 and 4, on the surface of the relief structure forming layer 11 where the relief structure is provided. Therefore, under the conditions in which neither diffracted light nor specular light is observed, the portions of the display 1 shown in FIG. 1 corresponding to the first and second regions R1 and R2 appear to be darker compared to other portions.

As stated above, in the display 1 shown in FIGS. 1 and 2, the ratio $S_{P2}/S_2$ is smaller than the ratio $S_{P1}/S_1$. Therefore, under the conditions in which neither diffracted light nor specular light is observed, the portions of the display 1 shown in FIG. 1 corresponding to the second region R2 appear to be brighter compared to the portions corresponding to the first region R1. Accordingly, under the above conditions, the display 1 shown in FIGS. 1 and 2 displays an image I1 shown in FIG. 9.

Figure 10:
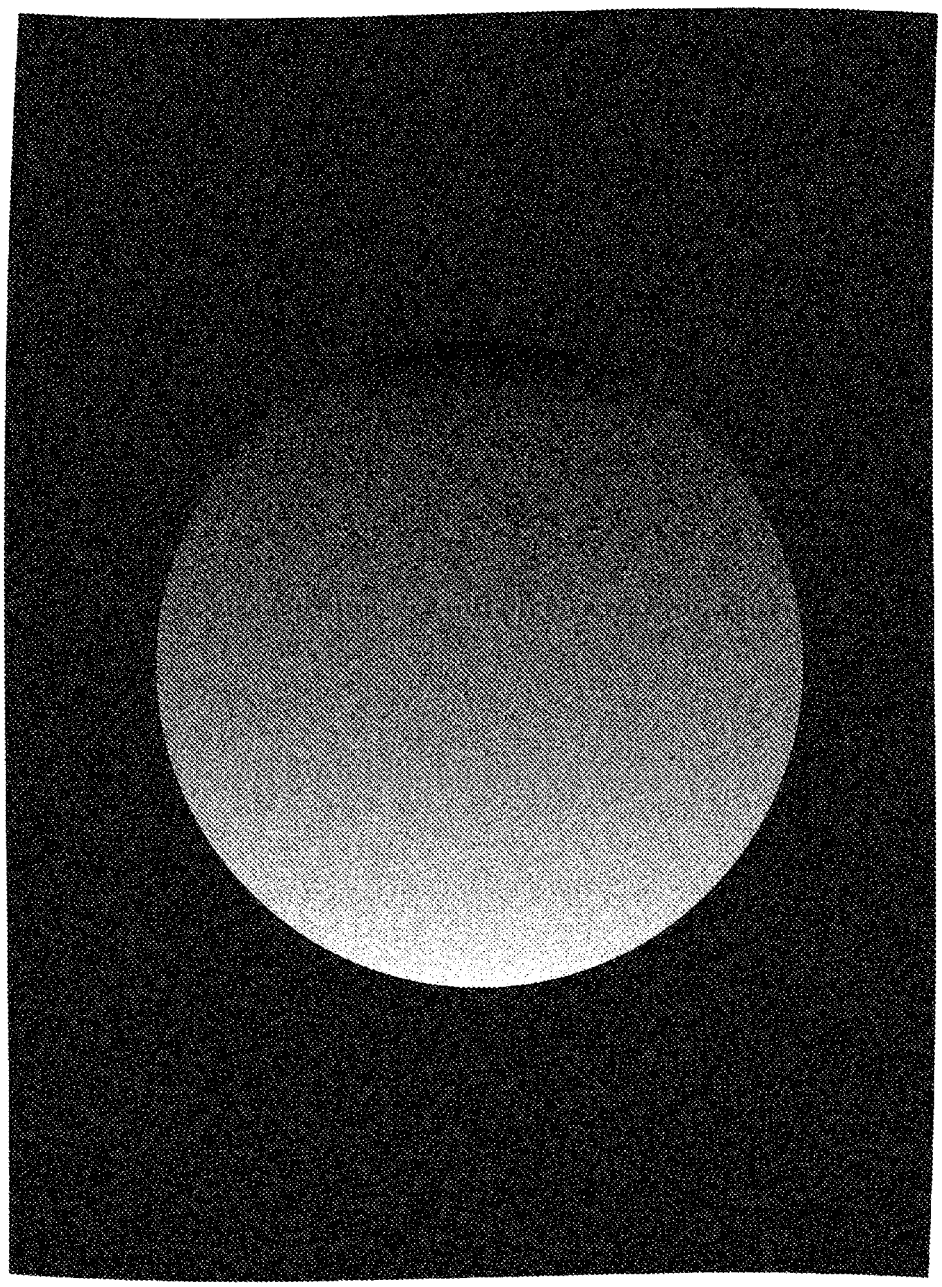
FIG. 10 shows an image displayed by the display shown in FIGS. 1 and 2 under conditions in which diffracted light or specular light is observed.

FIG. 10 shows an image displayed by the display shown in FIGS. 1 and 2 under the conditions in which diffracted light or specular light is observed.

According to an example, under the conditions in which diffracted light or specular light is observed, the portions of the display 1 shown in FIG. 1 corresponding to the first and second regions R1 and R2 appear to be brighter compared to other portions. The portions corresponding to the second region R2 appear to be darker compared to the portions corresponding to the first region R1. Accordingly, under the above conditions, the display 1 shown in FIGS. 1 and 2 displays an image I2 shown in FIG. 10.

As described above, in the display 1 shown in FIGS. 1 and 2, the portions corresponding to the sphere displayed thereon are located, as shown in FIG. 1, in the first and second regions R1 and R2. In a diffraction image, the portions corresponding to the first region R1 appear to be brighter compared to the portions corresponding to the second region R2. Thus, the display 1 enables gradation expression in a diffraction image, and this gradation expression can contribute to the observer perceiving a stereoscopic effect.

The first pattern P1 shown in FIG. 3 includes the first and second linear parts LP1 and LP2, while the second pattern P2 shown in FIG. 4 includes the third and fourth linear parts P3 and P4. In the portions corresponding to the sphere in the display 1 shown in FIGS. 1 and 2, the width direction matches between the second linear parts LP2 in the first pattern P1 shown in FIG. 3 and the third and fourth linear parts LP3 and LP4 in the second pattern P2 shown in FIG. 4. Such an arrangement can also contribute to the observer perceiving a stereoscopic effect.

Thus, the display 1 can display a diffraction image from which the observer may more easily perceive a stereoscopic effect.

Figure 11:
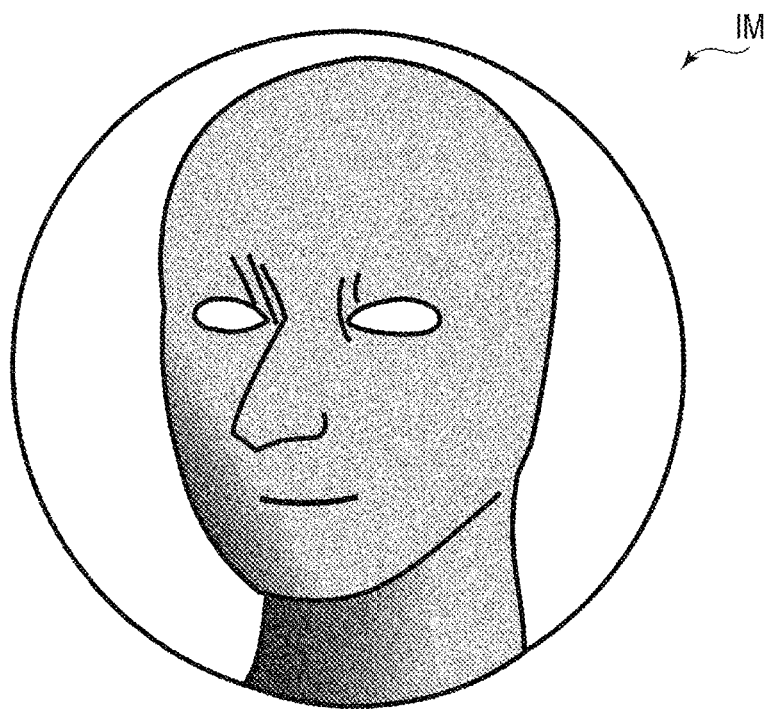
FIG. 11 is a diagram illustrating the original image of an image to be displayed by a display according to a second embodiment of the present invention.
Figure 12:
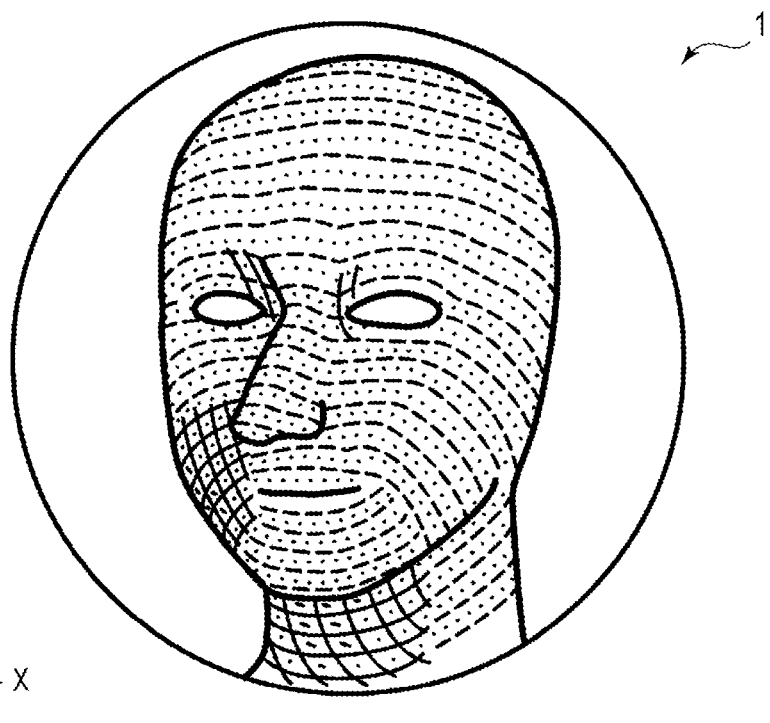
FIG. 12 is a schematic plan view illustrating a display according to the second embodiment of the present invention.

FIG. 11 is a diagram illustrating an original image of an image to be displayed by a display according to a second embodiment of the present invention. FIG. 12 is a schematic plan view illustrating a display according to the second embodiment of the present invention.

As will be described below, the second embodiment is similar to the first embodiment except that the shape of the display 1 and the image displayed by the display 1 are different from those of the first embodiment.

Specifically, the display 1 shown in FIG. 12 has a circular shape. Under the conditions in which neither diffracted light nor specular light is observed, the display 1 displays an image similar to an original image IM shown in FIG. 11 as a gray scale image. Under the conditions in which diffracted light or specular light is observed, the display 1 shown in FIG. 1 displays an image in which light and dark are reversed from the original image IM shown in FIG. 11 as a gray scale image. It should be noted that, as a gray scale image, the original image IM includes a facial image of a person whose left side of the face is lit from obliquely above.

The display 1 shown in FIG. 12 includes the first region R1 explained referring to FIG. 3, and the second region R2 explained referring to FIG. 4.

Specifically, in the display 1 shown in FIG. 12, the first region R1 explained referring to FIG. 3 corresponds to a portion of the face and a portion of the neck of the person in the original image IM shown in FIG. 11. Also, in the display 1 shown in FIG. 12, the second region R2 explained referring to FIG. 4 corresponds to another portion of the face and another portion of the neck of the person in the original image IM shown in FIG. 11.

In the display 1 shown in FIG. 12, the first linear parts LP1 shown in FIG. 3 and the third linear parts LP3 shown in FIG. 4 are arranged so as to be located on a plurality of respective lines extending obliquely below from the nose or the eye of the person, and the third linear lines LP3 are arranged so as to be located between the first linear parts LP1 and the nose or the eye of the person.

Thus, this display 1 also enables gradation expression in a diffraction image, and this gradation expression can contribute to the observer perceiving a stereoscopic effect, similarly to the display 1 according to the first embodiment. Furthermore, in this display 1 also, the arrangement of the first, second, third and fourth linear parts LP1, LP2, LP3 and LP4, and the first parts PP1 can contribute to the observer perceiving a stereoscopic effect, similarly to the display 1 according to the first embodiment. Thus, this display 1 can also display a diffraction image from which the observer can more easily perceive a stereoscopic effect.

The first, second, third, fourth and fifth patterns P1, P2, P3, P4 and P5 explained referring to FIGS. 3 to 7 can be variously modified.

Figure 13:
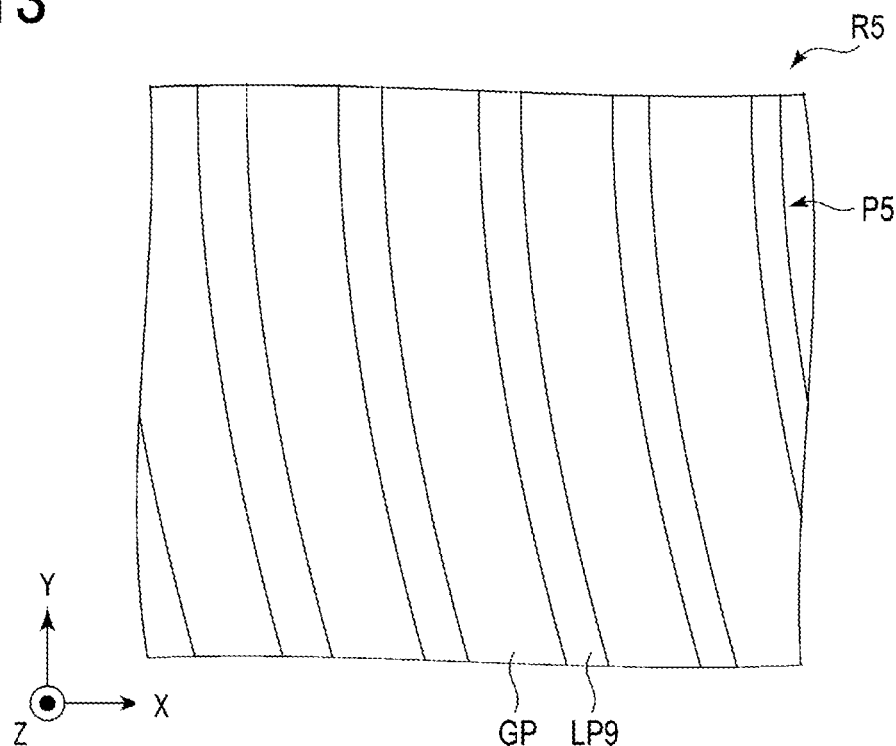
FIG. 13 is a schematic plan view illustrating an example of a structure that can be used for a fifth region.

FIG. 13 is a schematic plan view illustrating an example of a structure which can be used for the fifth region.

In the fifth region R5 shown in FIG. 7, the ninth linear parts LP9 have widths equal to each other, and each being constant in the length direction. Furthermore, in the fifth region R5 shown in FIG. 7, the ninth linear parts LP9 are arrayed at a constant pitch. If this structure is adopted, the portions corresponding to the fifth region R5 in a diffraction image may appear to have substantially the same brightness overall. If this structure is adopted, the portions corresponding to the fifth region R5 in the image displayed by the display 1 may appear to have substantially the same brightness overall, even under the conditions in which neither diffracted light nor specular light is observed.

In the fifth region R5 shown in FIG. 13, the ninth linear parts LP9 each have a width that is constant in the length direction. Also, in the fifth region R5 shown in FIG. 13, the ninth linear parts LP9 are arrayed at a substantially constant pitch. However, these ninth linear parts LP9 have widths different from each other. Specifically, the ninth linear parts LP9 increase in width from a first end of the array toward a second end thereof. If this structure is adopted, the portions corresponding to the fifth region R5 in a diffraction image may have brightness increasing from the first end toward the second end. Also, if this structure is adopted, the portions corresponding to the fifth region R5 in the image displayed by the display 1 can have brightness decreasing from the first end toward the second end, under the conditions in which neither diffracted light nor specular light is observed.

Figure 14:
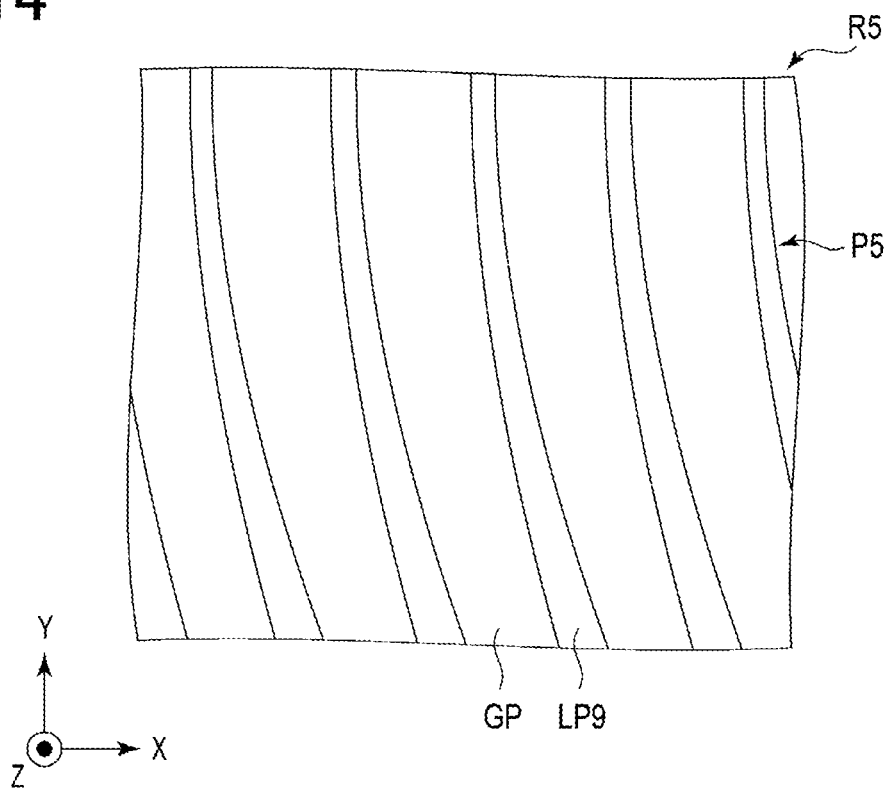
FIG. 14 is a schematic plan view illustrating another example of a structure that can be used for the fifth region.

FIG. 14 is a schematic plan view illustrating another example of a structure which can be used for the fifth region.

In the fifth region R5 shown in FIG. 14, the ninth linear parts LP9 have widths changing in the length direction. Specifically, the ninth linear parts LP9 increase in width from respective first ends toward respective second ends. If this structure is adopted, the portions corresponding to the fifth region R5 in a diffraction image can have brightness increasing from the first ends of the ninth linear parts LP9 toward the second ends thereof. Also, if this structure is adopted, the portions corresponding to the fifth region R5 in the image displayed by the display 1 can have brightness decreasing from the first ends of the ninth linear parts LP9 toward the second ends thereof, under the conditions in which neither diffracted light nor specular light is observed.

Figure 15:
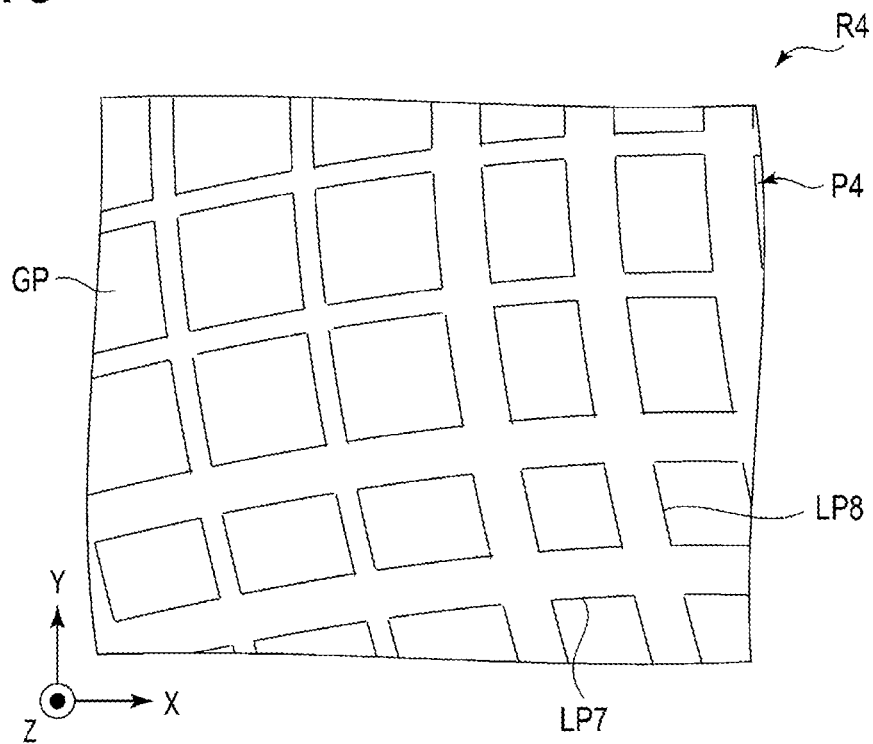
FIG. 15 is a schematic plan view illustrating an example of a structure that can be used for a fourth region.

FIG. 15 is a schematic plan view illustrating an example of a structure which can be used for the fourth region.

In the fourth region R4 shown in FIG. 6, the seventh linear parts LP7 extend in a first direction and are arrayed in a second direction intersecting the first direction, and the eighth linear parts LP8 extend in the second direction and are arrayed in the first direction. These seventh and eighth linear parts LP7 and LP8 have widths equal to each other and each being constant in the length direction. The seventh linear parts LP7 are arrayed at a constant pitch in the second direction, and the eighth linear parts LP8 are arrayed at a constant pitch in the first direction.

If this structure is adopted, the portions corresponding to the fourth region R4 in a diffraction image may appear to have the same brightness overall. Also, if this structure is adopted, the portions corresponding to the fourth region R4 in the image displayed by the display 1 may appear to have the same brightness overall, even under the conditions in which neither diffracted light nor specular light is observed.

In contrast, in the fourth region R4 shown in FIG. 15, the seventh linear parts LP7 have widths different from each other. Specifically, the seventh linear parts LP7 increase in width from a first end of the array toward a second end thereof.

The eighth linear parts LP8 also have widths different from each other. Specifically, the eighth linear parts LP8 increase in width from a first end of the array toward a second end thereof.

Herein, the seventh linear parts LP7 located on the lower side as viewed in the figure have widths larger than those of the seventh linear parts LP7 located on the upper side. Furthermore, the eighth linear parts LP8 located on the right side as viewed in the figure have widths larger than those of the eighth linear parts LP8 located on the left side.

If this structure is adopted, the portions corresponding to the fourth region R4 in a diffraction image can have brightness increasing from the upper left toward the lower right as viewed in the figure. Also, if this structure is adopted, the portions corresponding to the fourth region R4 in the image displayed by the display 1 can have brightness decreasing from the upper left toward the lower right as viewed in the figure, under the conditions in which neither diffracted light nor specular light is observed.

Figure 16:
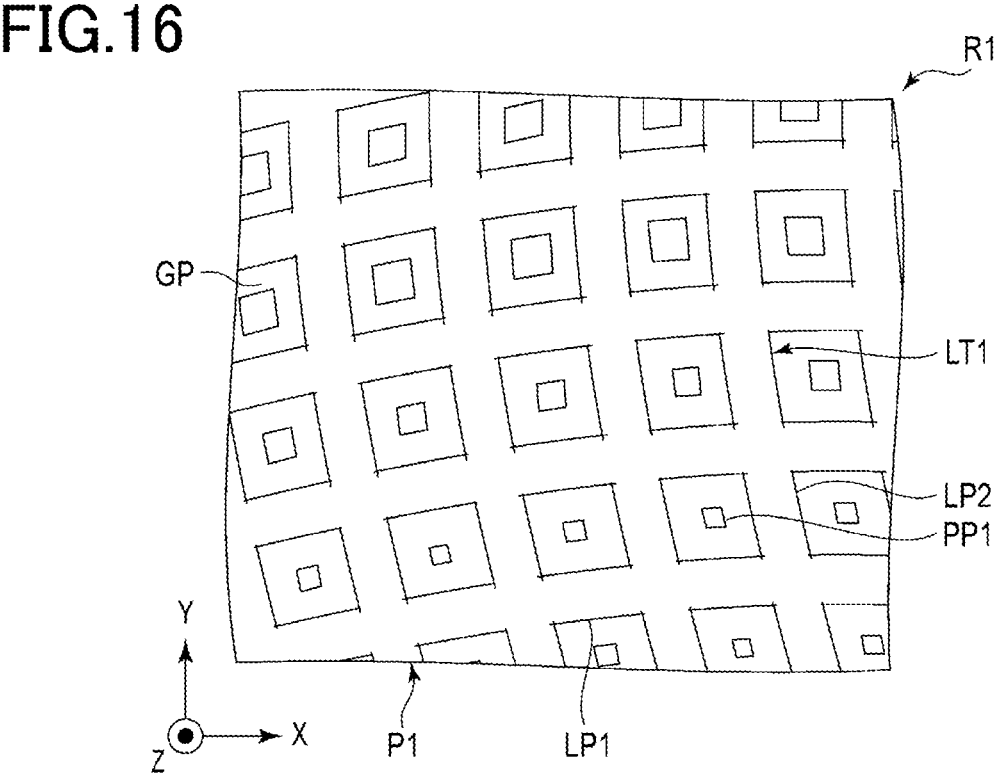
FIG. 16 is a schematic plan view illustrating an example of a structure that can be used for a first region.

FIG. 16 is a schematic plan view illustrating an example of a structure which can be used for the first region.

In the first region R1 shown in FIG. 3, the first linear parts LP1 extend in the first direction and are arrayed in the second direction intersecting the first direction, and the second linear parts LP2 extend in the second direction and are arrayed in the first direction. These first and second linear parts LP1 and LP2 have widths equal to each other and each being constant in the length direction. The first linear parts LP1 are arrayed in the second direction at a constant pitch. Also, the second linear parts LP2 are arrayed in the first direction at a constant pitch.

In the first region R1 shown in FIG. 3, the first and second linear parts LP1 and LP2 form the first lattice LT1 having meshes in which the respective first parts PP1 are arrayed. These first parts PP1 have areas equal to each other.

If this structure is adopted, the portions corresponding to the first region R1 in a diffraction image may appear to have substantially the same brightness overall. Also, if this structure is adopted, the portions corresponding to the first region R1 in the image displayed by the display 1 may appear to have substantially the same brightness overall, even under the conditions in which neither diffracted light nor specular light is observed.

In contrast, in the first region R1 shown in FIG. 16, the first parts PP1 arrayed in the first direction are different in area. Specifically, the first parts PP1 located on the upper side as viewed in the figure have areas that are larger than those of the first parts PP1 located on the lower side.

If this structure is adopted, the portions corresponding to the first region R1 in a diffraction image may have brightness increasing from the lower side toward the upper side as viewed in the figure. Also, if this structure is adopted, the portions corresponding to the first region R1 in the image displayed by the display 1 can have brightness decreasing from the lower side toward the upper side as viewed in the figure, under the conditions in which neither diffracted light nor specular light is observed.

The structure described above for any of the first, second, third, fourth, fifth, sixth, seventh, eighth and ninth linear parts LP1, LP2, LP3, LP4, LP5, LP6, LP7, LP8 and LP9 can be used for other linear parts. Furthermore, the structures described for the first parts PP1 can be used for the second parts PP2, and vice versa.

In addition, the structures described above can be combined with each other.

For example, in the structure shown in FIG. 13, the ninth linear parts LP9 may each have a width increasing from a first end of the linear part toward a second end thereof, e.g., increasing, as shown in FIG. 14, from the upper side toward the lower side as viewed in the figure. If this structure is adopted, the portions corresponding to the fifth region R5 in a diffraction image can have brightness increasing from the upper right toward the lower left as viewed in the figure. Also, if this structure is adopted, the portions corresponding to the fifth region R5 in the image displayed by the display 1 can have brightness decreasing from the upper right toward the lower left as viewed in the figure, under the conditions in which neither diffracted light nor specular light is observed.

In the structure shown in FIG. 6, the seventh linear parts PL7 or the eighth linear parts LP8 may have widths increasing from a first end of the array toward a second end thereof. For example, in the structure shown in FIG. 6, the eighth linear parts LP8 may increase in width, as shown in FIG. 13, from the right side toward the left side as viewed in the figure. If this structure is adopted, the portions corresponding to the fourth region R4 in a diffraction image can have brightness increasing from the right side toward the left side as viewed in the figure. Also, if this structure is adopted, the portions corresponding to the fourth region R4 in the image displayed by the display 1 can have brightness decreasing from the right side toward the left side as viewed in the figure, under the conditions in which neither diffracted light nor specular light is observed.

Alternatively, in the structure shown in FIG. 6, the seventh linear parts LP7 or the eighth linear parts LP8 may each have a width increasing from a first end of the linear part toward a second end thereof. For example, in the structure shown in FIG. 6, the eighth linear parts LP8 may each have a width increasing, as shown in FIG. 14, from the upper side toward the lower side as viewed in the figure. If this structure is adopted, the portions corresponding to the fourth region R4 in a diffraction image can have brightness increasing from the upper side toward the lower side as viewed in the figure. Also, if this structure is adopted, the portions corresponding to the fourth region R4 in the image displayed by the display 1 can have brightness decreasing from the upper side toward the lower side as viewed in the figure, under the conditions in which neither diffracted light nor specular light is observed.

The first, second, third, fourth and fifth patterns P1, P2, P3, P4 and P5 may have structures as follows. The structure explained for the ninth linear parts below can be used for the first to eighth linear parts and the first and second parts.

Figure 17:
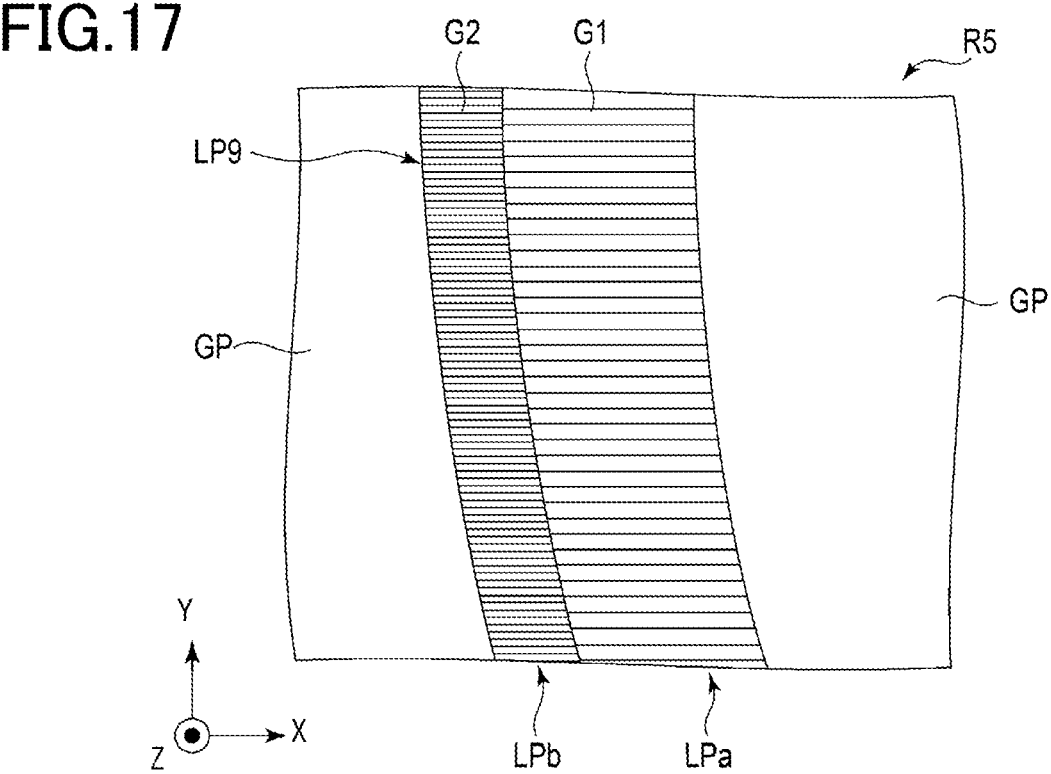
FIG. 17 is a schematic plan view illustrating an example of a structure that can be used for ninth linear parts.

FIG. 17 is a schematic plan view illustrating an example of a structure which can be used for the ninth linear parts.

FIG. 17 shows a ninth linear part LP9 extending in the length direction, and including a first linear region LPa and a second linear region LPb which are adjacent to each other in the width direction thereof. In the example shown in FIG. 17, the second linear region LPb is narrower than the first linear region LPa.

The first linear region LPa includes a plurality of grooves or ridges G1 arrayed in the width direction thereof. The grooves or ridges G1 configure a relief type diffractive structure, e.g., a relief type diffraction grating. The second linear region LPb includes a plurality of grooves or ridges G2 arrayed in the width direction thereof. The grooves or ridges G2 configure a relief type diffractive structure, e.g., a relief type diffraction grating.

The grooves or ridges G1 are different from the grooves or ridges G2 in length direction and/or pitch. The diffractive structure formed of the grooves or ridges G1 and the diffractive structure formed of the grooves or ridges G2 allow emergence of diffraction light with respective wavelengths different from each other, under the same lighting and observation conditions.

The first and second linear regions LPa and LPb are configured so that they can be distinguished from each other when observed with the naked eye in diffracted light. In other words, the first and second linear regions LPa and LPb allow emergence of diffracted light with different wavelengths enabling the observer to perceive the difference in color when observed with the naked eye, and have respective dimensions distinguishable from each other.

If this structure is adopted, the second linear region LPb may appear to be a shadow of the first linear region LPa, for example. In other words, the ninth linear parts LP9 that uses this structure may appear to be stereoscopic. Therefore, this structure is advantageous from the perspective of enabling display of an image from which the observer may strongly perceive a stereoscopic effect.

The display 1 may also be configured to display a monochromatic image as a diffraction image, or may be configured to display a multicolor image as a diffraction image. When configuring a diffractive structure so as to display a multicolor image as a diffraction image, the structure set forth below can be adopted, for example.

Figure 18:
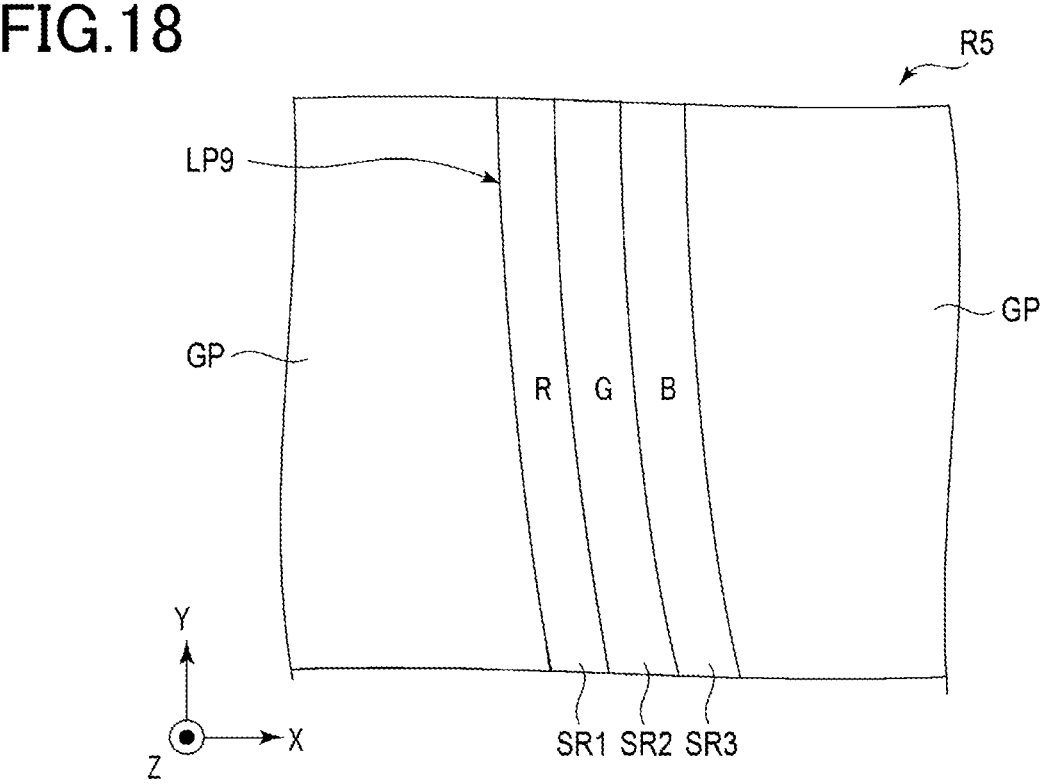
FIG. 18 is a schematic plan view illustrating another example of a structure that can be used for the ninth linear parts.

FIG. 18 is a schematic plan view illustrating another example of a structure which can be used for the ninth linear parts.

FIG. 18 shows a ninth linear part LP9 including a first sub-region SR1, a second sub-region SR2, and a third sub-region SR3. The first, second and third sub-regions SR1, SR2 and SR3 are arrayed in the width direction of the ninth linear part LP9.

Under specific lighting and observation conditions, the first, second and third sub-regions SR1, SR2 and SR3 allow diffracted light to emerge with different wavelengths. For example, the first, second and third sub-regions SR1, SR2 and SR3 may respectively allow diffracted light to emerge as red, green and blue colors.

The first, second and third sub-regions SR1, SR2 and SR3 are configured to express colors by additive color mixing of diffracted light emerging from them. Specifically, herein, the ninth linear part LP9 has a width which is so small that the first, second and third sub-regions SR1, SR2 and SR3 cannot be distinguished from each other when the diffraction image is observed with the naked eye.

If this structure is used for the ninth linear parts LP9, portions of the ninth linear parts LP9 in which the first, second and third sub-regions SR1, SR2 and SR3 are arrayed in the width direction thereof may appear to be white when the diffraction image is observed with the naked eye.

Also, portions of the ninth linear parts LP9 in which only the first and second sub-regions SR1 and SR2 are arrayed in the width direction thereof may appear to be yellow when the diffraction image is observed with the naked eye. Portions of the ninth linear parts LP9 in which only the second and third sub-regions SR2 and SR3 are arrayed in the width direction thereof may appear to be cyan when the diffraction image is observed with the naked eye. Portions of the ninth linear parts LP9 in which only the first and third sub-regions SR1 and SR3 are arrayed in the width direction thereof may appear to be magenta when the diffraction image is observed with the naked eye.

Portions of the ninth linear parts LP9 in which only the first sub-region SR1 is arranged, without the second and third sub-regions SR2 and SR3 being provided in the width direction thereof, may appear to be red when the diffraction image is observed with the naked eye. Portions of the ninth linear parts LP9 in which only the second sub-region SR2 is arranged, without the first and third sub-regions SR1 and SR3 being provided in the width direction thereof, may appear to be green when the diffraction image is observed with the naked eye. Portions of the ninth linear parts LP9 in which only the third sub-region SR3 is arranged, without the first and second sub-regions SR1 and SR2 being provided in the width direction thereof, may appear to be blue when the diffraction image is observed with the naked eye.

Thus, if the structure explained referring to FIG. 18 is adopted, a multicolor image can be displayed on the display 1 as a diffraction image.

Figure 19:
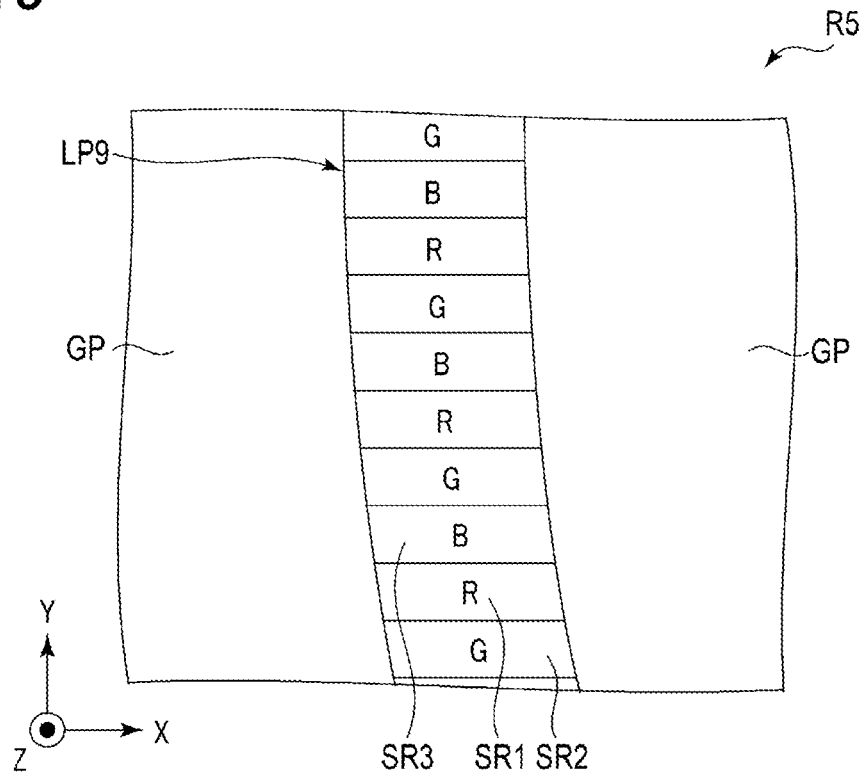
FIG. 19 is a schematic plan view illustrating still another example of a structure that can be used for the ninth linear parts.

FIG. 19 is a schematic plan view illustrating another example of a structure which can be used for the ninth linear parts.

FIG. 19 shows a ninth linear part LP9 which is similar to the ninth linear part LP9 explained referring to FIG. 18, except for the following points. Specifically, in the ninth linear part LP9 shown in FIG. 19, the first, second and third sub-regions SR1, SR2 and SR3 are arrayed in the length direction of the ninth linear part LP9. Each array of the three sub-regions that are adjacent in the length direction of the ninth linear part LP9 has a dimension which is so small in the length direction of the ninth linear part LP9 that these three sub-regions, i.e., the first, second and third sub-regions SR1, SR2 and SR3, cannot be distinguished from each other when the diffraction image is observed with the naked eye.

Also, if the above structure is used for the ninth linear parts LP9, a multicolor image can be displayed on the display 1 as a diffraction image, similarly to the structure explained referring to FIG. 18, by appropriately arranging the first, second and third sub-regions SR1, SR2 and SR3.

Figure 20:
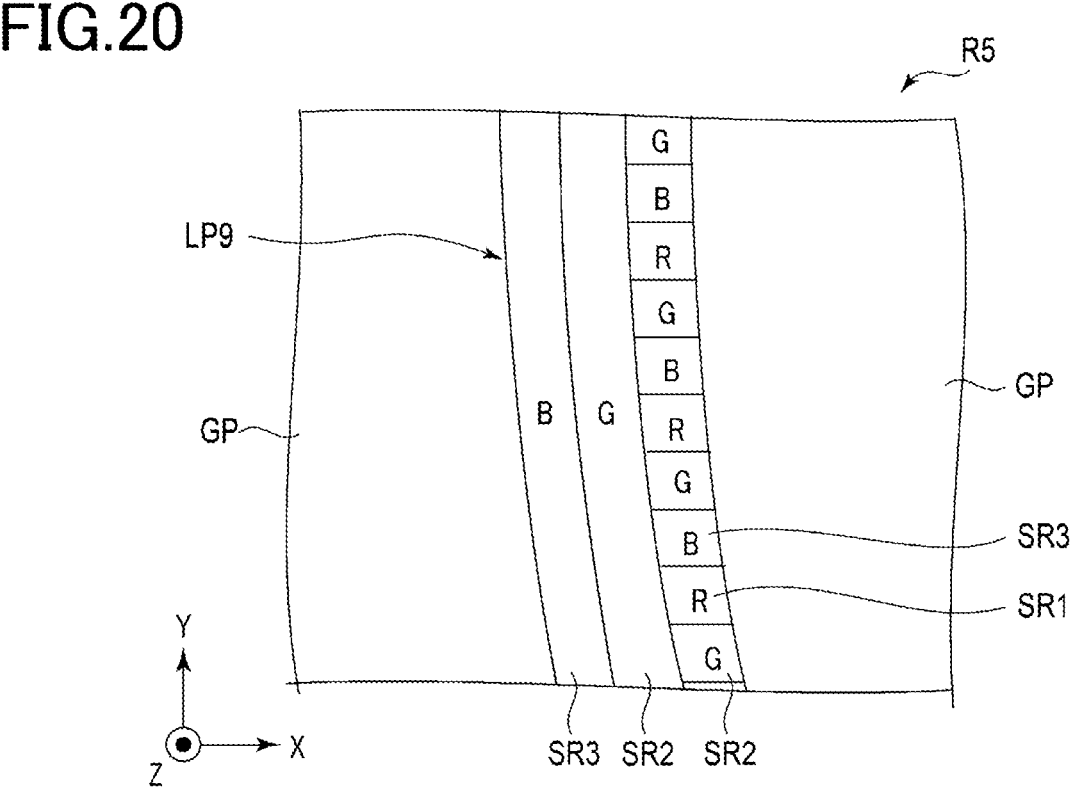
FIG. 20 is a schematic plan view illustrating still another example of a structure that can be used for the ninth linear parts.

FIG. 20 is a schematic plan view illustrating still another example of a structure which can be used for the ninth linear parts.

FIG. 20 shows a ninth linear part LP9 which is similar to the ninth linear part explained referring to FIG. 18, except for the following points. Specifically, in the ninth linear part LP9 shown in FIG. 20, the first, second and third sub-regions SR1, SR2 and SR3 are arrayed in the length direction and the width direction of the ninth linear part LP9.

Specifically, a part of the second sub-region SR2 and a part of the third sub-region SR3 extend in the length direction of the ninth linear part LP9 and are arrayed in the width direction of the ninth linear part LP9. The first sub-region SR1, the remaining part of the second sub-region SR2, and the remaining part of the third sub-region SR3 are arrayed in line in the length direction of the ninth linear part LP9. This line, and a part of the second sub-region SR2 and a part of the third sub-region SR3 extending in the length direction of the ninth linear part LP9, are arrayed in the width direction of the ninth linear part LP9.

The ninth linear part LP9 has a width which is so small that the three sub-regions adjacent in the width direction of the ninth linear part LP9 cannot be distinguished from each other when the diffraction image is observed with the naked eye. Each array of the three sub-regions that are adjacent in the length direction of the ninth linear part LP9 has a dimension which is so small in the length direction of the ninth linear part LP9 that these three sub-regions, i.e., the first, second and third sub-regions SR1, SR2 and SR3, cannot be distinguished from each other when the diffraction image is observed with the naked eye.

If the above structure is used for the ninth linear parts LP9 also, a multicolor image can be displayed on the display 1 as a diffraction image, similarly to the structures explained referring to FIGS. 18 and 19, by appropriately arranging the first, second and third sub-regions SR1, SR2 and SR3.

In this structure, for example, the area ratio of the second sub-region SR2 in a microregion where the first, second and third sub-regions SR1, SR2 and SR3 cannot be distinguished from each other with the naked eye, and the area ratio of the third sub-region in this microregion can be made larger than the area ratio of the first sub-region SR1 in this microregion. Blue and green greatly affect the skin tone appearance, compared to red. Accordingly, when expressing a facial image in a diffraction image using the above configurations, skin tone may be rendered more beautifully.

Next, a transfer foil according to an embodiment of the present invention will be described.

Figure 21:
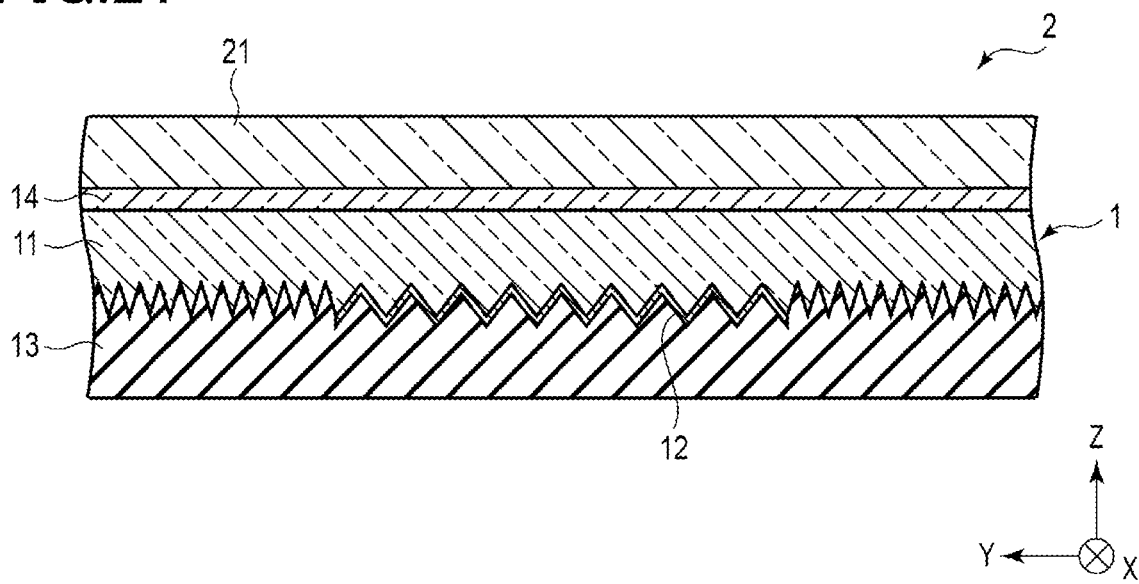
FIG. 21 is a schematic cross-sectional view illustrating a transfer foil according to an embodiment of the present invention.

FIG. 21 is a schematic cross-sectional view illustrating a transfer foil according to an embodiment of the present invention.

FIG. 21 shows a transfer foil 2 including a support 21, a transfer material layer and an adhesive layer 13.

The support 21 separately supports the transfer material layer.

The adhesive layer 13 covers the transfer material layer.

The transfer material layer includes a relief structure forming layer 11, a reflective layer 12, and a separation protective layer 14. The protective layer 14 herein is a release protective layer. The protective layer 14, the relief structure forming layer 11, and the reflective layer 12 are laminated in this order on the support 21.

The transfer material layer includes a transfer portion, and a non-transfer portion which are adjacent to each other. In the transfer material layer, the transfer portion is a portion transferred to an article and includes the above display 1. In the transfer material layer, the non-transfer portion is a portion remaining without being transferred to the article.

Next, an adhesive label according to an embodiment of the present invention will be described.

Figure 22:
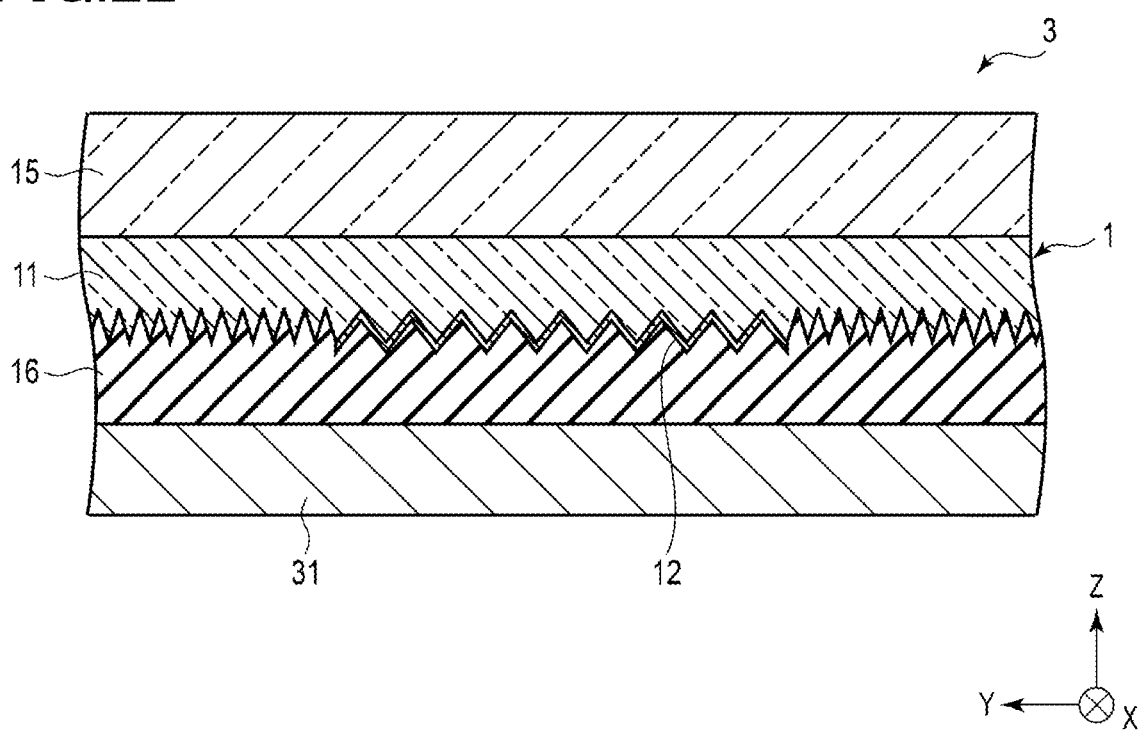
FIG. 22 is a schematic cross-sectional view illustrating an adhesive label according to an embodiment of the present invention.

FIG. 22 is a schematic cross-sectional view illustrating an adhesive label according to an embodiment of the present invention.

FIG. 22 shows an adhesive label 3 including a substrate 15, a display 1, and an adhesive layer 16. In FIG. 22, the reference sign 31 indicates a mount.

For example, the substrate 15 may be a transparent resin film. The substrate 15 has a major surface supporting the display 1.

The adhesive layer 16 is provided to a major surface of the display 1. The adhesive layer 16 faces the substrate 15 via the display 1. The adhesive layer 16 is protected by the mount 31 until immediately before use of the adhesive label 3.

Next, a labeled article according to an embodiment of the present invention will be described.

Figure 23:
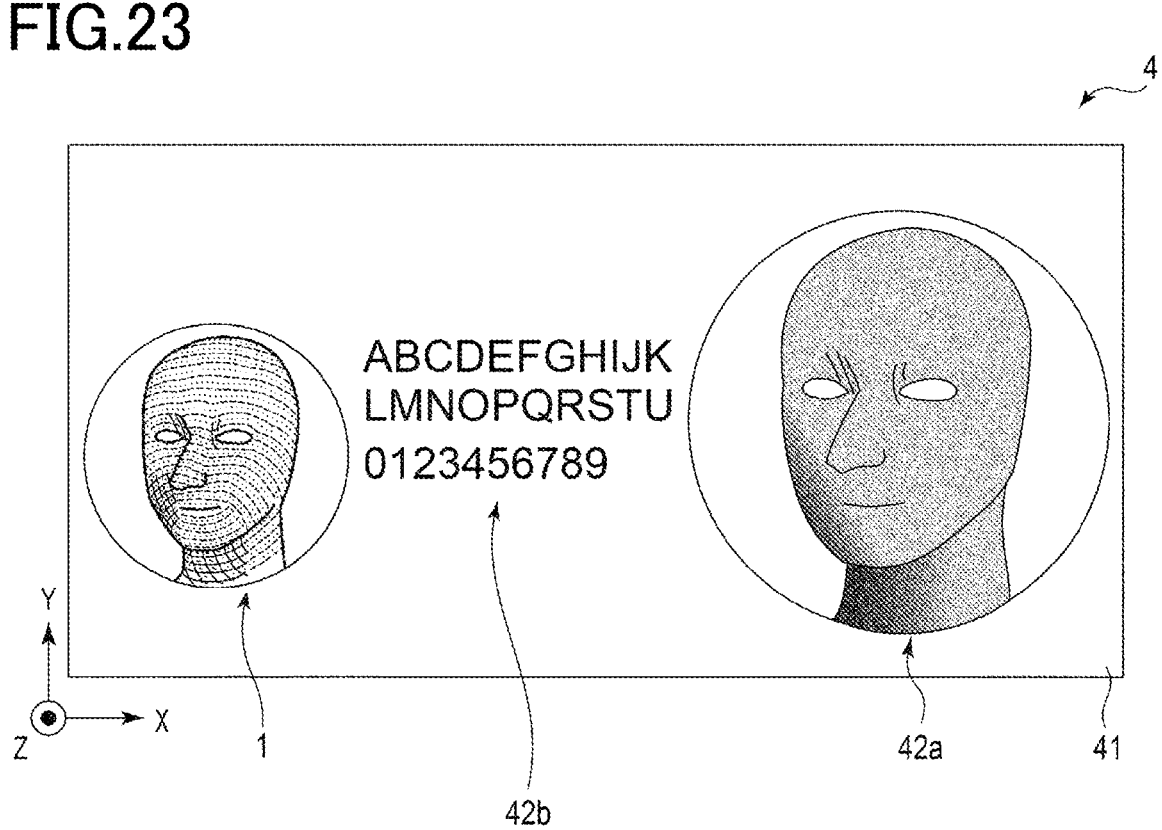
FIG. 23 is a schematic plan view illustrating a labeled article according to an embodiment of the present invention.

FIG. 23 is a schematic plan view illustrating a labeled article according to an embodiment of the present invention.

FIG. 23 shows a labeled article 4 which is printed matter. The labeled article 4 may be, for example, a gift ticket, security, bank note, ID (identification) card, or passport.

The labeled article 4 includes a display 1, an article 41 supporting the display 1, and printing layers 42*a* and 42*b* provided on the article 41.

For example, the article 41 may be a printing substrate, such as one made of paper. The printing substrate may be, for example, a paper substrate, or a transparent or translucent resin substrate.

For example, the display 1 may be bonded to a surface of the article 41 or embedded in the article 41 so as to be supported by the article 41. According to an example, the display 1 is bonded to the article 41 using an adhesive label or a transfer foil.

If the article 41 is transparent, the display 1 may be embedded in the article 41. Such a structure is obtained, for example, by sandwiching the display 1 between a plurality of transparent resin substrates and laminating the transparent resin substrates together.

If the article 41 is translucent as in the case of using a paper substrate or a translucent resin substrate as a printing substrate, the above structure can be obtained, for example, through the following method. First, a display 1 is sandwiched between a plurality of paper substrates or translucent resin substrates and integrated with each other. Next, windows are provided to one or more portions of the substrates at positions corresponding to the display 1 so that the display 1 is visible.

The printing layer 42*a* may display a printed image which is produced using the original of the image to be displayed by the display 1. The printing layer 42*b* displays characters and the like. One of or both of the printing layers 42*a* and 42*b* may be omitted.

When the printed image displayed by the printing layer 42*a* and the image displayed by the display 1 correspond to each other, if either one of the printed image and the display 1 is fraudulently changed or rewritten, the fraudulent activity can be more easily detected.

Second Disclosure

Figure 24:
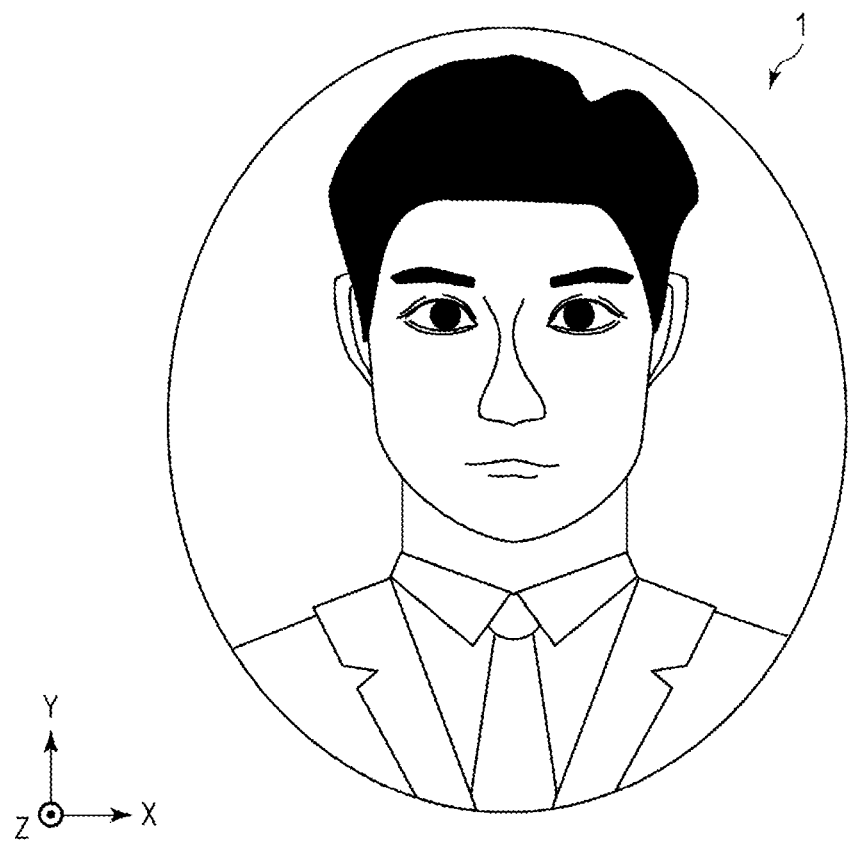
FIG. 24 is a schematic plan view illustrating a display according to a third embodiment of the present invention.
Figure 25:
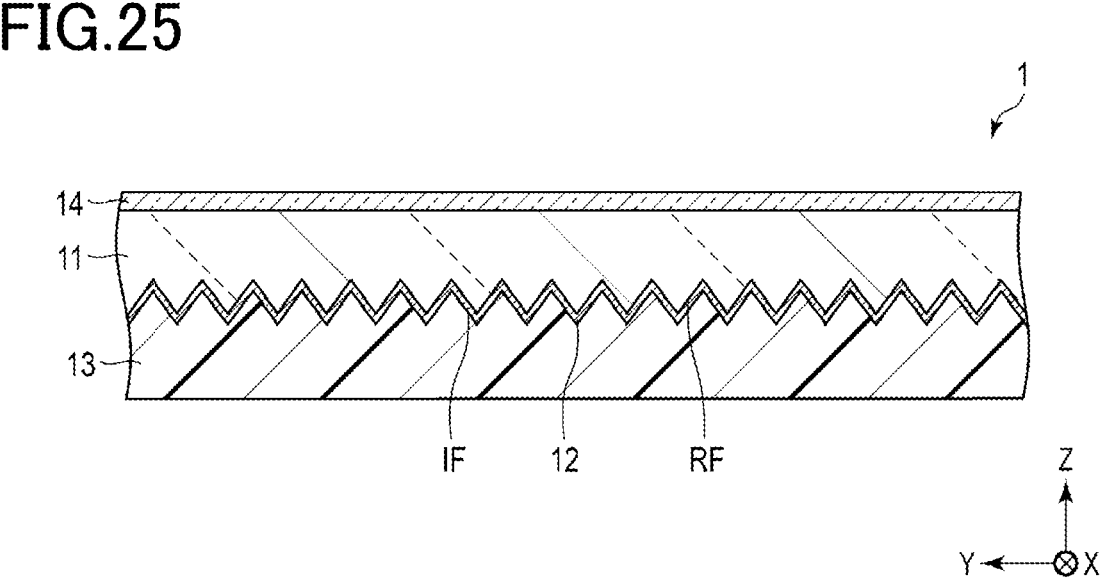
FIG. 25 is a cross-sectional view illustrating the display shown in FIG. 24.
Figure 26:
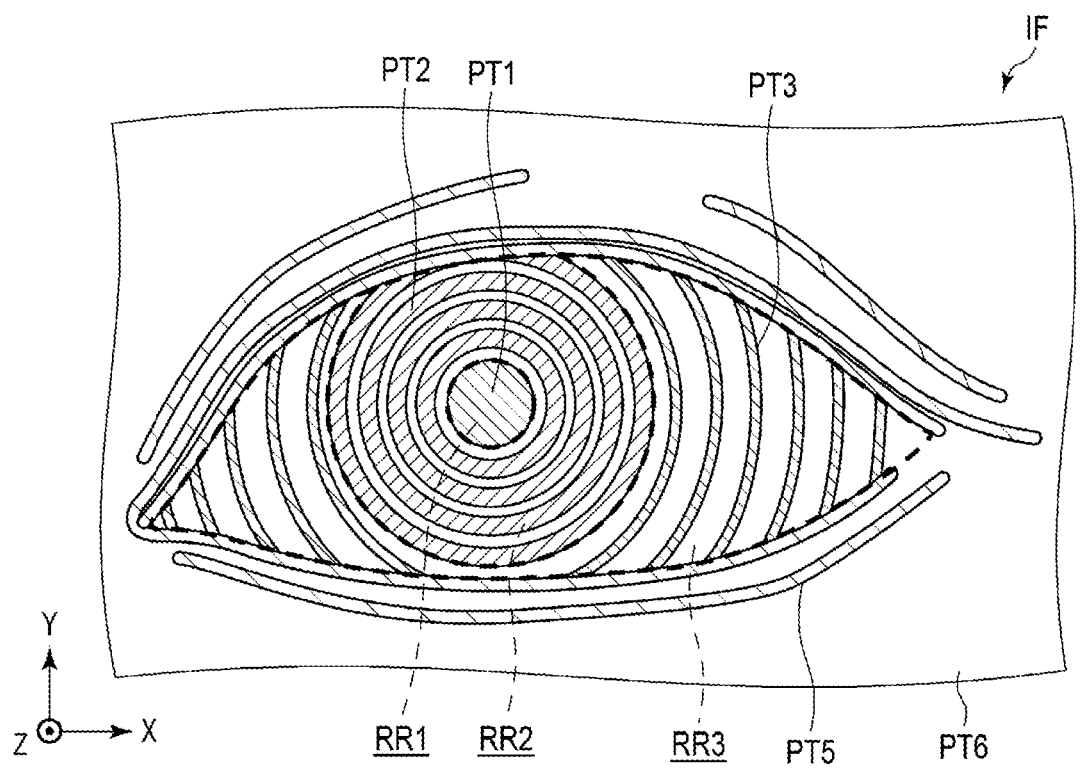
FIG. 26 is a plan view illustrating a part of one major surface of a relief structure forming layer included in the display shown in FIGS. 24 and 25.

FIG. 24 is a schematic plan view illustrating a display according to a third embodiment of the present invention. FIG. 25 is a cross-sectional view illustrating the display shown in FIG. 24. FIG. 26 is a plan view illustrating a part of a major surface of a relief structure forming layer included in the display shown in FIGS. 24 and 25.

Herein, the X and Y directions are parallel to a major surface of a display 1 and are perpendicular to each other. The Z direction is perpendicular to the X and Y directions and corresponds to the thickness direction of the display 1.

FIGS. 24 and 25 show a display 1 including, as shown in FIG. 25, a relief structure forming layer 11, and a reflective layer 12. In the display 1, the relief structure forming layer 11 side is the front side facing the observer, and the reflective layer 12 side is the rear side. In the display 1, the reflective layer 12 side may be the front side facing the observer, and the relief structure forming layer 11 side may be the rear side. In both cases, the reflective layer 12 is disposed to contact a relief surface of the relief structure forming layer 11.

A relief type diffractive structure RF is provided to one major surface of the relief structure forming layer 11, or specifically, provided to an interface IF between the relief structure forming layer 11 and the reflective layer 12.

The relief type diffractive structure RF includes a plurality of grooves or ridges arrayed in the width direction thereof. These grooves or ridges configure the relief type diffractive structure RF, e.g., a relief type diffraction grating. According to an example, the length direction of the grooves or ridges is constant throughout the diffractive structure RF. For example, the length direction of the grooves or ridges is parallel to the X direction throughout the diffractive structure RF.

The relief type diffractive structure RF displays a facial image including eyes, i.e. an image of a human face herein, as a multicolor diffraction image. The relief type diffractive structure RF may display a facial image including the eye, and an image other than the facial image, as a diffraction image. The diffraction image herein is an image displayed by diffracted light.

The interface IF provided with the diffractive structure RF, i.e., the reflective layer 12 side major surface of the relief structure forming layer 11, includes, as shown in FIG. 26, a first region RR1, a second region RR2, and a third region RR3.

In the interface IF, the first region RR1 corresponds to the pupil of the eye in the facial image displayed as a diffraction image by a diffraction grading DF. The first region RR1 has a circular shape.

In the interface IF, the second region RR2 corresponds to the iris of the eye in the facial image displayed as a diffraction image by the diffraction grading DF. The second region RR2 has an annular shape and encloses the first region RR1.

In the interface IF, the third region RR3 corresponds to the sclera (the white part) of the eye in the facial image displayed as a diffraction image by the diffraction grading DF. The third region RR3 encloses the second region RR2.

The diffractive structure RF includes a first part PT1 in the first region RR1. The first part PT1 has a circular shape and occupies the entire first region RR1.

In the first part PT1, the length direction of the grooves or ridges is constant overall. For example, in the first part PT1, the length direction of the grooves or ridges is parallel to the X direction overall. Furthermore, in the first part PT1, the pitch of the grooves or ridges is constant overall.

The diffractive structure RF includes a plurality of second parts PT2 in the second region RR2. The second parts PT2 are defined by solid lines, and concentrically arranged surrounding the first part PT1. The second parts PT2 have a common center. The common center of the second parts PT2 also serves as the center of the first part PT1.

The second parts PT2 each have a constant width throughout the circumference or length thereof. The widths of the second parts PP2 are equal to each other.

Adjacent second parts PT2 have a constant interval therebetween throughout the circumference or length thereof. The interval between adjacent second parts PT2 decreases as they are distanced from the concentric center.

In each second part PT2, the length direction of the grooves or ridges is constant overall. The length direction of the grooves or ridges in the plurality of second parts PT2 is constant. According to an example, the length direction of the grooves or ridges is constant between the first part PT1 and the plurality of second parts PT2. For example, in each second part PT2, the length direction of the grooves or ridges is parallel to the X direction overall.

Furthermore, in each second part PT2, the pitch of the grooves or ridges is constant overall. The grooves or ridges have a constant pitch in the plurality of second parts PT2. According to an example, the pitch of the grooves or ridges is constant between the first part PT1 and the plurality of second parts PT2.

The diffractive structure RF includes a plurality of third parts PT3 in the third region RR3. The third parts PT3 are defined by solid lines, and concentrically arranged surrounding the plurality of second parts PT2. The third parts PT3 have a common center. The common center of the third parts PT3 also serves as the center of the first part PT1.

The ratio of the total area of the plurality of third parts PT3 to the area of the third region RR3 is smaller than the ratio of the total area of the plurality of second parts PT2 to the area of the second region RR2. The width of each third part PT3 is smaller than the width of each second part PT2. Furthermore, the interval between adjacent third parts PT3 is smaller than the interval between adjacent second parts PT2.

The third parts PT3 each have a constant width throughout the length thereof. The widths of the third parts PP3 are equal to each other.

Adjacent third parts PT3 have a constant interval therebetween throughout the length thereof. The third parts PT3 are arrayed at even intervals.

In each third part PT3, the length direction of the grooves or ridges is constant overall. The length direction of the grooves or ridges in the plurality of third parts PT3 is constant. According to an example, the length direction of the grooves or ridges is constant between the plurality of second parts PT2 and the plurality of third parts PT3. For example, in each third part PT3, the length direction of the grooves or ridges is parallel to the X direction overall.

Furthermore, in each third part PT3, the pitch of the grooves or ridges is constant overall. The grooves or ridges have a constant pitch in the plurality of third parts PT3. According to an example, the pitch of the grooves or ridges is different between the first part PT1 and the plurality of third parts PT3.

The interface IF includes another region in addition to the first, second and third regions RR1, RR2 and RR3. The diffractive structure RF includes fifth parts PT5 in portions of the other region. In the diffraction image displayed by the diffraction grating DF, the fifth parts PT5 are used for displaying parts other than the eye, e.g., a palpebral fissure contour, wrinkles in the upper and lower eyelids, etc.

The remaining portion of the other region corresponds to a sixth part PT6. The diffractive structure RF is not provided to the sixth part.

The reflective layer 12 shown in FIG. 25 covers the surface of the relief structure forming layer 11, which is provided with the diffractive structure RF.

As shown in FIG. 25, the display 1 shown in FIGS. 24 and 25 further includes a protective layer 14.

The protective layer 14 is provided to a major surface of the relief structure forming layer 11 facing away from the major surface provided with the reflective layer 12. The protective layer 14 is a transparent resin layer. The protective layer 14 protects the relief structure forming layer 11 or other components from physical damage, chemicals, or the like. Low adhesion of the protective layer 14 to the substrate of a transfer foil described later can facilitate transfer of the display elements. Materials that can be used for the protective layer 14 may be, for example, acrylic resins or epoxy resins. These materials may be used by mixing a polyester thereto to control adhesion.

The reflective layer 12 side surface of the display 1 is provided with an adhesive layer 13. The adhesive layer 13 fixes the display 1 to another article, while protecting the relief surface of the relief structure forming layer 11 and the reflective layer 12.

Figure 27:
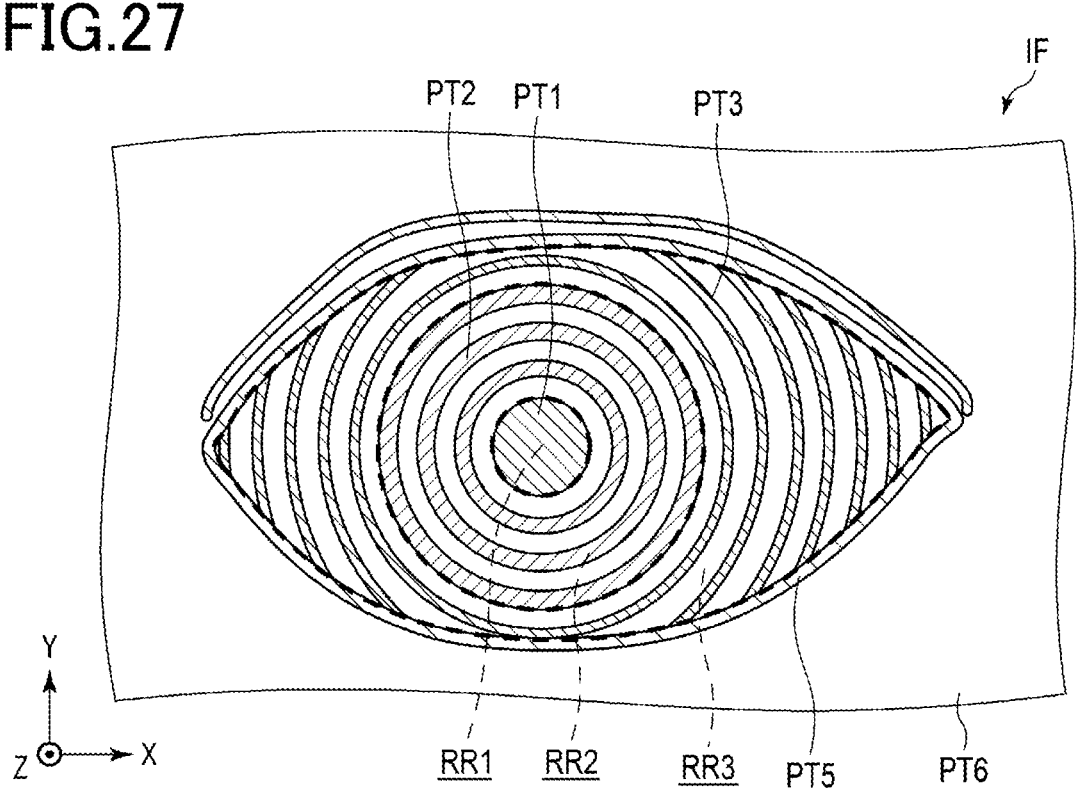
FIG. 27 is a plan view illustrating a modification of the structure shown in FIG. 26.

FIG. 27 is a plan view illustrating a modification of the structure shown in FIG. 26.

FIG. 27 shows an example of a structure that can be adopted when displaying a facial image of a non-human animal as a diffraction image.

The structure shown in FIG. 27 is substantially the same as the structure explained referring to FIGS. 24 to 26 except for the following points. Specifically, in the diffraction image displayed by the structure shown in FIG. 26, a part of the iris is hidden behind the upper eyelid. In contrast, in the diffraction image displayed by the structure shown in FIG. 27, the iris is not hidden behind either of the upper and lower eyelids. Furthermore, in the structure shown in FIG. 26, the second parts PT2 are arrayed at even intervals.

Figure 28:
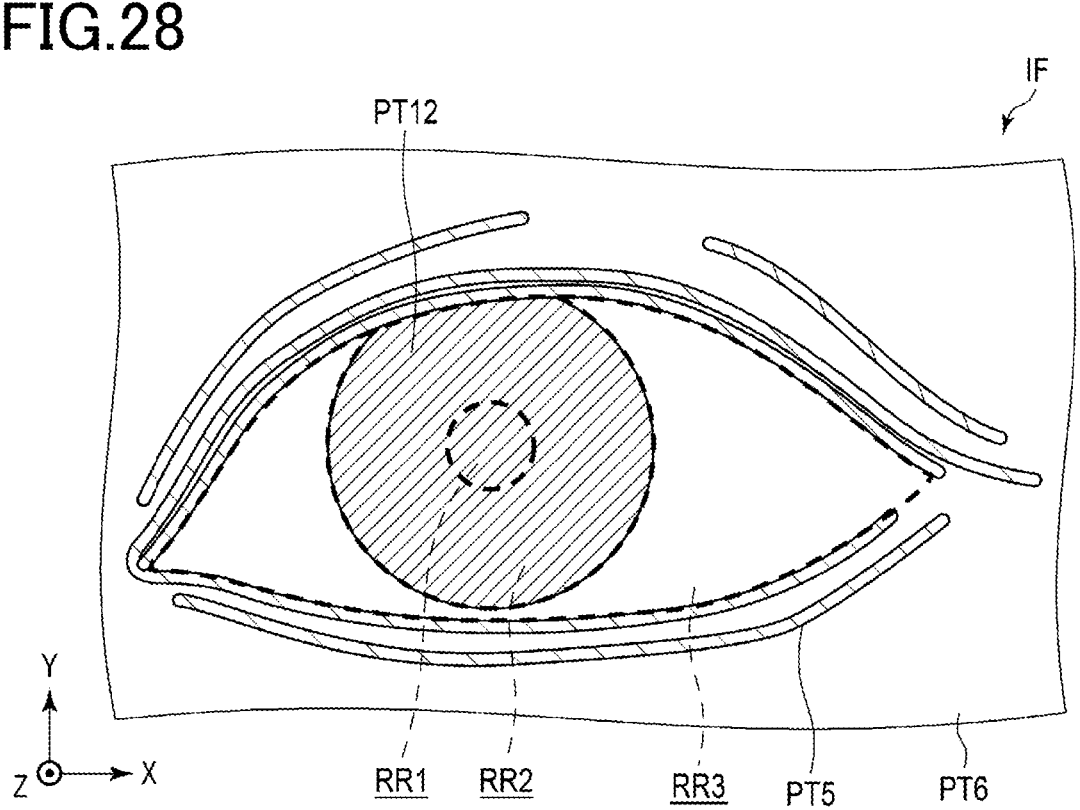
FIG. 28 is a plan view illustrating a part of one major surface of a relief structure forming layer included in a display according to a comparative example.

FIG. 28 is a plan view illustrating a part of a major surface of a relief structure forming layer included in a display according to a comparative example.

The structure shown in FIG. 28 is similar to the structure explained referring to FIG. 26, except for the following points.

Specifically, in the structure shown in FIG. 28, the diffractive structure RF does not include the first part PT1 and the plurality of second parts PT2 in the respective first and second regions RR1 and RR2. Instead, in the structure of FIG. 28, the diffractive structure RF includes a part PT12 in the first and second regions RR1 and RR2. Also, in the structure shown in FIG. 28, the diffractive structure RF is not provided to the third region.

The part PT12 occupies the entire first and second regions RR1 and RR2. In the part PT12, the length direction of the grooves or ridges is constant overall. For example, in the part PT12, the length direction of the grooves or ridges is parallel to the X direction overall. Furthermore, in the part PT12, the pitch of the grooves or ridges is constant overall.

If the structure shown in FIG. 28 is adopted, the eye does not appear to be stereoscopic in the facial image displayed as a diffraction image. Consequently, this facial image does not appear lifelike.

In this regard, in the structure explained referring to FIGS. 24 to 27, the diffractive structure RF includes a first part PT1 in the first region RR1 corresponding to the pupil of the eye, and a plurality of second parts PT2 in the second region RR2 corresponding to the iris of the eye. The second parts PT2 are concentrically arranged. If such a structure is adopted, the facial image displayed as a diffraction image may appear lifelike.

Furthermore, in the structure explained referring to FIGS. 24 to 27, the diffractive structure RF includes a plurality of third parts PT3 in the third region RR3 corresponding to the sclera of the eye. The third parts PT3 are concentrically arranged. Also, the ratio of the total area of the plurality of third parts PT3 to the area of the third region RR3 is smaller than the ratio of the total area of the plurality of second parts PT2 to the area of the second region RR2. If such a structure is adopted, the eye may appear to be more stereoscopic in a diffraction image, and the facial image displayed as a diffraction image may appear more lifelike.

The human brain includes an area of nerve cells which are called "cells responsive to faces (or face cells)". The face cells are said to respond to the eye, nose and mouth particularly sensitively. The face cells enable identification of a person from the entire facial image including not only the eye, nose and mouth, but also the sites surrounding them, such as the cheek, and the contour thereof. The accuracy of the identification is particularly greatly affected by the image of the eye in the facial image.

As described above, the display 1 explained referring to FIGS. 24 to 27 adopts the above structure in a region in the diffractive structure RF corresponding to the eye. The image of the eye displayed as a part of a diffraction image by the display 1 adopting such a structure is different from the image of the eye displayed as a part of a diffraction image by a display adopting a different structure. Humans can more easily identify differences between these images. Accordingly, if the display 1 is used, for example, for an anti-counterfeiting purpose, improve or even remarkable effects may be exerted.

Figure 29:
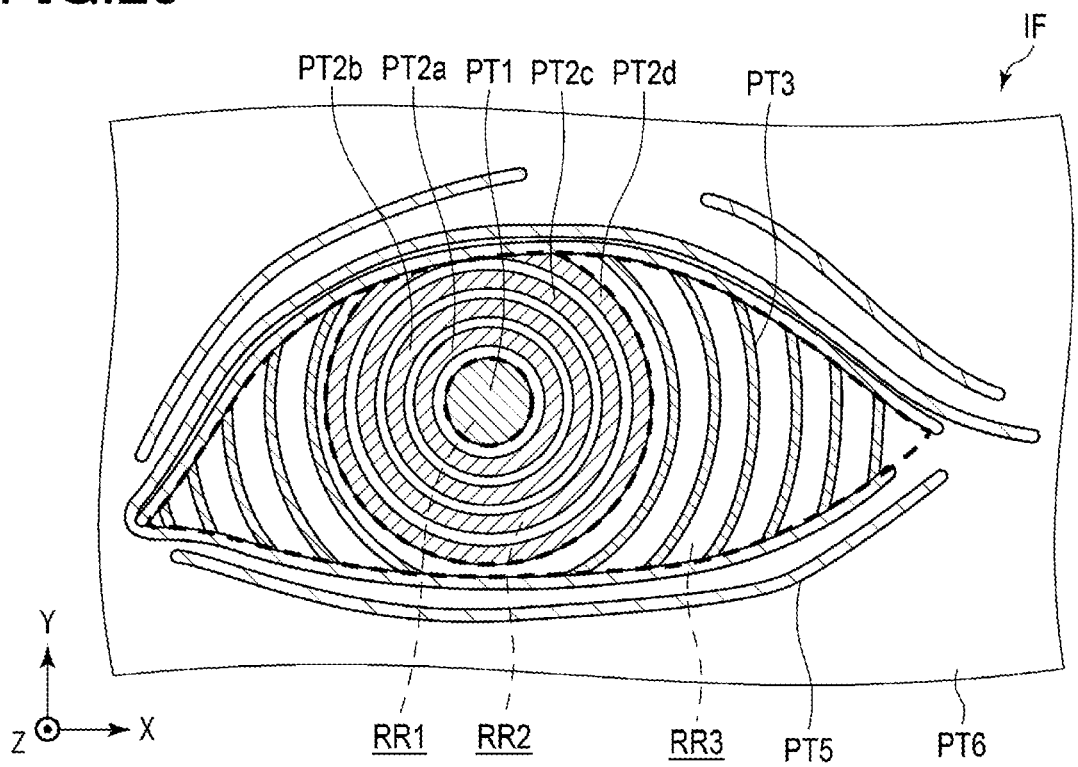
FIG. 29 is a plan view illustrating a part of one major surface of a relief structure forming layer included in a display according to a fourth embodiment of the present invention.

FIG. 29 is a plan view illustrating a part of a major surface of a relief structure forming layer included in a display according to a fourth embodiment of the present invention.

The display according to the fourth embodiment is similar to the third embodiment except that the structure shown is FIG. 29 is used for the diffractive structure RF. The structure shown in FIG. 29 is similar to the structure explained referring to FIG. 26, except for the following points.

Specifically, in the structure shown in FIG. 29, the diffractive structure RF includes a plurality of second parts PT2$a$ to PT2$d$ in the second region RR2. The second parts PT2$a$ to PT2$d$ are defined by solid lines, and concentrically arranged surrounding the first part PT1. The second parts PT2$a$ to PT2$d$ have a common center. The common center of the second parts PT2$a$ to PT2$d$ also serves as the center of the first part PT1.

The second parts PT2$a$ to PT2$d$ each have a constant width throughout the circumference or length thereof. The widths of the second parts PT2$a$ to PT2$d$ are equal to each other.

Two adjacent parts among the second parts PT2$a$ to PT2$d$ have a constant interval therebetween throughout the circumference or length thereof. The interval between two adjacent parts among the second parts PT2$a$ to PT2$d$ decreases as they are distanced from the concentric center.

In each of the second parts PT2$a$ to PT2$d$, the length direction of the grooves or ridges is constant overall. The length direction of the grooves or ridges in the second parts PT2$a$ to PT2$d$ is constant. According to an example, the length direction of the grooves or ridges is constant between the first part PT1 and the second parts PT2$a$ to PT2$d$. For example, in each of the second parts PT2$a$ to PT2$d$, the length direction of the grooves or ridges is parallel to the X direction overall.

Within each individual second part PT2$a$ to PT2$d$, the pitch of the grooves or ridges is constant overall. However, the pitches of the grooves or ridges in the second parts PT2$a$ to PT2$d$ are different from each other. The pitch of the grooves or ridges in the first part PT1 and the second parts PT2$a$ to PT2$d$ decreases or increases from the center of the first region RR1 toward the outer circumference of the second region RR2. The pitch of the grooves or ridges is different, herein, between the first part PT1 and the second part PT2$a$, however, the pitch may be constant between these parts.

Figure 30:
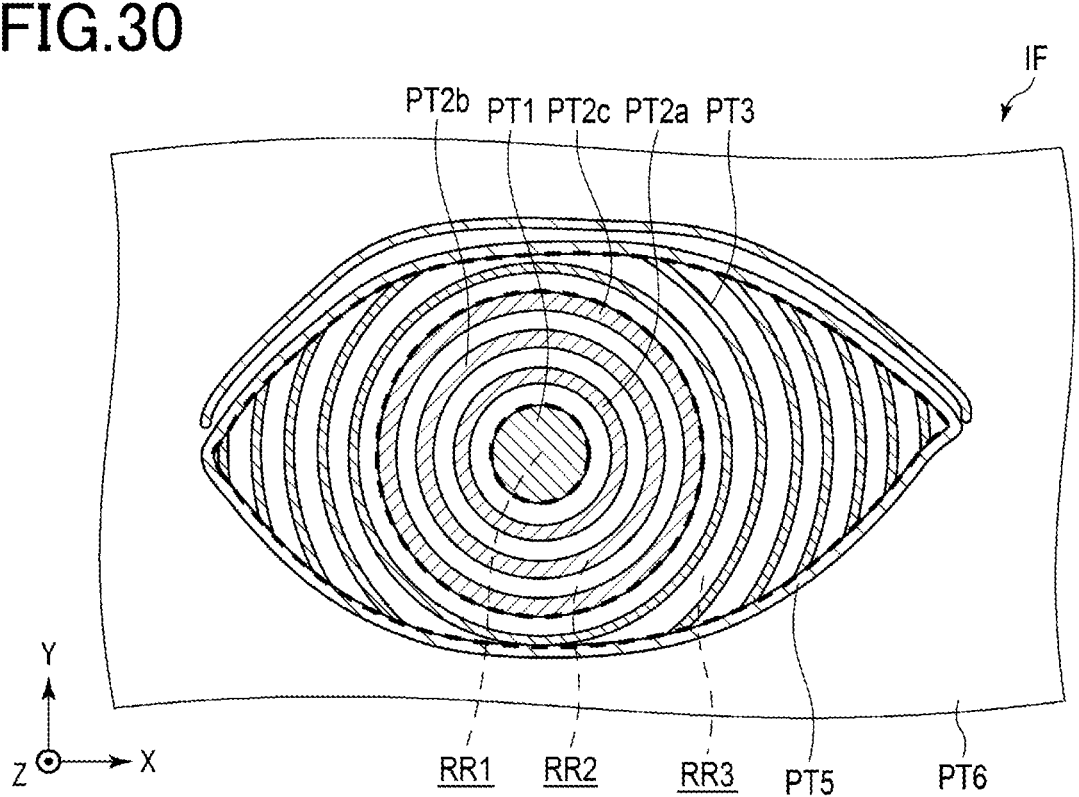
FIG. 30 is a plan view illustrating a modification of the structure shown in FIG. 29.

FIG. 30 is a plan view illustrating a modification of the structure shown in FIG. 29.

FIG. 30 shows an example of a structure that can be adopted when displaying a facial image of a non-human animal as a diffraction image.

The structure shown in FIG. 30 is substantially the same as the structure explained referring to FIG. 29 except for the following points. Specifically, in the diffraction image displayed by the structure shown in FIG. 29, a part of the iris is hidden behind the upper eyelid. In contrast, in the diffraction image displayed by the structure shown in FIG. 30, the iris is hidden behind neither of the upper and lower eyelids. Also, in the structure shown in FIG. 30, the second part PT2$d$ is omitted, and the second parts PT2$a$ to PT2$c$ are arrayed at even intervals.

If the structure explained referring to the FIG. 29 or 30 is adopted, advantageous effects similar to those achieved by the structure explained referring to FIGS. 24 to 27 may be achieved.

In the structures explained referring to FIGS. 29 and 30, the pitch of the grooves or ridges in the second parts PT2a to PT2d (or the second parts PT2a to PT2c) decreases or increases from the inner circumference of the second region RR2 toward the outer circumference thereof. Therefore, if these structures are adopted, colors in the portion of the diffraction image corresponding to the second region RR2 can be changed from the inner circumference toward the outer circumference thereof. Such a change of colors is similar to the change of colors and brightness of the iris. Accordingly, if the pitch of the grooves or ridges configuring the diffractive structure is changed at least in the second region RR2 as described above, the facial image displayed as a diffraction image may appear more lifelike.

Figure 31:
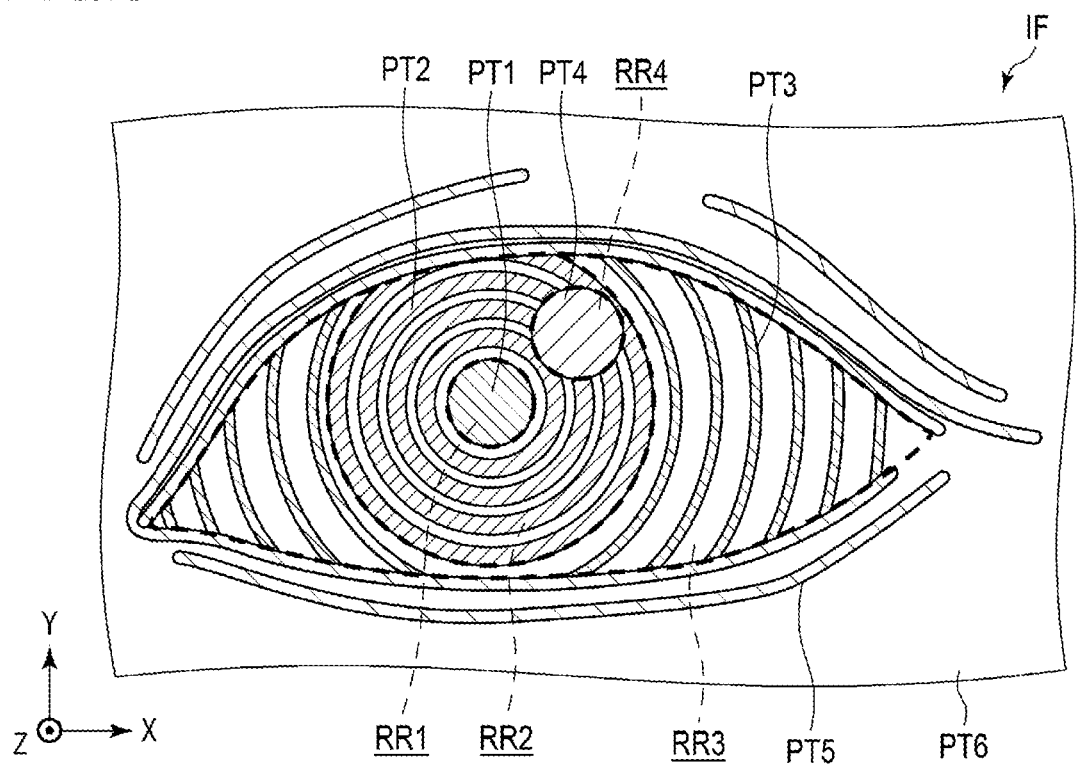
FIG. 31 is a plan view illustrating a part of one major surface of a relief structure forming layer included in a display according to a fifth embodiment of the present invention.

FIG. 31 is a plan view illustrating a part of a major surface of a relief structure forming layer included in a display according to a fifth embodiment of the present invention.

The display according to the fifth embodiment is similar to the third embodiment except that the structure shown is FIG. 31 is used for the diffractive structure RF. The structure shown in FIG. 31 is similar to the structure explained referring to FIG. 26, except for the following points.

Specifically, in the structure shown in FIG. 31, the second region RR2 corresponds to a part of the iris. Also, in the structure shown in FIG. 31, the facial image to be displayed as a diffraction image by the diffractive structure RF further includes catchlight overlapping with the remaining part of the iris. The major surface of the relief structure forming layer 11 including the diffractive structure RF further includes a fourth region RR4 corresponding to this catchlight.

The diffractive structure RF further includes a fourth part PT4 in the fourth region RR4. The fourth part PT4 overlaps two or more adjacent second parts PT2 among the plurality of second parts PT2. Herein, the fourth region RR4 and the fourth part PT4 both have a circular shape. Also, herein, the fourth part PT4 has a maximum diameter lager than that of the first part PT1.

In the fourth part PT4, the length direction of the grooves or ridges is constant overall. According to an example, the length direction of the grooves or ridges configuring the diffractive structure RF is constant between the plurality of second parts PT2 and the fourth part PT4. For example, in each of the second parts PT2 and the fourth part PT4, the length direction of the grooves or ridges is parallel to the X direction overall.

Furthermore, according to an example, in the fourth part PT4, the pitch of the grooves or ridges is constant overall. However, the pitch of the grooves or ridges configuring the diffractive structure RF is different between the plurality of second parts PT2 and the fourth part PT4.

Figure 32:
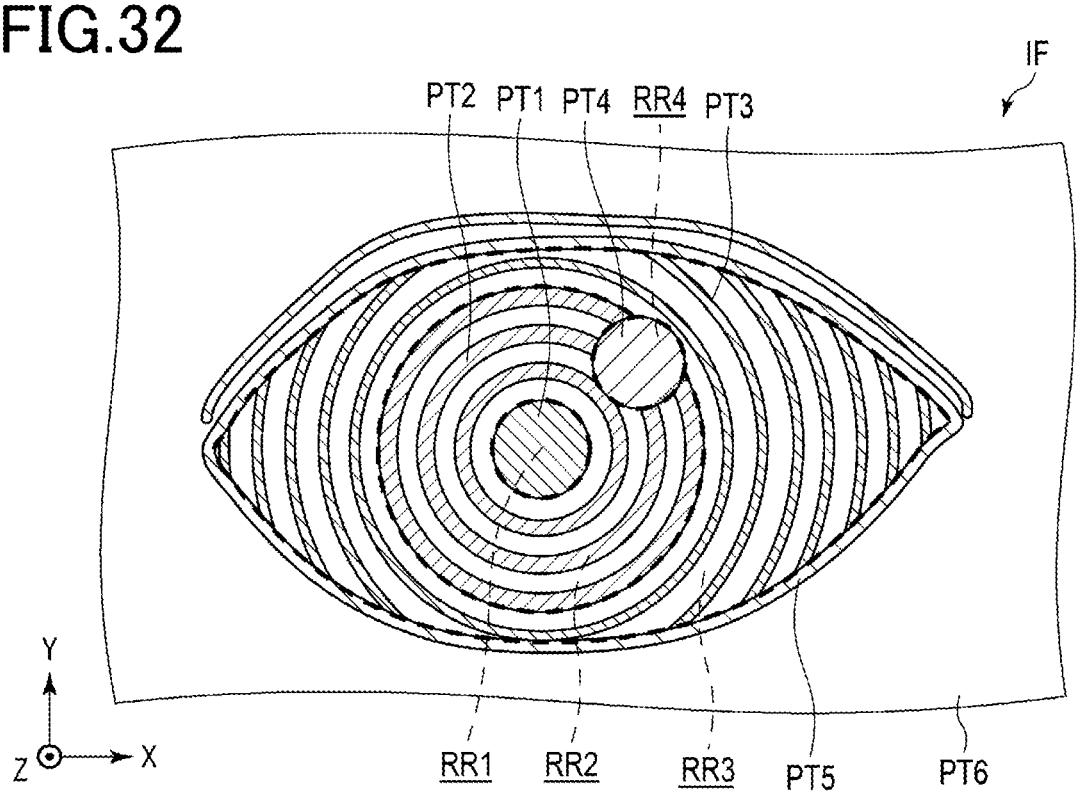
FIG. 32 is a plan view illustrating a modification of the structure shown in FIG. 31.

FIG. 32 is a plan view illustrating a modification of the structure shown in FIG. 31.

FIG. 32 shows an example of a structure that can be adopted when displaying a facial image of a non-human animal as a diffraction image.

The structure shown in FIG. 32 is substantially the same as the structure explained referring to FIG. 31 except for the following points. Specifically, in the diffraction image displayed by the structure shown in FIG. 31, a part of the iris is hidden behind the upper eyelid. In contrast, in the diffraction image displayed by the structure shown in FIG. 32, the iris is not hidden behind either of the upper and lower eyelids. Furthermore, in the structure shown in FIG. 32, the second parts PT2 are arrayed at even intervals.

If the structures explained referring to FIG. 31 or 32 are adopted, advantageous effects similar to those achieved by the structures explained referring to FIGS. 24 to 27 may be achieved.

In the structures explained referring to FIGS. 31 and 32, the major surface of the relief structure forming layer 11 further includes a fourth region RR4 corresponding to catchlight. Furthermore, the diffractive structure RF further includes a fourth part PT4 in the fourth region RR4, overlapping two or more adjacent second parts PT2 among the plurality of second parts PT2. If this structure is adopted, the eye in a diffraction image may give a stronger impression to the observer. Therefore, the facial image displayed as a diffraction image may appear lifelike.

In the structures explained referring to FIGS. 31 and 32, the pitch of the grooves or ridges configuring the diffractive structure RF is different between the plurality of second parts PT2 and the fourth part PT4. These structures are suitable, for example, for making colors displayed in the second region RR2 different from the colors displayed in the fourth region RR4 in the diffraction image.

Furthermore, in the structures explained referring to FIGS. 31 and 32, the fourth part PT4 has a maximum diameter larger than that of the first part PT1. If these structures are adopted, the eye in the diffraction image may create a stronger impression on the observer. Therefore, the facial image displayed as a diffraction image may appear lifelike.

It should be noted that, in the fifth embodiment, a structure similar to the third embodiment is used for the portion of the diffractive structure RF in the second region RR2. Instead of this, a structure similar to the fourth embodiment may be used for the portion of the diffractive structure RF in the second region RR2.

In the displays 1 according to the third to fifth embodiments, the reflective layer 12 may cover both the portions provided with and not provided with the diffractive structure RF, or may cover only the portion provided with the diffractive structure RF, in the major surface of the relief structure forming layer. The latter structure will be described below.

Figure 33:
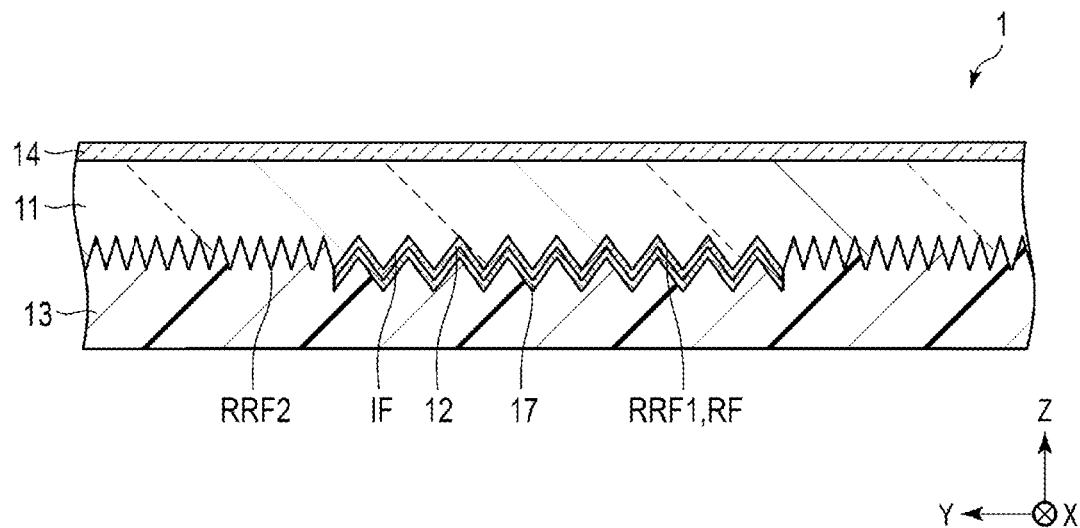
FIG. 33 is a schematic cross-sectional view illustrating an example of a structure that can be used for the displays according to the third to fifth embodiments of the present invention.

FIG. 33 is a schematic cross-sectional view illustrating an example of a structure that can be used for the displays according to the third to fifth embodiments of the present invention.

The structure shown in FIG. 33 includes a first relief structure RRF1 and a second relief structure RRF2 which are provided to the adhesive layer 13 side major surface of the relief structure forming layer 11, i.e., the interface IF between the relief structure forming layer 11 and the adhesive layer 13.

The first relief structure RRF1 includes a plurality of grooves or ridges arrayed in the width direction thereof as described for the diffractive structure RF. In other words, the first relief structure RRF1 configures the diffractive structure RF described above.

The second relief structure RRF2 is provided across the region where the first relief structure RRF1 is not provided. The second relief structure RRF2 includes a plurality of regularly or randomly arranged concavities and/or convexities. These concavities and/or convexities are two-dimensionally arrayed or distributed.

The ratio of the depth or height of the concavities or convexities included in the second relief structure RRF2 to the average center-to-center distance thereof is larger than the ratio of the depth or height of the grooves or ridges included in the first relief structure RRF1 to the average center-to-center distance thereof. In the region in the interface IF where the second relief structure RRF2 is provided, the ratio of the surface area to the apparent area is larger than in the region in the interface IF where the first relief structure RRF1 is provided.

Of the first and second relief structures RRF1 and RRF2 in the structure shown in FIG. 33, the reflective layer 12 covers only the first relief structure RRF1.

The structure shown in FIG. 33 further includes a reflective protection layer 17 covering the reflective layer 12. The reflective protection layer 17 is made of a material different from the material of the reflective layer 12.

This display 1 can be produced, for example, using an original plate which will be described below.

Figure 34:
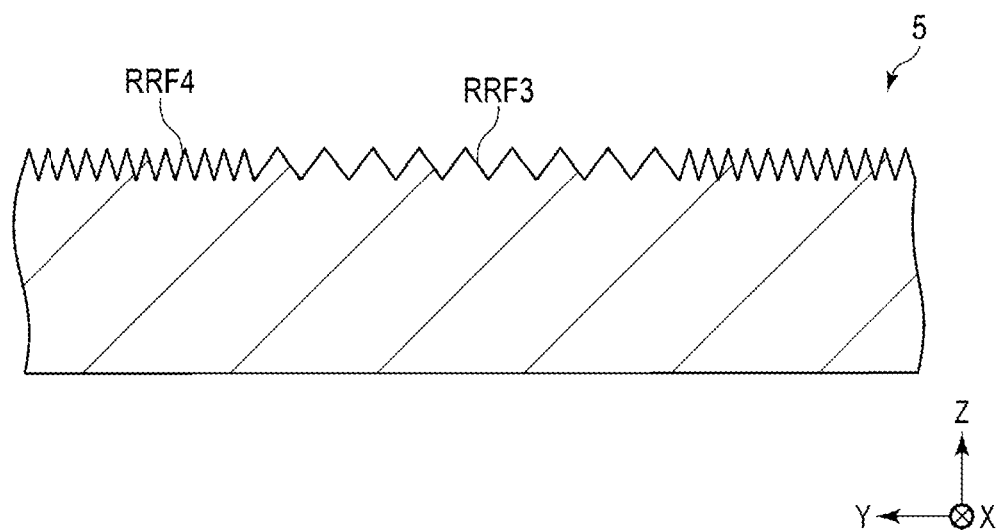
FIG. 34 is a schematic cross-sectional view illustrating an example of an original plate that can be used for producing the display shown in FIG. 33.

FIG. 34 is a schematic cross-sectional view illustrating an example of an original plate that can be used for producing the display shown in FIG. 33.

FIG. 34 shows an original plate 5 having a surface including a third relief structure RRF3 and a fourth relief structure. The third and fourth relief structures RRF3 and RRF4 respectively correspond to the first and second relief structures RRF1 and RRF2.

Specifically, the third relief structure RRF3 includes a plurality of ridges or grooves arrayed in the width direction thereof. These ridges or grooves correspond to the grooves or ridges configuring the first relief structure RRF1, i.e., the grooves or ridges of the relief type diffractive structure RF.

The fourth relief structure RRF4 is adjacent to the third relief structure RRF3. The fourth relief structure RRF4 includes a plurality of regularly or randomly arranged convexities and/or concavities. These convexities and/or concavities are two-dimensionally arrayed or distributed. The plurality of convexities and/or concavities correspond to the concavities and/or convexities configuring the second relief structure RRF2.

The ratio of the height or depth of the convexities or concavities included in the fourth relief structure RRF4 to the average center-to-center distance thereof is larger than the ratio of the height or depth of the ridges or grooves included in the third relief structure RRF3 to the average center-to-center distance thereof. In the region where the fourth relief structure RRF4 is provided, the ratio of the surface area to the apparent area is larger than in the region where the third relief structure RRF3 is provided.

If the original plate 5 is used, the structure explained referring to FIG. 33 can be produced through the following method, for example.

First, the surface of the original plate 5 provided with the third and fourth relief structures RR3 and RR4 is pressed against a thermoplastic resin layer with application of heat, and then the original plate 5 is removed (released) from the thermoplastic resin layer. Alternatively, a coating film of an ultraviolet-curable resin may be formed, against which the original plate 5 may be pressed with application of ultraviolet light to cure the ultraviolet-curable resin, and then the original plate 5 may be removed from the coating film. Alternatively, a coating film of a thermosetting resin may be formed, against which the original plate 5 may be pressed with application of heat to cure the thermosetting resin, and then the original plate 5 may be removed from the coating film. Through this process, there may be obtained a relief structure forming layer 11 having a major surface provided with the first and second relief structures RRF1 and RRF2.

Next, a first layer made of a material for the reflective layer 12 may be formed on the major surface of the relief structure forming layer 11 through a vapor-phase deposition method, for example. The first layer may be formed, for example, so as to entirely cover the first and second relief structures RRF1 and RRF2. For example, the first layer may be formed across the major surface of the relief structure forming layer 11.

Then, a second layer made of a material for the reflective protection layer 17 may be formed on the first layer through a vapor-phase deposition method, for example. As a material for the second layer, a material having high etching resistance against the etching agent used for etching the first layer may be selected.

The second layer may be formed, for example, so as to face the entire first and second relief structures RRF1 and RRF2 via the first layer. In the deposition for forming the second layer, the amount of the material deposited per unit area may be controlled, so that the second layer includes no apertures at the position facing the first structure RRF1 but includes apertures at the positions facing the second relief structure RRF2.

As stated above, the ratio of the depth or height of the concavities or convexities included in the second relief structure RRF2 to the average center-to-center distance thereof is larger than the ratio of the depth or height of the grooves or ridges included in the first relief structure RRF1 to the average center-to-center distance thereof. In the region in the interface IF where the second relief structure RRF2 is provided, the ratio of the surface area to the apparent area is larger than in the region in the interface IF where the first relief structure RRF1 is provided. Therefore, the appropriate control of the amount of the material deposited per unit area can achieve a second layer in which the portion corresponding to the first relief structure RRF1 is a continuous film, and the portion corresponding to the second relief structure RRF2 is open at the side wall positions of the concavities or convexities.

After that, the above etching agent may be supplied to the second layer to partly etch away the first layer. For example, the first layer may be partly wet-etched.

As described above, the second layer 2 has apertures at the positions facing the second relief structure RRF2. Therefore, in the second relief structure RRF2, the etching agent reaches the first layer via these apertures. Consequently, the portion of the first layer covering the second relief structure RRF2 is etched away. With this etching, the portion of the second layer located on the second relief structure RRF2 is also etched away.

The second layer 2 has no apertures at the positions facing the first relief structure RRF1. Therefore, the etching agent does not reach the first layer at the positions facing the first relief structure RRF1. Accordingly, the portions of the first and second layers located on the first relief structure RRF1 remain.

Thus, a reflective layer 12 and a reflective protection layer 17 can remain as remnants of the first and second layers. It should be noted that the reflective protection layer 17 may be removed.

Figure 35:
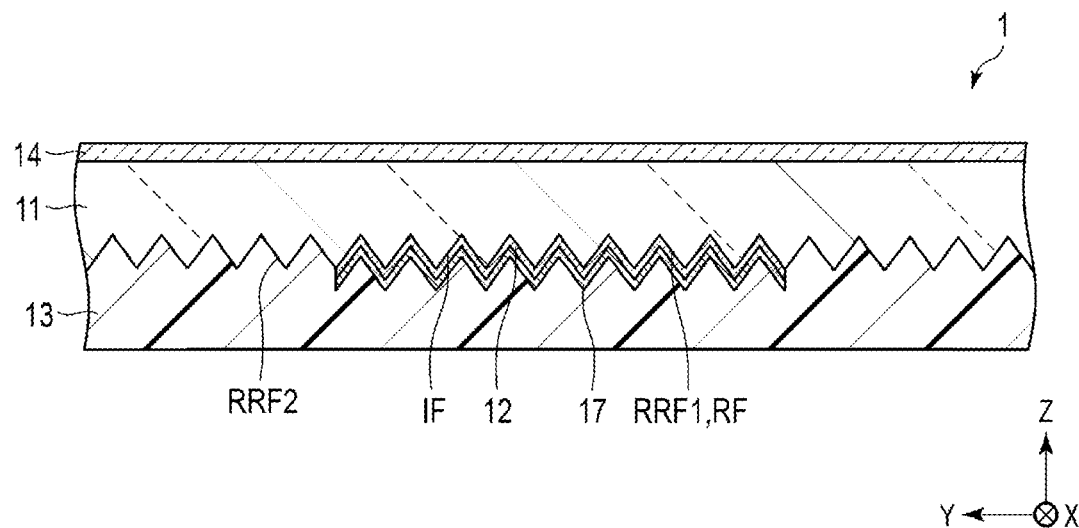
FIG. 35 is a schematic cross-sectional view illustrating another example of a structure that can be used for the displays according to the third to fifth embodiments of the present invention.

FIG. 35 is a schematic cross-sectional view illustrating another example of a structure that can be used for the displays according to the third to fifth embodiments of the present invention.

The structure shown in FIG. 35 is similar to the structure explained referring to FIG. 33, except for the following points. Specifically, in the structure shown in FIG. 35, the second relief structure RRF2 has the same or substantially the same structure as the first relief structure RRF1. More specifically, the second relief structure RRF2 includes a plurality of grooves or ridges arrayed in the width direction thereof.

The ratio of the depth or height of the grooves or ridges included in the second relief structure RRF2 to the average center-to-center distance thereof is the same or substantially the same as the ratio of the depth or height of the grooves or ridges included in the first relief structure RRF1 to the average center-to-center distance thereof. In the region in the interface IF where the second relief structure RRF2 is provided, the ratio of the surface area to the apparent area is the same or substantially the same as in the region in the interface IF where the first relief structure RRF1 is provided.

In the interface IF, the diffractive structure RF is a portion covered with the reflective layer 12 and allowing diffracted light to emerge. Herein, the diffractive structure RF is a portion of the relief structure provided to the interface IF and covered with the reflective layer 12, i.e., a first relief structure.

The structure explained referring to FIG. 35 can be obtained, for example, through the following method.

First, a surface of an original plate, not shown, provided with a relief structure may be pressed against a thermoplastic resin layer with application of heat, and then the original plate may be removed from the thermoplastic resin layer. Alternatively, a coating film of an ultraviolet-curable resin may be formed, against which an original plate may be pressed with application of ultraviolet light to cure the ultraviolet-curable resin, and then the original plate may be removed from the coating film. Alternatively, a coating film of a thermosetting resin may be formed, against which an original plate may be pressed with application of heat to cure the thermosetting resin, and then the original plate may be removed from the coating film. Through this process, there may be obtained a relief structure forming layer 11 having a major surface provided with the first and second relief structures RRF1 and RRF2.

Next, a first layer made of a material for the reflective layer 12 may be formed on the major surface of the relief structure forming layer 11 through a vapor-phase deposition method, for example. The first layer may be formed, for example, so as to entirely cover the first and second relief structures RRF1 and RRF2. For example, the first layer may be formed across the major surface of the relief structure forming layer 11.

Then, a second layer made of a material for the reflective protection layer 17 may be formed on the first layer. The second layer may be formed, for example, so as to face the entire first and second relief structures RRF1 and RRF2 via the first layer.

If a photoresist layer is formed as the second layer, the photoresist layer may be patterned by exposure and developed. Thus, a resist pattern may be obtained as a reflective protection layer 17.

If a different type of layer is formed as a second layer, for example, a resist pattern may be formed on the second layer, and the second layer may be etched away using the resist pattern as a mask. Thus, a patterned second layer may be obtained as a reflective protection layer 17.

Alternatively, the second layer may be formed as a printed pattern. For example, a second layer may be formed by printing using a printed mask.

After that, a first layer may be etched away using the reflective protection layer 17 as a mask. Thus, a patterned first layer may be obtained as a reflective layer 12.

FIGS. 33 and 35 show the structures in which the second relief structure RRF2 is provided to the interface IF. However, the second relief structure RRF2 does not have to be provided to the interface IF. For example, the region in the interface IF other than the region provided with the first relief structure RRF1 may have a flat surface. In this case, the reflective layer 12 may cover only the first relief structure RRF1, or may further cover the region in the interface IF other than the region provided with the first relief structure RRF1.

Next, a transfer foil according to an embodiment of the present invention will be described.

Figure 36:
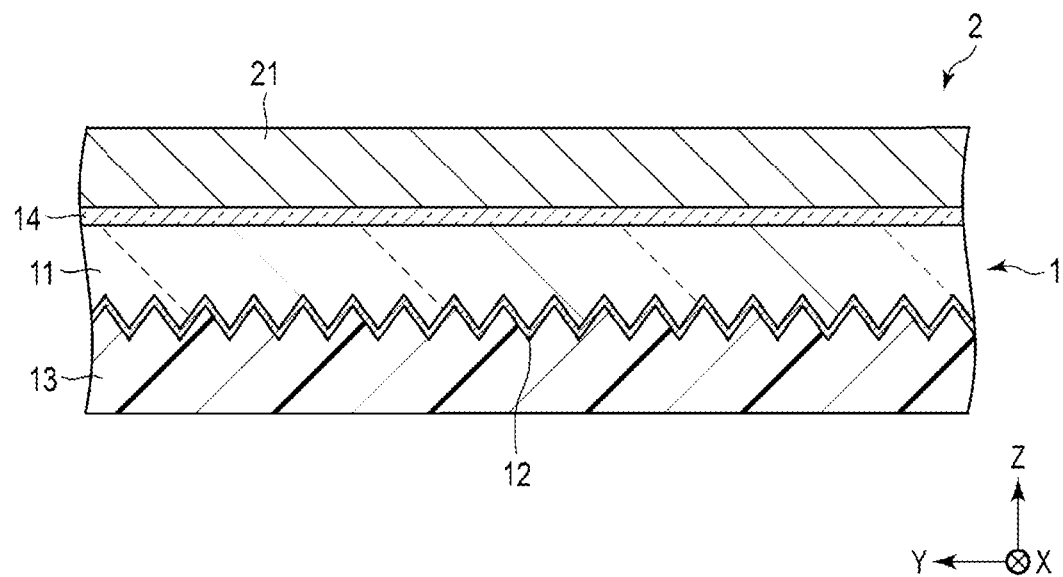
FIG. 36 is a schematic cross-sectional view illustrating a transfer foil according to an embodiment of the present invention.

FIG. 36 is a schematic cross-sectional view illustrating a transfer foil according to an embodiment of the present invention.

FIG. 36 shows a transfer foil 2 including a support 21, a transfer material layer, and an adhesive layer 13.

The support 21 separably supports the transfer material layer.

The adhesive layer 13 covers the transfer material layer.

The transfer material layer includes a relief structure forming layer 11, a reflective layer 12, and a separation protective layer 14. The protective layer 14 herein is a release protective layer. The protective layer 14, the relief structure forming layer 11, and the reflective layer 12 are laminated together in this order on the support 21.

The transfer material layer includes a transfer portion, and a non-transfer portion which are adjacent to each other. In the transfer material layer, the transfer portion is a portion transferred to an article and includes the above display 1. In the transfer material layer, the non-transfer portion is a portion remaining without being transferred to the article.

Next, an adhesive label according to an embodiment of the present invention will be described.

Figure 37:
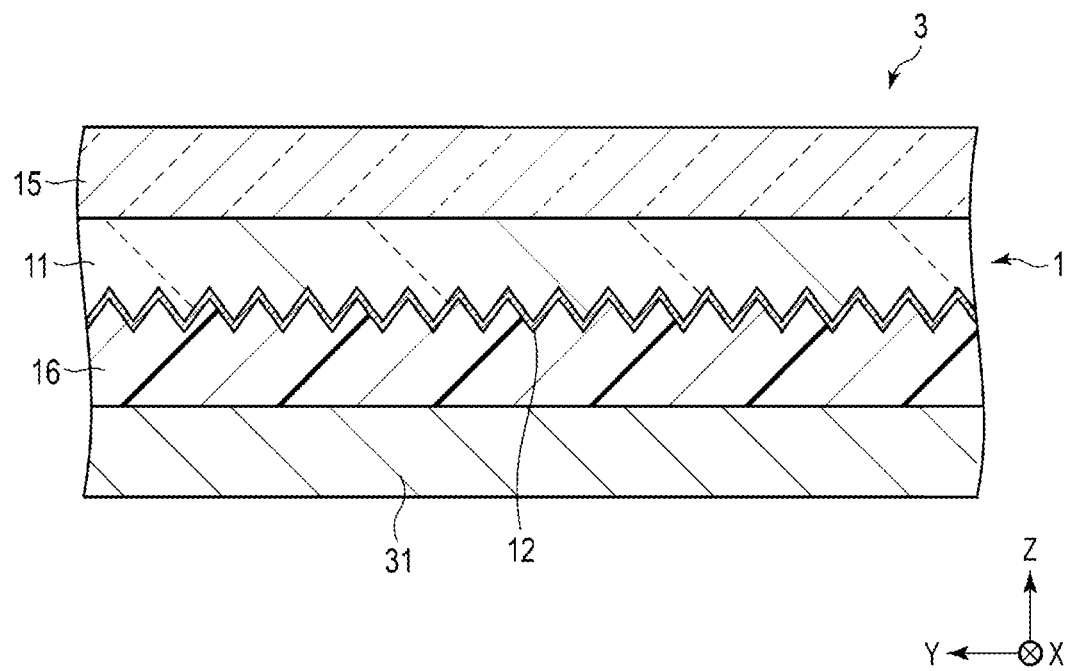
FIG. 37 is a schematic cross-sectional view illustrating an adhesive label according to an embodiment of the present invention.

FIG. 37 is a schematic cross-sectional view illustrating an adhesive label according to an embodiment of the present invention.

FIG. 37 shows an adhesive label 3 including a substrate 15, a display 1, and an adhesive layer 16. In FIG. 37, the reference sign 31 indicates a mount.

For example, the substrate 15 may be a transparent resin film. The substrate 15 has a major surface supporting the display 1.

The adhesive layer 16 is provided to a major surface of the display 1. The adhesive layer 16 faces the substrate 15 via the display 1. The adhesive layer 16 is protected by the mount 31 until immediately before use of the adhesive label 3.

Next, a labeled article according to an embodiment of the present invention will be described.

Figure 38:
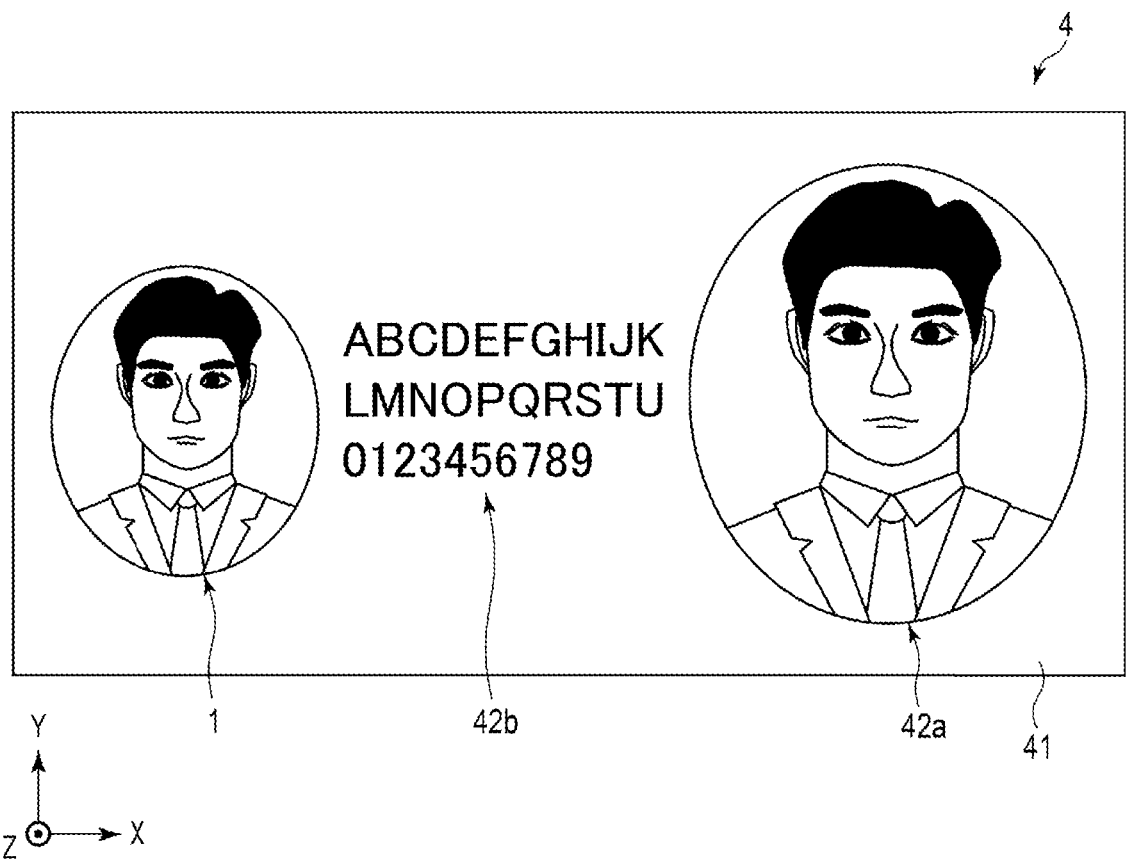
FIG. 38 is a schematic cross-sectional view illustrating a labeled article according to an embodiment of the present invention.

FIG. 38 is a schematic plan view illustrating a labeled article according to an embodiment of the present invention.

FIG. 38 shows a labeled article 4 which is printed matter. The labeled article 4 may be, for example, a gift ticket, security, bank note, ID (identification) card, or passport.

The labeled article 4 includes a display 1, an article 41 supporting the display 1, and printing layers 42a and 42b provided on the article 41.

For example, the article 41 may be a printing substrate, such as one made of paper. The printing substrate may be, for example, a paper substrate, or a transparent or translucent resin substrate.

For example, the display 1 may be bonded to a surface of the article 41 or embedded in the article 41 so as to be supported by the article 41. According to an example, the display 1 is bonded to the article 41 using an adhesive label or a transfer foil.

If the article 41 is transparent, the display 1 may be embedded in the article 41. Such a structure is obtained, for example, by sandwiching the display 1 between a plurality of transparent resin substrates and laminating the transparent resin substrates together.

If the article 41 is translucent as in the case of using a paper substrate or a translucent resin substrate as a printing substrate, the above structure can be obtained, for example, through the following method. First, a display 1 may be sandwiched between a plurality of paper substrates or translucent resin substrates and integrated with each other. Next, windows are provided to one or more portions of the substrates at positions corresponding to the display 1 so that the display 1 is visible.

The printing layer 42a may display a printed image which is produced using the original of the image to be displayed by the display 1. The printing layer 42b may display characters and the like. One of or both of the printing layers 42a and 42b may be omitted.

When the printed image displayed by the printing layer 42a and the image displayed by the display 1 correspond to each other, if either one of the printed image and the display 1 is fraudulently changed or rewritten, the fraudulent activity can be more easily detected.

Third Disclosure

Embodiments of the third disclosure are combinations of the embodiments of the first disclosure and the embodiments of the second disclosure. Such combinations include a combination in which any of the structures described in the third to fifth embodiments is applied to the region in the diffractive structure corresponding to the eye in the facial image included in the diffraction image in the display according to the second embodiment. In addition, such combinations include a combination in which any of the structures described in the first and second embodiments is applied to the regions in the diffractive structure corresponding to the skin in the facial image, e.g., positions corresponding to one or more of the nose, cheek, forehead, temple, area between the eyebrows, upper eyelid, lower eyelid and jaw, included in the diffraction image in the display according to any of the third to fifth embodiments. Furthermore, such combinations include transfer foils, adhesive labels, and labeled articles, each including such a display.

According to an embodiment of the third invention, both the advantageous effects explained in the first disclosure and the advantageous effects explained in the second disclosure can be achieved.

The present invention should not be limited to the embodiments described above, but various modifications can be made thereto when implemented, without departing from the spirit of the present invention. Furthermore, the embodiments may be adequately combined and implemented. In this case, the combinations should accordingly exert the advantageous effects. The embodiments described above include various stages. Therefore, various other embodiments may be extracted by appropriately combining a plurality of disclosed elements.

REFERENCE SIGNS LIST

1 ... Display; 2 ... Transfer foil; 3 ... Adhesive label; 4 ... Labeled article; 5 ... Original plate; 11 ... Relief structure forming layer; 12 ... Reflective layer; 13 ... Adhesive layer; 14 ... Protective layer; 15 ... Substrate; 16 ... Adhesive layer; 17 ... Reflective protection layer; 12 ... Support; 31 ... Mount; 41 ... Article; 42a ... Printing layer; 42b ... Printing layer; G1 ... Grooves or ridges; G2 ... Grooves or ridges; GP ... Gap; I1 ... Image; I2 ... Image; IF ... Interface; IM ... Original image; LP1 ... First linear part; LP2 Second linear part; LP3 ... Third linear part; LP4 ... Fourth linear part; LP5 ... Fifth linear part; LP6 ... Sixth linear part; LP7 ... Seventh linear part; LP8 ... Eighth linear part; LP9 ... Ninth linear part; LPa ... First linear region; LPb ... Second linear region; LS ... Light source; OB ... Three-dimensional object; P1 ... First pattern; P2 ... Second pattern; P3 ... Third pattern; P4 ... Fourth pattern; P5 ... Fifth pattern; PP1 ... First part; PP2 ... Second part; PT1 ... First part; PT2 Second part; PT2a ... Second part; PT2b ... Second part; PT2c ... Second part; PT2d ... Second part; PT3 ... Third part; PT4 ... Fourth part; PT5 ... Fifth part; PT6 ... Sixth part; PT12 Part; R1 ... First region; R2 ... Second region; R3 ... Third region; R4 ... Fourth region; R5 ... Fifth region; Ra ... Region; Rb ... Region; RF ... Diffractive structure; RF1 ... Diffractive structure; RF2 ... Relief structure; RR1 ... First region; RR2 ... Second region; RR3 ... Third region; RR4 ... Fourth region; RRF1 ... First relief structure; RRF2 ... Second relief structure; RRF3 ... Third relief structure; RRF4 ... Fourth relief structure; SR1 ... First sub-region; SR2 Second sub-region; SR3 ... Third sub-region.

What is claimed is:

1. A display comprising a relief structure forming layer having a major surface which is provided with a relief type diffractive structure that displays a facial image including the eye as a diffraction image, wherein the major surface comprises a first region corresponding to the pupil of the eye, a second region surrounding the first region and corresponding to at least a part of the iris of the eye, and a third region enclosing the second region and corresponding to the sclera of the eye;

the first region has a circular shape, ridges or grooves of the diffraction structure in the first region are parallel to a first direction, a pitch of the ridges or grooves of the diffraction structure in the first region is constant throughout the first region;

the second region has an annular shape and encloses the first region;

the second region comprises a plurality of concentrically arranged second parts, each having grooves or ridges, a common center of each of concentrically arranged second parts of said plurality concentrically arranged second parts is a center of the first region, each second part of said plurality concentrically arranged second parts has a constant width throughout a circumference or a length of the respective second part, a width of each second part of said plurality concentrically arranged second parts is the same, each adjacent second parts of the plurality of concentrically arranged second parts are separated by an interval not having grooves or ridges, said interval decreases as the corresponding adjacent second parts are distanced further from the common center, the grooves or ridges in each of the second part is parallel to the first direction, a pitch of the grooves or ridges in each second part of said plurality concentrically arranged second parts is the same as the pitch of grooves or ridges in the first region;

the third region comprises a plurality of concentrically arranged third parts, each having grooves or ridges, a common center of each of concentrically arranged third parts of said plurality concentrically arranged third parts is the common center of the concentrically arranged second parts of said plurality concentrically arranged second parts, each adjacent third parts of said plurality concentrically arranged third parts are separated by an interval not having grooves or ridges, said interval is the same for each adjacent third parts of said plurality concentrically arranged third parts and is smaller than any interval between adjacent second parts of said plurality of concentrically arranged second parts, each third part of said plurality concentrically arranged third parts has a constant width throughout a length of the respective third part, a width of each third part of said plurality concentrically arranged third parts is the same, and the grooves or ridges in each of the third parts is parallel to the first direction, a pitch of the grooves or ridges in each second part of said plurality concentrically arranged second parts is different from the pitch of grooves or ridges in the first region.

2. The display of claim 1, wherein the second region corresponds to a part of the iris;

the facial image further includes catchlight overlapping a remaining part of the iris;

the major surface further includes a fourth region corresponding to the catchlight; and the fourth part expands crossing two or more adjacent second parts among the plurality of second parts.

3. The display of claim 2, wherein grooves or ridges are parallel to the first direction.

4. The display of claim 2, wherein a pitch between the grooves or ridges in the fourth region is different from the pitch between the grooves and the ridges in the second parts of said plurality of concentrically arranged second parts.

5. The display of claim 1, further comprising a reflective layer at least partially covering the major surface.

6. The display of claim 5, wherein the reflective layer covers a region of the major surface provided with the diffractive structure, but does not cover a region adjacent to the region provided with the diffractive structure.

7. A transfer foil comprising a transfer material layer including the display of claim 1, and a support separately supporting the transfer material layer.

8. An adhesive label comprising the display of claim 1, and an adhesive layer provided to one major surface of the display.

9. A labeled article, comprising the display of claim 1, and an article supporting the display.

10. The labeled article of claim 9, further comprising a printing layer provided on the article.

11. The labeled article of claim 10, wherein the printing layer displays the facial image as a printed image.

* * * * *